US011129208B2

(12) United States Patent
Huang et al.

(10) Patent No.: US 11,129,208 B2
(45) Date of Patent: Sep. 21, 2021

(54) PAGING METHOD AND APPARATUS AND COMMUNICATION TIMING METHOD AND APPARATUS

(71) Applicant: Huawei Technologies Co., Ltd., Shenzhen (CN)

(72) Inventors: Huang Huang, Chengdu (CN); Mao Yan, Chengdu (CN); Kuandong Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/824,126

(22) Filed: Mar. 19, 2020

(65) Prior Publication Data
US 2020/0221508 A1 Jul. 9, 2020

Related U.S. Application Data

(63) Continuation of application No. PCT/CN2018/107754, filed on Sep. 26, 2018.

(30) Foreign Application Priority Data

Sep. 27, 2017 (CN) .......................... 201710891710.1
Nov. 17, 2017 (CN) .......................... 201711149123.1

(51) Int. Cl.
H04W 74/08 (2009.01)
H04W 76/27 (2018.01)
(Continued)

(52) U.S. Cl.
CPC ..... *H04W 74/0833* (2013.01); *H04W 68/005* (2013.01); *H04W 72/044* (2013.01); *H04W 72/14* (2013.01); *H04W 76/27* (2018.02)

(58) Field of Classification Search
None
See application file for complete search history.

(56) References Cited

U.S. PATENT DOCUMENTS 10,015,824 B2 7/2018 Lee et al.
10,425,139 B2 * 9/2019 Guo .................... H04B 7/0695
(Continued)

FOREIGN PATENT DOCUMENTS

CN 101557258 A 10/2009
CN 101646234 A 2/2010
(Continued)

OTHER PUBLICATIONS

QUALCOMM Incorporated, "PRACH Procedure Considerations",3GPP TSG-RAN WG1 Meeting NR#3, R1-1716384, Sep. 18-21, 2017, 6 pages, Nagoya, Japan.
(Continued)

*Primary Examiner* — Jamaal Henson
(74) *Attorney, Agent, or Firm* — Slater Matsil, LLP

(57) ABSTRACT

This application discloses a paging method and apparatus. The method includes: receiving, by a network device, a random access preamble from a terminal device, where the random access preamble is used to request a paging message; obtaining, by the network device, a paging identifier associated with the random access preamble; and sending, by the network device, a paging message to the terminal device based on the paging identifier.

20 Claims, 14 Drawing Sheets

(51) Int. Cl.
*H04W 68/00* (2009.01)
*H04W 72/04* (2009.01)
*H04W 72/14* (2009.01)

(56) References Cited

U.S. PATENT DOCUMENTS

| | | | | |
|---|---|---|---|---|
| 10,827,003 | B2* | 11/2020 | Yang | ............... G06F 9/4875 |
| 2014/0050157 | A1 | 2/2014 | Korhonen et al. | |
| 2017/0231011 | A1 | 8/2017 | Park et al. | |
| 2018/0132282 | A1* | 5/2018 | Ly | ............... H04W 28/0215 |
| 2019/0306893 | A1* | 10/2019 | Ly | ............... H04W 74/0833 |
| 2019/0320467 | A1* | 10/2019 | Freda | ............... H04L 5/0055 |

FOREIGN PATENT DOCUMENTS

| | | |
|---|---|---|
| CN | 101753202 A | 6/2010 |
| CN | 102014516 A | 4/2011 |
| CN | 102647783 A | 8/2012 |
| CN | 105357726 A | 2/2016 |
| CN | 105828450 A | 8/2016 |
| CN | 106507439 A | 3/2017 |
| CN | 106797363 A | 5/2017 |
| CN | 107018497 A | 8/2017 |
| CN | 107105515 A | 8/2017 |
| CN | 108012329 A | 5/2018 |
| WO | 2015129985 A1 | 9/2015 |
| WO | 2016120761 A1 | 8/2016 |
| WO | 2017142268 A1 | 8/2017 |

OTHER PUBLICATIONS

LG Electronics, "Remaining issues on RACH procedure for NB-IoT", 3GPP TSG RAN WG1 #NB-IoT Adhoc Meeting, R1-161975, Mar. 22-24, 2016, 5 pages, Sophia Antipolis, France.
MCC Support, "Final Report of 3GPP TSG RAN WG1 #89 v1.0.0", 3GPP TSG RAN WG1 Meeting #90, R1-1712031, Aug. 21-25, 2017,164 pages, Prague, Czech Rep.
Intel Corporation, "Timing relationships for DL scheduling", 3GPP TSG RAN WG1 #89, R1-1707403, May 15-19, 2017, 5 pages, Hangzhou, P.R. China.
Samsung, "On UL Transmission Timing Aspects", 3GPP TSG RAN WG1 Meeting NR#3, R1-1716021, Sep. 18-21, 2017, 2 pages, Nagoya, Japan.
Samsung, "Remaining details on PRACH procedure", 3GPP TSG RAN WG1 Meeting NR#3, R1-1715914, Sep. 18-21, 2017, 14 pages, Nagoya,Japan.
Huawei et al.,"Remaining issues in RACH Procedure", 3GPP TSG RAN WG1 Meeting#91 R1-1719501, Nov. 27-Dec. 1, 2017, 11 pages, Reno, USA.
3rd Generation Partnership Project; Technical Specification Group Radio Access Network; NR;Physical channels and modulation (Release 15), 3GPP TS 38.211 V1.0.0 (Sep. 2017), 37 pages.
Huawei et al., "Remaining issues in RACH Procedure", 3GPP TSG RAN WG1 Meeting NR#3, R1-1715387, Sep. 18-21, 2017, 7 pages, Nagoya,Japan.
InterDigital Inc.,"Paging Indicator Design", 3GPP TSG-RAN WG2 Meeting #99 R2-1708746, Aug. 21-25, 2017, 3 pages, Berlin, Germany.
"3rd Generation Partnership Project; Technical Specification Group Radio Access Network; NR;Physical layer procedures for control (Release 15)", 3GPP TS 38.213 V1.0.0 (Sep. 2017), 16 pages.
CATT, "Remaining Issues on random access for Rel-13 MTC", 3GPP TSG RAN WG1 Meeting #82bis, R1-156565, Nov. 15-22, 2015, 4 pages, Anaheim,USA.
"3rd Generation Partnership Project; Technical Specification Group Radio Access Network; NR;Physical layer procedures for data (Release 15)", 3GPP TS 38.214 V1.0.0 (Sep. 2017), 32 pages.
QUALCOMM, "Summary of Discussion during Sep. 20 regarding Remaining Details of RACH Procedure", 3GPP TSG RAN WG1 Meeting #NR-AH3, R1-1716898, Sep. 18-21, 2017, Nagoya,Japan, 7 pages.
"3rd Generation Partnership Project; Technical Specification Group Radio Access Network; NR;Radio Resource Control (RRC); Protocol specification (Release 15)", 3GPP TS 38.331 V0.0.5 (Aug. 2017); 38 pages.
QUALCOMM, "4-step RACH procedure consideration", 3GPP TSG-RAN WG1 NR AdHoc, R1-1700791, Jan. 16-20, 2017,Spokane,USA, 12 pages.
3GPP TS 38.300 V1.0.0 (Sep. 2017), 3rd Generation Partnership Project; Technical Specification Group Radio Access Network; NR; NR and NG-RAN Overall Description; Stage 2 (Release 15), 59 pages.
3GPP TS 38.212 V1.0.0 (Sep. 2017), 3rd Generation Partnership Project; Technical Specification Group Radio Access Network; NR; Multiplexing and channel coding (Release 15), 28 pages.
3GPP TS 38.133 V0.2.0 (Sep. 2017), 3rd Generation Partnership Project; Technical Specification Group Radio Access Network; New Radio(NR); Requirements for support of radio resource management (Release 15), 14 pages.
3GPP TS 38.321 V1.0.0 (Sep. 2017), 3rd Generation Partnership Project; Technical Specification Group Radio Access Network; NR; Medium Access Control (MAC) protocol specification (Release 15), 46 pages.

* cited by examiner

G:Indication information

PAGING METHOD AND APPARATUS AND COMMUNICATION TIMING METHOD AND APPARATUS

CROSS-REFERENCE TO RELATED APPLICATIONS

This application is a continuation of International Application No. PCT/CN2018/107754, filed on Sep. 26, 2018, which claims priority to Chinese Patent Application No. 201711149123.1, filed on Nov. 17, 2017 and Chinese Patent Application No. 201710891710.1, filed on Sep. 27, 2017. The disclosures of the aforementioned applications are hereby incorporated by reference in their entireties.

TECHNICAL FIELD

The present invention relates to the communications field, and in particular, to a paging method and apparatus and a communication timing method and apparatus.

BACKGROUND

To improve data rates and efficiency of wireless communication, a beamforming technology is provided in a next-generation wireless communications system (for example, new radio). The beamforming technology can limit energy of a transmit signal to a beam direction, to improve signal receiving efficiency. The beamforming technology can effectively enlarge a transmission range of a radio signal and reduce signal interference, to achieve higher communication efficiency and obtain a higher network capacity. The beamforming technology brings challenges to beam management while improving efficiency of a communications network.

In a next-generation communications system, because of existence of a plurality of beams and beam directivity, a paging message needs to be sent through beam scanning. If all paging messages are sent in each beam, excessive overheads are caused by sending of the paging messages.

SUMMARY

This application provides a paging method and apparatus and a communication timing method and apparatus, so that a terminal device triggers, by using a random access preamble, sending of a paging message, to reduce signaling overheads.

According to a first aspect, this application provides a paging method, including: receiving, by a network device, a random access preamble from a terminal device, where the random access preamble is used to request a paging message; obtaining, by the network device, a paging identifier associated with the random access preamble; and sending, by the network device to the terminal device based on the paging identifier, a paging message corresponding to a paging user group.

The random access preamble is used to trigger a paging procedure. The network device can recognize a type of the received random access preamble, and if the type of the random access preamble is a preset type, determine that the random access preamble is used to request the paging message. The paging identifier is used to scramble a physical downlink control channel (PDCCH), and the physical downlink control channel indicates a physical downlink shared channel (PDSCH) used to send the paging message. The paging user group is also referred to as a paging group, a paging set, or a paging cluster. One paging user group includes a plurality of terminal devices. A plurality of terminal devices on a same paging occasion (PO) are grouped into a plurality of paging user groups, and each paging user group includes at least one terminal device. A grouping rule is not limited in this application, for example, grouping is performed based on a UE ID (user equipment identifier) of the terminal device. The paging identifier may include a radio network temporary identifier (RNTI).

In a possible design, the network device receives the random access preamble from the terminal device, the network device obtains the paging user group associated with the random access preamble, and the network device sends, to the terminal device based on the paging identifier corresponding to the paging user group, the paging message corresponding to the paging user group.

In a possible design, the network device receives the random access preamble from the terminal device, the network device obtains the paging user group associated with the random access preamble and obtains the paging identifier associated with the paging user group, and the network device sends, to the terminal device based on the paging identifier, the paging message corresponding to the paging user group.

In this application, the network device sends the paging message to the terminal device in response to triggering by the random access preamble, and can use an existing random access procedure, to reduce signaling overheads.

In a possible design, the sending, by the network device to the terminal device based on the paging identifier, a paging message corresponding to a paging user group includes: scrambling, by the network device, a physical downlink control channel based on the paging identifier; and sending, by the network device, the paging message corresponding to the paging user group to the terminal device on a physical downlink shared channel indicated by the physical downlink control channel.

In a possible design, before the receiving, by a network device, a random access preamble from a terminal device, the method further includes: sending, by the network device, a paging indication message to the terminal device, where the paging indication message carries a paging indication bit of a paging user group of the terminal device, and the paging indication bit is a preset value; and/or sending, by the network device, random access configuration information to the terminal device, where the random access configuration information is used to configure a random access preamble corresponding to each paging user group.

In a possible design, the random access preamble corresponding to the paging user group is a predefined or pre-stored random access preamble.

The network device may group a plurality of terminal devices on a same paging occasion into a plurality of paging user groups, each paging user group corresponds to one paging indication bit, one random access preamble, and one paging identifier, different paging user groups correspond to different random access preambles, different paging user groups have different paging identifiers, and the paging indication bit indicates whether a terminal device is paged in the paging user group. When the paging indication bit is the preset value, a terminal device in the paging user group associated with the paging indication bit needs to send a random access preamble to the network device.

In a possible design, the obtaining, by the network device, a paging identifier associated with the random access preamble includes: obtaining, by the network device, a prestored or preconfigured paging identifier associated with the random access preamble; or determining, by the network device based on at least one of the following information, the paging identifier associated with the random access preamble: a total quantity of paging occasions in a discontinuous reception cycle (DRX cycle), a total quantity of paging messages, a total quantity of random access occasions (number of RO), a subcarrier spacing (SCS), a service type, a carrier frequency (or frequency band), a total quantity of random access preambles (number of preambles), an index of a random access occasion, an index of a paging occasion, an index of the random access preamble (index of preamble), an index of the paging message (index of paging message), an index of the paging user group corresponding to the random access preamble, an index of the paging user group of the terminal device, an index of a time-frequency resource (preamble time and/or frequency index) corresponding to the random access preamble, an index of a synchronization signal block corresponding to the random access preamble, an index of a channel state information reference signal (CSI-RS) port corresponding to the random access preamble, and a random access radio network temporary identifier (RA-RNTI) corresponding to the random access preamble.

The total quantity of paging occasions, the total quantity of paging messages, the total quantity of random access occasions, and the total quantity of random access preambles are quantities in the discontinuous reception cycle, and the discontinuous reception cycle includes, but is not limited to, a subframe, a slot, or an SS block. The paging occasion is a time interval, and indicates a possible location at which the network device sends the paging indication message, and a possible location at which the terminal device receives the paging indication message.

In a possible design, the network device sends the paging identifier corresponding to the random access preamble to the terminal device.

The network device sends the paging identifier to the terminal device by using a system information (SI), a message 2 in a random access process, an RRC message (radio resource control, RRC), a media access control-control element (MAC-CE) message, downlink control information (DCI), or a physical downlink control channel order (PDCCH order).

In a possible design, the network device determines configuration information of a paging message window of the paging message based on at least one of the following information: a total quantity of paging occasions, a total quantity of paging messages, a total quantity of random access occasions, a subcarrier spacing, a service type, a carrier frequency, a total quantity of random access preambles, an index of a random access occasion corresponding to the random access preamble, a start time of the random access preamble, duration of the random access preamble, an end time of the random access preamble, time domain location information of a random access response window corresponding to the random access preamble, and frequency domain location information of the random access response window corresponding to a random access response.

The total quantity of paging occasions, the total quantity of paging messages, the total quantity of random access occasions, and the total quantity of random access preambles are quantities in the discontinuous reception cycle, and the discontinuous reception cycle includes, but is not limited to, a subframe, a slot, or an SS block. The paging message window is a time interval, the network device sends the paging message in the paging message window, the terminal device receives the paging message in the paging message window, and time domain location information of the paging message window includes at least one of a window size and a start time.

In a possible design, the network device sends the configuration information of the paging message window to the terminal device, so that the terminal device determines a time domain location and/or a frequency domain location of the paging message window based on the configuration information of the paging message window.

In a possible design, the paging identifier may be referred to as an RNTI or a paging radio network temporary identifier (P-RNTI), and the paging identifier is used to scramble a downlink control channel or downlink control information (DCI) corresponding to the paging message.

According to a second aspect, this application provides a paging method, including: sending, by a terminal device, a random access preamble to a network device, where the random access preamble is used to request a paging message corresponding to a paging user group of the terminal device; obtaining, by the terminal device, a paging identifier associated with the random access preamble; and receiving, by the terminal device, a paging message from the network device based on the paging identifier.

In a possible design, the obtaining, by the terminal device, a paging identifier associated with the random access preamble includes: receiving, by the terminal device, the paging identifier that is from the network device and that is associated with the random access preamble; or obtaining, by the terminal device, a prestored or preconfigured paging identifier associated with the random access preamble; or determining, by the terminal device based on at least one of the following information, the paging identifier associated with the random access preamble: a total quantity of paging occasions, a total quantity of paging messages, a total quantity of random access occasions, a subcarrier spacing, a service type, a carrier frequency, a total quantity of random access preambles, an index of a random access occasion corresponding to the random access preamble, an index of the random access preamble, an index of the paging message, an index of the paging user group of the terminal device, an index of a time-frequency resource corresponding to the random access preamble, an index of a synchronization signal block corresponding to the random access preamble, an index of a CSI-RS port corresponding to the random access preamble, and an RA-RNTI corresponding to the random access preamble.

The total quantity of paging occasions, the total quantity of paging messages, the total quantity of random access occasions, and the total quantity of random access preambles are quantities in a discontinuous reception cycle, and the discontinuous reception cycle includes, but is not limited to, a subframe, a slot, or an SS block.

In a possible design, the receiving, by the terminal device, the paging message from the network device in a paging message window based on the paging identifier includes: monitoring, by the terminal device, a corresponding physical downlink control channel in the paging message window based on the paging identifier; and receiving, by the terminal device, the paging message on a physical downlink shared channel indicated by the physical downlink control channel.

In a possible design, the receiving, by the terminal device, the paging message from the network device based on the paging identifier includes: obtaining, by the terminal device, configuration information of the paging message window of the paging message, where the configuration information of the paging message window includes a start location and/or a window size of the paging message window; and receiving, by the terminal device, the paging message from the network device in the paging message window based on the paging identifier.

In a possible design, the obtaining, by the terminal device, configuration information of the paging message window of the paging message includes: receiving, by the terminal device, the configuration information of the paging message window of the paging message from the network device; or obtaining, by the terminal device, preconfigured or prestored configuration information of the paging message window of the paging message; or determining, by the terminal device, the configuration information of the paging message window of the paging message based on at least one of the following information: a total quantity of paging occasions, a total quantity of paging messages, a total quantity of random access occasions, a subcarrier spacing, a service type, a carrier frequency, a total quantity of random access preambles, an index of a random access occasion corresponding to the random access preamble, a start time of the random access preamble, duration of the random access preamble, an end time of the random access preamble, time domain location information of a random access response window corresponding to the random access preamble, frequency domain location information of a random access response, and a total quantity of paging user groups.

The total quantity of paging occasions, the total quantity of paging messages, the total quantity of random access occasions, and the total quantity of random access preambles are quantities in the discontinuous reception cycle, and the discontinuous reception cycle includes, but is not limited to, a subframe, a slot, or an SS block.

In a possible design, before the sending, by a terminal device, a random access preamble to a network device, the method further includes: receiving, by the terminal device, a paging indication message from the network device, where a paging indication bit that is in the paging indication message and that is of a paging user group of the terminal device is a preset value; and/or receiving, by the terminal device, random access configuration information from the network device, where the random access configuration information is used to configure the random access preamble corresponding to each paging user group, and/or configure the paging user group of the terminal device; and/or receiving, by the terminal device, the paging identifier that is from the network device and that is associated with the random access preamble.

In a possible design, the random access preamble corresponding to the paging user group is a predefined or prestored random access preamble.

According to a third aspect, this application provides a paging method, including: receiving, by a network device, a random access preamble from a terminal device, where the random access preamble is associated with a paging user group of the terminal device, and the random access preamble is used to request a paging message; sending, by the network device, a random access response to the terminal device, where the random access response carries paging scheduling information and/or a paging identifier associated with the random access preamble, and the paging scheduling information includes at least one of frequency information, time information, a modulation and coding scheme, a reference signal, a subcarrier spacing, and downlink control information (DCI); and sending, by the network device, a paging message to the terminal device based on the paging scheduling information. The paging identifier may be an RNTI.

In a possible design, before the sending, by the network device, a random access response to the terminal device, the method further includes: sending, by the network device, a paging indication message to the terminal device, where a paging indication bit that is in the paging indication message and that is of a paging user group of the terminal device is a preset value; and/or sending, by the network device, random access configuration information to the terminal device, where the random access configuration information is used to configure a random access preamble corresponding to each paging user group.

According to a fourth aspect, this application provides a paging method, including: sending, by a terminal device, a random access preamble to a network device, where the random access preamble is associated with a paging user group of the terminal device; receiving, by the terminal device, a random access response from the network device, where the random access response carries paging scheduling information and/or a paging identifier associated with the random access preamble, and the paging scheduling information includes at least one of frequency information, a modulation and coding scheme, a reference signal, subcarrier spacing information, and DCI; and receiving, by the terminal device, a paging message from the network device based on the paging scheduling information.

In a possible design, before the sending, by a terminal device, a random access preamble to a network device, the method further includes: receiving, by the terminal device, a paging indication message from the network device, where a paging indication bit that is carried in the paging indication message and that is of the paging user group of the terminal device is a preset value; and/or receiving, by the terminal device, random access configuration information from the network device, where the random access configuration information is used to configure a random access preamble corresponding to each paging user group.

In a possible design, the method further includes: when the random access preamble needs to be retransmitted, if a retransmission quantity reaches a maximum retransmission quantity (maximum number of preamble transmission) associated with the random access preamble or a maximum retransmission quantity associated with the paging message, stopping retransmission; or if the terminal device reaches a next DRX cycle, stopping retransmission; or if the paging message received by the terminal device carries no identifier of the terminal device, stopping retransmission.

According to a fifth aspect, this application provides a communication timing method, including: receiving, by a network device, a random access preamble from a terminal device; determining, by the network device, a format of a timing advance command (TAC) and/or a scale factor of a TA timing advance based on a format of the random access preamble; and sending, by the network device to the terminal device, a random access response carrying the TAC and/or the scale factor.

The scale factor may also be referred to as a step size (or scale factor). The scale factor may alternatively be sent by the network device by using radio resource control (RRC) signaling, media access control-control element (MAC CE) signaling, system information (SI), downlink control information (DCI), or the like, or is determined based on indication information carried in any one of the foregoing.

In a possible design, in an initial uplink synchronization process, the scale factor and a length of the TAC are related to one or more pieces of the following information: a subcarrier spacing (SCS), a carrier frequency (or frequency band), a format of the random access preamble (preamble format), a frame structure, a bandwidth, a service type, a total quantity of random access preambles (or ROs/total number of ROs/preambles).

In an uplink synchronization update process, the scale factor and the length of the TAC are related to one or more pieces of the following information: a subcarrier spacing, a carrier frequency, a format of the random access preamble, a frame structure, a bandwidth, a service type, and a total quantity of random access preambles.

In a possible design, the length of the TAC increases along with a length of the random access preamble. For example, when a sequence length of the random access preamble is 839, the length of the TAC is 11 bits; when the sequence length of the random access preamble is 31, 63, 71, 127, or 139, the length of the TAC is less than 11 bits, and the length of the TAC may be any length between 1 bit and 11 bits.

In a possible design, the scale factor increases along with the length of the random access preamble. For example, when the sequence length of the random access preamble is 839, a value of the scale factor is 16; when the sequence length of the random access preamble is 31, 63, 71, 127, or 139, the value of the scale factor is less than 16, and the scale factor may be 0.25, 0.5, 1, 2, 4, or 8.

According to a sixth aspect, this application provides a communication timing method, including: receiving, by a terminal device, a TAC from a network device, and obtaining, by the terminal device, a scale factor; determining, by the terminal device, a timing advance and/or determining a timing advance offset based on at least one of the TAC from the network device, the obtained scale factor, a format of a currently used random access preamble, a frame structure, a total quantity of random access preambles, a currently used basic time unit, a currently used sampling point quantity, a currently used carrier frequency, a current service type, a currently used subcarrier spacing, a currently used subcarrier index, a maximum subcarrier spacing, a maximum sampling point quantity, and a currently used offset factor; and sending, by the terminal device, uplink data based on the timing advance and the timing advance offset.

During implementation of this embodiment of the present invention, the length of the TAC is adjusted based on the sequence length of the random access preamble, to reduce overheads of transmitting a random access response, and a representation form of the timing advance is changed in different scenarios, to improve precision of the transmission timing advance of UE.

In a possible design, the receiving, by a terminal device, a TAC from a network device includes: sending, by the terminal device, a random access preamble to the network device, and receiving, by the terminal device, a random access response that is sent by the network device and that carries the TAC.

In a possible design, the terminal device receives the TAC sent by the network device by using signaling, for example, the network device sends the TAC by using signaling such as RRC signaling, MAC-CE signaling, SI, or DCI.

In a possible design, the obtaining, by the terminal device, a scale factor includes: receiving, by the terminal device, the scale factor from the network device; or obtaining, by the terminal device, a prestored or preconfigured scale factor; or determining, by the terminal device, the scale factor based on a length of the random access preamble. A value of the scale factor increases along with the random access preamble. For example, when the sequence length of the random access preamble is 839, the value of the scale factor is 16; when the sequence length of the random access preamble is 31, 63, 71, 127, or 139, the value of the scale factor is less than 16, and the scale factor may be 0.25, 0.5, 1, 2, 4, or 8.

According to a seventh aspect, this application provides a paging apparatus. The apparatus has a function of implementing behavior of the network device in the foregoing method. The function may be implemented by hardware, or may be implemented by hardware executing corresponding software. The hardware or software includes one or more modules corresponding to the foregoing function.

In a possible implementation, the apparatus includes: a receiving unit, a processing unit, and a sending unit. The receiving unit is configured to receive a random access preamble from a terminal device, where the random access preamble is used to request a paging message. The processing unit is configured to obtain a paging identifier associated with the random access preamble. The sending unit is configured to send a paging message to the terminal device based on the paging identifier.

In another possible implementation, the apparatus includes: a receiver, a transmitter, a memory, and a processor. The memory is configured to store a segment of program code.

The receiver is configured to receive a random access preamble from a terminal device, where the random access preamble is used to request a paging message. The processor is configured to invoke the program code stored by the memory to perform the following operation: obtaining a paging identifier associated with the random access preamble. The transmitter is configured to send a paging message to the terminal device based on the paging identifier.

In a possible implementation, the apparatus may be a chip, and the chip may optionally include one or more memories, configured to store program code. When the program code is executed, the processor is enabled to perform a corresponding function.

Based on a same inventive concept, for a problem resolving principle and beneficial effects of the apparatus, refer to the foregoing possible method implementations of the network device and their beneficial effects. Therefore, for implementation of the apparatus, refer to the implementation of the method, and repetitions are not described again.

According to an eighth aspect, this application provides a paging apparatus. The apparatus has a function of implementing behavior of the terminal device in the foregoing method. The function may be implemented by hardware, or may be implemented by hardware executing corresponding software. The hardware or software includes one or more modules corresponding to the foregoing function.

In a possible implementation, the apparatus includes: a sending unit, a processing unit, and a receiving unit.

The sending unit is configured to send a random access preamble to a network device, where the random access preamble is used to request a paging message corresponding to a paging user group of the apparatus. The processing unit is configured to obtain a paging identifier associated with the random access preamble. The receiving unit is configured to receive a paging message from the network device based on the paging identifier.

In another possible implementation, the apparatus includes: a receiver, a transmitter, a memory, and a processor. The memory stores a set of program code.

The transmitter is configured to send a random access preamble to a network device, where the random access preamble is used to request a paging message corresponding to a paging user group of the apparatus.

The processor is configured to invoke the program code stored by the memory to perform the following operation: obtaining a paging identifier associated with the random access preamble.

The receiver is configured to receive a paging message from the network device based on the paging identifier.

Based on a same inventive concept, for a problem resolving principle and beneficial effects of the apparatus, refer to the foregoing possible method implementations of the terminal device and their beneficial effects. Therefore, for implementation of the apparatus, refer to the implementation of the method, and repetitions are not described again.

According to a ninth aspect, this application provides a paging apparatus. The apparatus has a function of implementing behavior of the network device in the foregoing method. The function may be implemented by hardware, or may be implemented by hardware executing corresponding software. The hardware or software includes one or more modules corresponding to the foregoing function.

In a possible implementation, the apparatus includes: a receiving unit and a sending unit. The receiving unit is configured to receive a random access preamble from a terminal device, where the random access preamble is associated with a paging user group of the terminal device, and the random access preamble is used to request a paging message. The sending unit is configured to send a random access response to the terminal device, where the random access response carries paging scheduling information and/or a paging identifier associated with the random access preamble, and the paging scheduling information includes at least one of frequency information, time information, a modulation and coding scheme, a reference signal, a subcarrier spacing, and downlink control information. The sending unit is further configured to send a paging message to the terminal device based on the paging scheduling information.

In another possible implementation, the apparatus includes: a receiver, a transmitter, a memory, and a processor. The memory is configured to store a segment of program code.

The receiver is configured to receive a random access preamble from a terminal device, where the random access preamble is associated with a paging user group of the terminal device, and the random access preamble is used to request a paging message. The transmitter is configured to send a random access response to the terminal device, where the random access response carries paging scheduling information and/or a paging identifier associated with the random access preamble, and the paging scheduling information includes at least one of frequency information, time information, a modulation and coding scheme, a reference signal, a subcarrier spacing, and downlink control information (DCI). The transmitter is further configured to send a paging message to the terminal device based on the paging scheduling information.

Based on a same inventive concept, for a problem resolving principle and beneficial effects of the apparatus, refer to the foregoing possible method implementations of the network device and their beneficial effects. Therefore, for implementation of the apparatus, refer to the implementation of the method, and repetitions are not described again.

According to a tenth aspect, this application provides a paging apparatus. The apparatus has a function of implementing behavior of the terminal device in the foregoing method. The function may be implemented by hardware, or may be implemented by hardware executing corresponding software. The hardware or software includes one or more modules corresponding to the foregoing function.

In a possible implementation, the apparatus includes: a sending unit and a receiving unit.

The sending unit is configured to send a random access preamble to a network device, where the random access preamble is associated with a paging user group of the apparatus. The receiving unit is configured to receive a random access response from the network device, where the random access response carries paging scheduling information and/or a paging identifier associated with the random access preamble, the paging scheduling information includes at least one of frequency information, a modulation and coding scheme, a reference signal, subcarrier spacing information, and DCI. The receiving unit is further configured to receive a paging message from the network device based on the paging scheduling information.

In another possible implementation, the apparatus includes: a receiver, a transmitter, a memory, and a processor. The memory stores a set of program code.

The transmitter is configured to send a random access preamble to a network device, where the random access preamble is associated with a paging user group of the apparatus. The receiver is configured to receive a random access response from the network device, where the random access response carries paging scheduling information and/or a paging identifier associated with the random access preamble, the paging scheduling information includes at least one of frequency information, a modulation and coding scheme, a reference signal, subcarrier spacing information, and DCI. The receiver is further configured to receive a paging message from the network device based on the paging scheduling information.

Based on a same inventive concept, for a problem resolving principle and beneficial effects of the apparatus, refer to the foregoing possible method implementations of the terminal device and their beneficial effects. Therefore, for implementation of the apparatus, refer to the implementation of the method, and repetitions are not described again.

According to an eleventh aspect, this application provides a communication timing apparatus. The apparatus has a function of implementing behavior of the network device in the foregoing method. The function may be implemented by hardware, or may be implemented by hardware executing corresponding software. The hardware or software includes one or more modules corresponding to the foregoing function.

In a possible implementation, the apparatus includes: a receiving unit, a processing unit, and a sending unit. The receiving unit is configured to receive a random access preamble from a terminal device. The processing unit is configured to determine a format of a TAC and/or a scale factor of a timing advance based on a format of the random access preamble. The sending unit is configured to send, to the terminal device, a random access response carrying the TAC and/or the scale factor.

In another possible implementation, the apparatus includes: a receiver, a transmitter, a memory, and a processor. The memory is configured to store a segment of program code.

The receiver is configured to receive a random access preamble from a terminal device. The processor is configured to invoke the program code stored by the memory to perform the following operation: determining a format of a TAC and/or a scale factor of a timing advance based on a format of the random access preamble. The transmitter is configured to send, to the terminal device, a random access response carrying the TAC and/or the scale factor.

In another possible implementation, the apparatus may be a chip, and the chip may optionally include one or more memories, configured to store program code. When the program code is executed, the processor is enabled to perform a corresponding function.

Based on a same inventive concept, for a problem resolving principle and beneficial effects of the apparatus, refer to the foregoing possible method implementations of the network device and their beneficial effects. Therefore, for implementation of the apparatus, refer to the implementation of the method, and repetitions are not described again.

According to a twelfth aspect, this application provides a communication timing apparatus. The apparatus has a function of implementing behavior of the terminal device in the foregoing method. The function may be implemented by hardware, or may be implemented by hardware executing corresponding software. The hardware or software includes one or more modules corresponding to the foregoing function.

In a possible implementation, the apparatus includes: a receiving unit, a processing unit, and a sending unit.

The receiving unit is configured to receive a TAC timing advance command from a network device. The processing unit is configured to obtain a scale factor and determine a timing advance and/or determine a timing advance offset based on at least one of the TAC from the network device, the obtained scale factor, a currently used basic time unit, a currently used sampling point quantity, a currently used carrier frequency, a current service type, a currently used subcarrier spacing, a currently used subcarrier index, a maximum subcarrier spacing, a maximum sampling point quantity, and a currently used offset factor. The sending unit is configured to send uplink data based on the timing advance and the timing advance offset.

In another possible implementation, the apparatus includes: a receiver, a transmitter, a memory, and a processor. The memory stores a set of program code.

The receiver is configured to receive a TAC timing advance command from a network device. The processor is configured to invoke the program code stored by the memory to perform the following operations: obtaining a scale factor and determining a timing advance and/or determining a timing advance offset based on at least one of the TAC from the network device, the obtained scale factor, a currently used basic time unit, a currently used sampling point quantity, a currently used carrier frequency, a current service type, a currently used subcarrier spacing, a currently used subcarrier index, a maximum subcarrier spacing, a maximum sampling point quantity, and a currently used offset factor. The transmitter is configured to send uplink data based on the timing advance and the timing advance offset.

Based on a same inventive concept, for a problem resolving principle and beneficial effects of the apparatus, refer to the foregoing possible method implementations of the terminal device and their beneficial effects. Therefore, for implementation of the apparatus, refer to the implementation of the method, and repetitions are not described again.

According to a thirteenth aspect, this application provides a communication timing method, including: receiving, by a terminal device, a signaling message from a network device, where the signaling message includes indication information and a TAC timing advance command, the indication information is N1 bits, the TAC is N2 bits, different values of the indication information correspond to different scale factors, and N1 and N2 are integers greater than or equal to 1; and determining, by the terminal device, a transmission timing adjustment based on a value of the TAC and a scale factor corresponding to a value of the indication information.

In a possible design, N1=1, 2, or 3, and N2=3, 4, 5, 6, 7, or 8.

In a possible design, N1=1, 2, or 3, and N1+N2=6.

In a possible design, N1=1; and when the value of the indication information is equal to 0, the scale factor corresponding to the value of the indication information is related to a maximum subcarrier spacing in a timing advance group TAG associated with the terminal device; or when the value of the indication information is equal to 1, the scale factor corresponding to the value of the indication information is related to a minimum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a maximum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the value of the indication information is related to a minimum subcarrier spacing in a TAG associated with the terminal device.

In a possible design, N1=1; and when the value of the indication information is equal to 0, the value of the indication information is a prestored or preconfigured fixed value; or when the value of the indication information is equal to 1, the value of the indication information is related to a maximum subcarrier spacing in a TAG associated with the terminal device.

In a possible design, N1=1; and when the value of the indication information is equal to 0, the value of the indication information is a prestored or preconfigured fixed value; or when the value of the indication information is equal to 1, the value of the indication information is related to a minimum subcarrier spacing in a TAG associated with the terminal device.

In a possible design, N1=1; and when the value of the indication information is equal to 0, the value of the indication information is a prestored or preconfigured first fixed value; or when the value of the indication information is equal to 1, the value of the indication information is a prestored or preconfigured second fixed value.

In a possible design, the signaling message includes a MAC CE, and the signaling message further includes a timing advance group index TAG index.

According to a fourteenth aspect, this application provides a data sending method, including: determining, by a network device, a value of indication information and a value of a TAC, where the indication information is N1 bits, the TAC is N2 bits, different values of the indication information correspond to different scale factors, and N1 and N2 are integers greater than or equal to 1; and sending, by the network device to a terminal device, a signaling message carrying the indication information and the TAC.

In a possible design, N1=1, 2, or 3, and N2=3, 4, 5, 6, 7, or 8.

In a possible design, N1=1; and when the value of the indication information is equal to 0, the scale factor corresponding to the value of the indication information is related to a maximum subcarrier spacing in a timing advance group TAG associated with the terminal device; or when the value of the indication information is equal to 1, the scale factor corresponding to the value of the indication information is related to a minimum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a maximum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the value of the indication information is related to a minimum subcarrier spacing in a TAG associated with the terminal device.

In a possible design, N1=1; and when the value of the indication information is equal to 0, the value of the indication information is a prestored or preconfigured fixed value; or when the value of the indication information is equal to 1, the value of the indication information is related to a maximum subcarrier spacing in a TAG associated with the terminal device.

In a possible design, N1=1; and when the value of the indication information is equal to 0, the value of the indication information is a prestored or preconfigured fixed value; or when the value of the indication information is equal to 1, the value of the indication information is related to a minimum subcarrier spacing in a TAG associated with the terminal device.

In a possible design, N1=1; and when the value of the indication information is equal to 0, the value of the indication information is a prestored or preconfigured first fixed value; or when the value of the indication information is equal to 1, the value of the indication information is a prestored or preconfigured second fixed value.

In a possible design, the signaling message includes a MAC CE, and the signaling message further includes a timing advance group index TAG index.

According to a fifteenth aspect, this application provides a data receiving apparatus.

In a possible design, N1=1, 2, or 3, and N2=3, 4, 5, 6, 7, or 8.

In a possible design, N1=1; and when a value of indication information is equal to 0, a scale factor corresponding to the value of the indication information is related to a maximum subcarrier spacing in a timing advance group TAG associated with a terminal device; or when a value of indication information is equal to 1, a scale factor corresponding to the value of the indication information is related to a minimum subcarrier spacing in a TAG associated with a terminal device.

In a possible design, N1=1; and when a value of indication information is equal to 1, a scale factor corresponding to the value of the indication information is a prestored or preconfigured fixed value; or when a value of indication information is equal to 0, a scale factor corresponding to the value of the indication information is related to a maximum subcarrier spacing in a TAG associated with a terminal device.

In a possible design, N1=1; and when a value of indication information is equal to 1, a scale factor corresponding to the value of the indication information is a prestored or preconfigured fixed value; or when a value of indication information is equal to 0, a scale factor corresponding to the value of the indication information is related to a minimum subcarrier spacing in a TAG associated with a terminal device.

In a possible design, N1=1; and when a value of indication information is equal to 0, a scale factor corresponding to the value of the indication information is a prestored or preconfigured fixed value; or when a value of indication information is equal to 1, a scale factor corresponding to the value of the indication information is related to a maximum subcarrier spacing in a TAG associated with a terminal device.

In a possible design, N1=1; and when a value of indication information is equal to 0, a scale factor corresponding to the value of the indication information is a prestored or preconfigured fixed value; or when a value of indication information is equal to 1, a scale factor corresponding to the value of the indication information is related to a minimum subcarrier spacing in a TAG associated with a terminal device.

In a possible design, N1=1; and when a value of indication information is equal to 0, a scale factor corresponding to the value of the indication information is a prestored or preconfigured first fixed value; or when a value of indication information is equal to 1, a scale factor corresponding to the value of the indication information is a prestored or preconfigured second fixed value.

In a possible design, a signaling message includes a MAC CE or DCI, and the signaling message further includes a timing advance group index TAG index.

According to a sixteenth aspect, this application provides a data sending apparatus, including: a determining unit, configured to determine a value of indication information and a value of a TAC, where the indication information is N1 bits, the TAC is N2 bits, different values of the indication information correspond to different scale factors, and N1 and N2 are integers greater than or equal to 1; and a sending unit, configured to send, to a terminal device, a signaling message carrying the indication information and the TAC.

In a possible design, N1=1, 2, or 3, and N2=3, 4, 5, 6, 7, or 8.

In a possible design, N1=1; and when the value of the indication information is equal to 0, the scale factor corresponding to the value of the indication information is related to a maximum subcarrier spacing in a timing advance group TAG associated with the terminal device; or when the value of the indication information is equal to 1, the scale factor corresponding to the value of the indication information is related to a minimum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a maximum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a maximum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured first fixed value; or when the value of the indication information is equal to 1, the scale factor corresponding to the value of the indication information is a prestored or preconfigured second fixed value.

In a possible design, the signaling message includes a MAC CE or DCI, and the signaling message further includes a timing advance group index TAG index.

According to another aspect, this application provides an apparatus. The apparatus includes: a receiver, a transmitter, a memory, and a processor, where the memory stores a set of program code, and the processor invokes the program code to perform the methods according to the thirteenth aspect and the fourteenth aspect.

According to another aspect, this application provides a computer-readable storage medium. The computer-readable storage medium stores an instruction. When the instruction is run on a computer, the computer is enabled to perform the methods according to the foregoing aspects.

According to another aspect, this application provides a computer program product including an instruction. When the computer program product is run on a computer, the computer is enabled to perform the methods according to the foregoing aspects.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

Figure 1A:
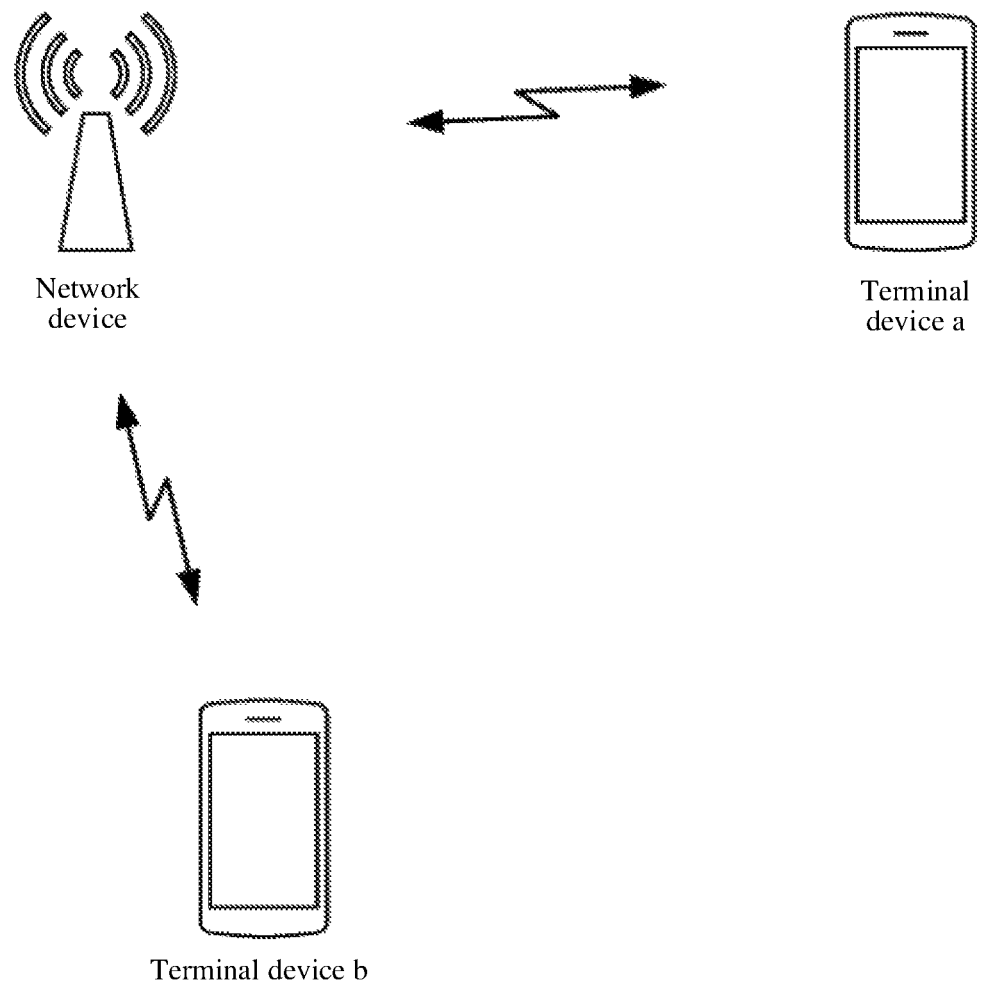
FIG. 1a is a network architecture diagram according to an embodiment of the present invention.

FIG. 1a is a schematic architectural diagram of a communications system according to an embodiment of the present invention. The communications system includes a plurality of base stations and a plurality of terminal devices. FIG. 1a shows that one network device communicates with two terminal devices. The communications system may be a global system for mobile communications (GSM), a code division multiple access (CDMA) system, and a wideband code division multiple access (WCDMA) system, a worldwide interoperability for microwave access (WiMAX) system, a long term evolution (LTE) system, a 5G communications system (for example, a new radio (NR)) system, a communications system that integrates a plurality of communications technologies (for example, a communications system integrating an LTE technology and an NR technology), or a subsequent evolved communications system. It should be noted that in FIG. 1a, quantities and forms of network devices and base station devices are only an example for description, and constitute no limitation on the embodiments of the present invention.

Figure 1B:
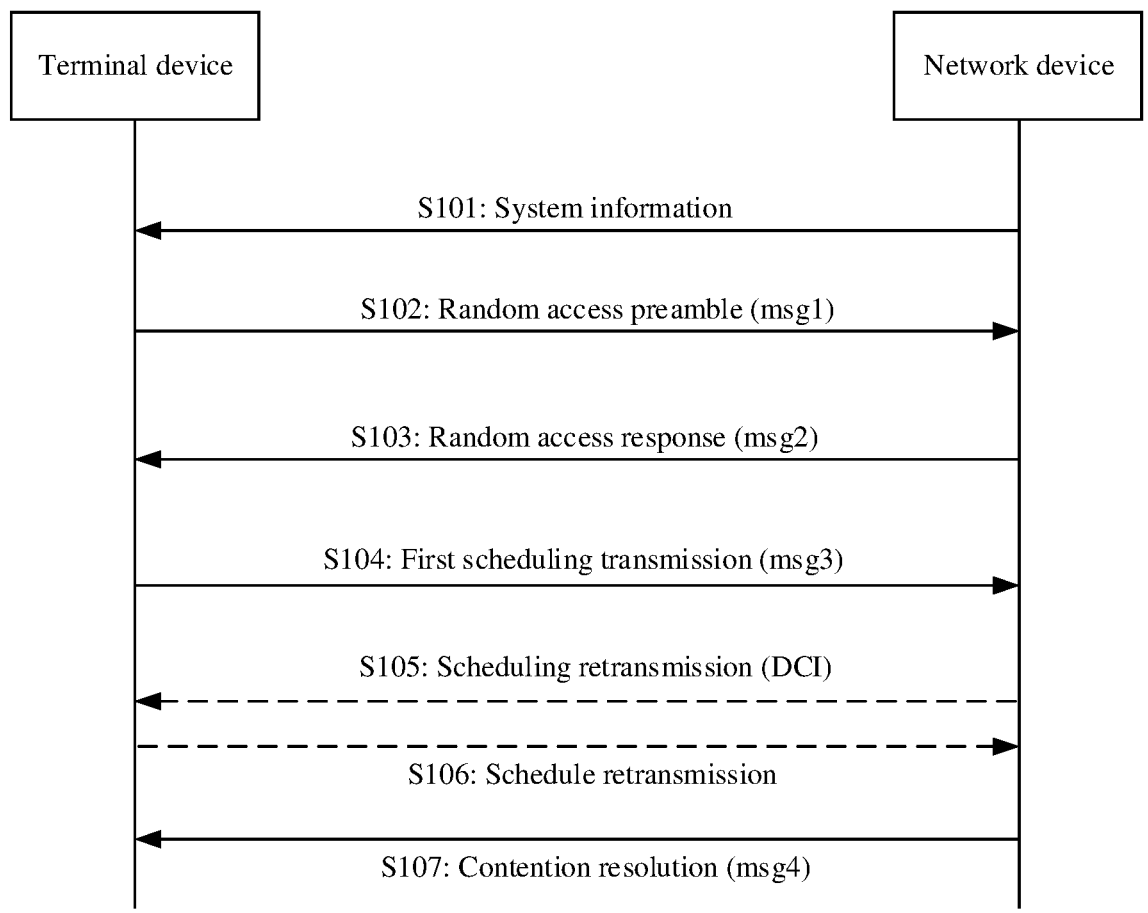
FIG. 1b is a schematic flowchart of a random access process in LTE.

FIG. 1b is a schematic flowchart of a random access process in LTE. The random access process includes the following steps:

S101: A network device sends system information to a terminal device, and the terminal device receives the system information sent by the network device, where the system message may carry a parameter such as a maximum retransmission quantity. S102: The terminal device sends a random access preamble (msg1, a message 1) to the network device, and the network device receives the random access preamble sent by the terminal device. S103: The network device sends a random access response (msg2) to the terminal device, and the terminal device receives the random access response sent by the network device, where the random access response includes a random preamble index and an uplink scheduling grant (UL grant). S104: The terminal device sends a message 3 (msg3) for a first scheduling transmission to the network device, and the network device receives the message 3 for the first scheduling transmission that is sent by the terminal device, where the terminal device sends the message 3 (msg3) for scheduling transmission based on a time domain location and a frequency domain location indicated by the uplink scheduling grant; and if the network device correctly receives the message 3, the network device sends a message 4 (msg4) to the terminal device to resolve a conflict, where the conflict means that a plurality of users initiate a random access process by using a same uplink resource, but the network device considers that only one user initiates random access. S105: The network device sends a scheduling retransmission to the terminal device, where the scheduling retransmission is sent by using DCI (downlink control information). S106: The terminal device sends a scheduling transmission retransmission to the network device. S107: The network device sends a contention resolution (msg4, the message 4) to the terminal device.

In a random access process of LTE, user equipment sends a random access preamble (message 1) to a base station, and the base station estimates a timing advance (TA) based on the random access preamble. After sending the random access preamble, the UE monitors a PDCCH in a time interval by using an RA-RNTI and receives a random access response (message 2) sent by the base station. The time interval is a random access response window. A start time of the random access response window is a time three milliseconds after a time T at which the random access preamble is sent, that is, the start time is millisecond T+3. A window size of the random access response window may be configured by using SI and notified by the base station to the UE.

Figure 1C:
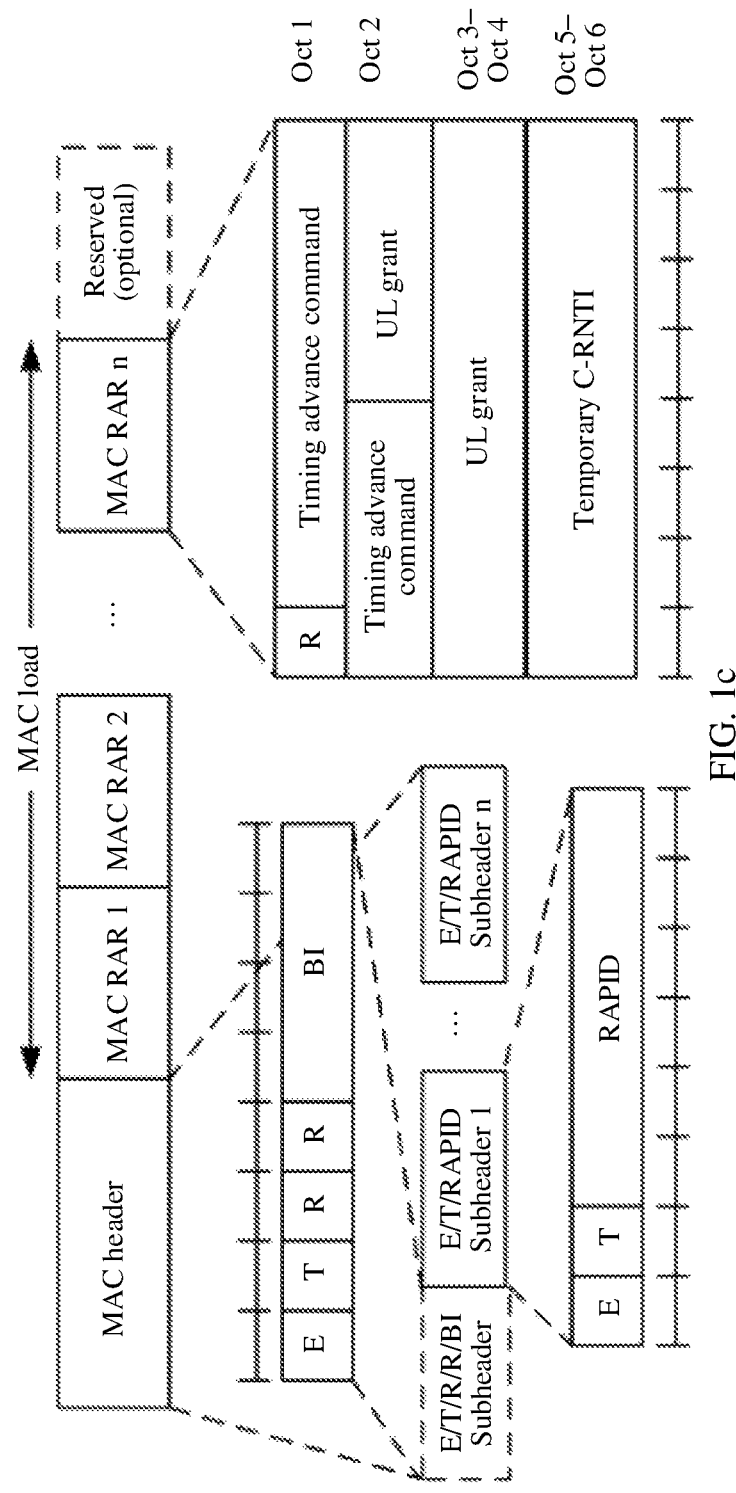
FIG. 1c is a schematic diagram of a message structure of a random access response in LTE.

A structure of a MAC PDU (Protocol data unit) of the random access response is shown in FIG. 1c. The MAC PDU includes two parts: a MAC header and a MAC load. The MAC header includes a plurality of subheaders, a length of each subheader is one byte, one of the plurality of subheaders carries common information and another subheader is an RAR subheader, and the RAR subheader carries configuration information of a MAC RAR (random access response). The MAC load includes a plurality of MAC RARs (MAC RAR1 to MAC RARn). The RAR subheader in the MAC header and the MAC RAR in the MAC load are in a one-to-one correspondence. The RAR subheader includes three fields. The first two fields are used to indicate a type of the RAR subheader and a reserved field, and a length of the last field is six bits, used to indicate a random access preamble index (RAPID). The MAC RAR includes four fields: one reserved bit (R), a timing advance command (TAC), an uplink scheduling grant (uplink grant, UL grant), and a temporary cell radio network temporary identifier (TC-RNTI).

The random access response is sent on a physical downlink shared channel (PDSCH), and DCI related to the PDSCH is sent on a physical downlink control channel (PDCCH). A PDCCH corresponding to the random access response is scrambled by using an RA-RNTI.

It should be noted that for ease of description, the random access preamble, and the preamble all indicate a same concept in this application.

Figure 1D:
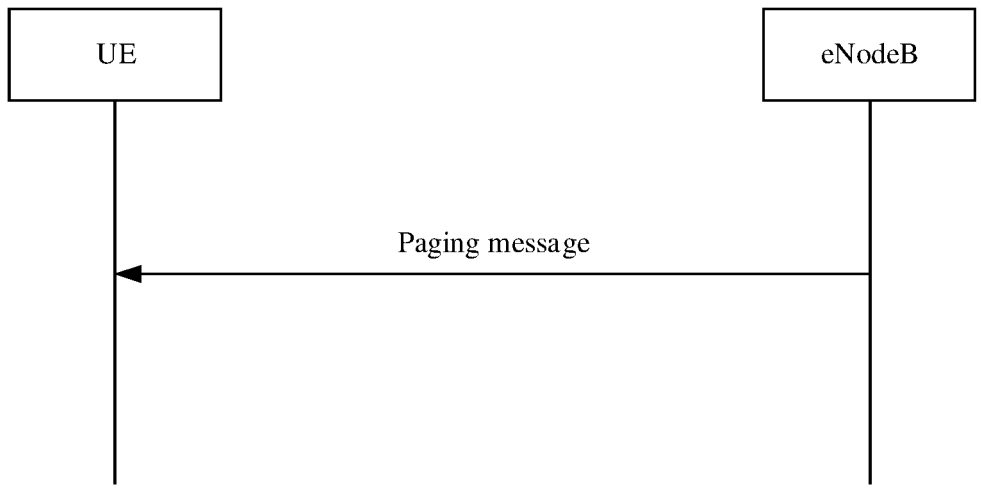
FIG. 1d is a schematic flowchart of a paging process in LTE.

FIG. 1d shows a paging process in an LTE system. A base station (eNodeB) sends a paging message in a broadcast manner. One paging message is used to page a group of user equipments (UEs), and the paging message includes information about one or more paged UEs, for example, UE IDs. The base station determines a sending time of the paging message based on information such as a UE ID and a quantity of POs. The UE determines a PO of the paging message. The paging message is sent on a PDSCH, and DCI related to the PDSCH is sent on a PDCCH. A PDCCH corresponding to the paging message is identified by a paging radio network temporary identifier (P-RNTI). In an LTE system, the P-RNTI is a fixed value FFFE (hexadecimal) and has a length of 16 bits.

In an NR system, because of existence of a plurality of beams and beam directivity, a paging message needs to be sent by using a beam. If all paging messages are sent on each beam, excessive overheads are caused. How to page in NR is a focus of current research.

In this application, the terminal device is a device with a wireless communication function, and may be a handheld device, a vehicle-mounted device, a wearable device, or a computing device that has a wireless communication function, or another processing device connected to a wireless modem, or the like. The terminal device may have different names in different networks, for example, user equipment, an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless phone, a session initiation protocol (SIP) phone, a wireless local loop (WLL) station, a personal digital assistant (PDA), or a terminal device in a 5G network or a future evolved network.

In this application, the base station may also be referred to as a base station device, is a device deployed in a radio access network to provide a wireless communication function, and includes, but is not limited to: a base station (for example, a BTS (BTS), a NodeB (NB), an evolved NodeB (eNB, or eNodeB)), a transmission node or a transmission reception point (TRP, or TP) or a next-generation NodeB (generation NodeB, gNB) in an NR system, a base station or a network device in a future communications network), a relay node, an access point, a vehicle-mounted device, a wearable device, a station of wireless fidelity (Wireless-Fidelity, Wi-Fi), a wireless backhaul node, a small cell, a micro base station, or the like.

Figure 2A:
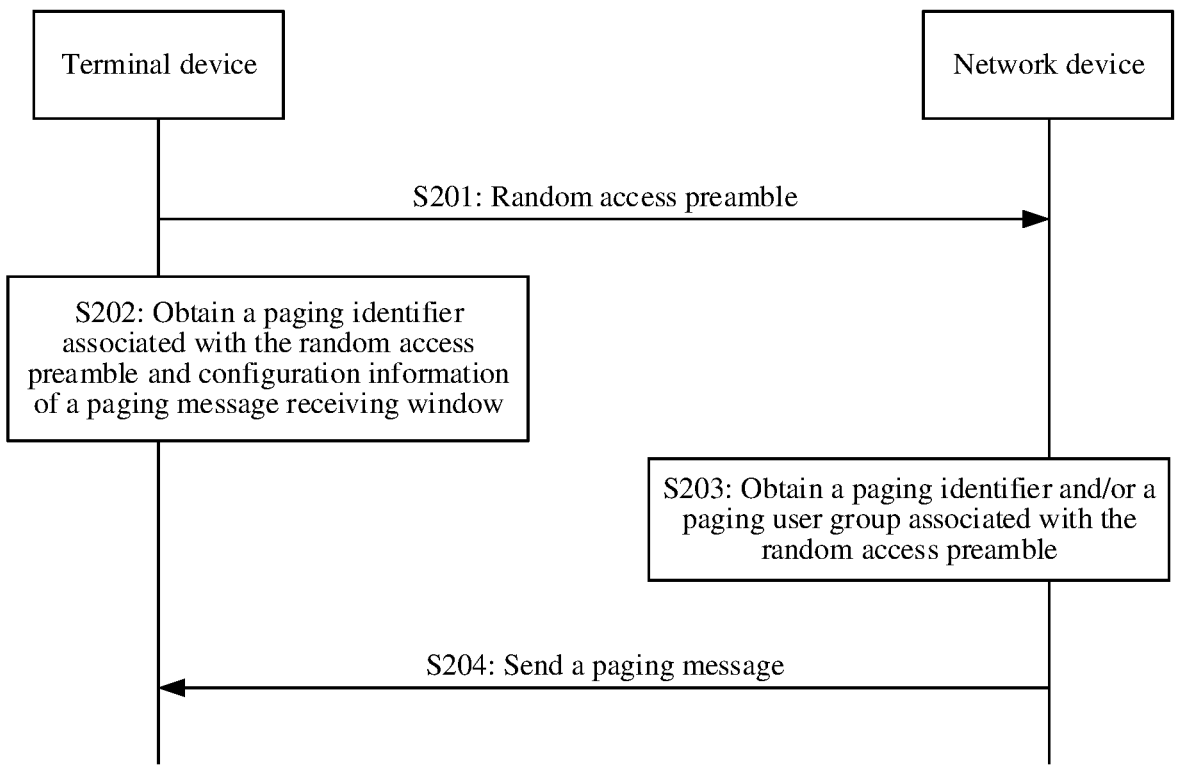
FIG. 2a is a schematic flowchart of a paging method according to an embodiment of the present invention.

FIG. 2a is a schematic flowchart of a paging method according to an embodiment of the present invention. The method includes, but is not limited to, the following steps.

S201: A terminal device sends a random access preamble to a network device, and the network device receives the random access preamble from the terminal device.

Figure 2B:
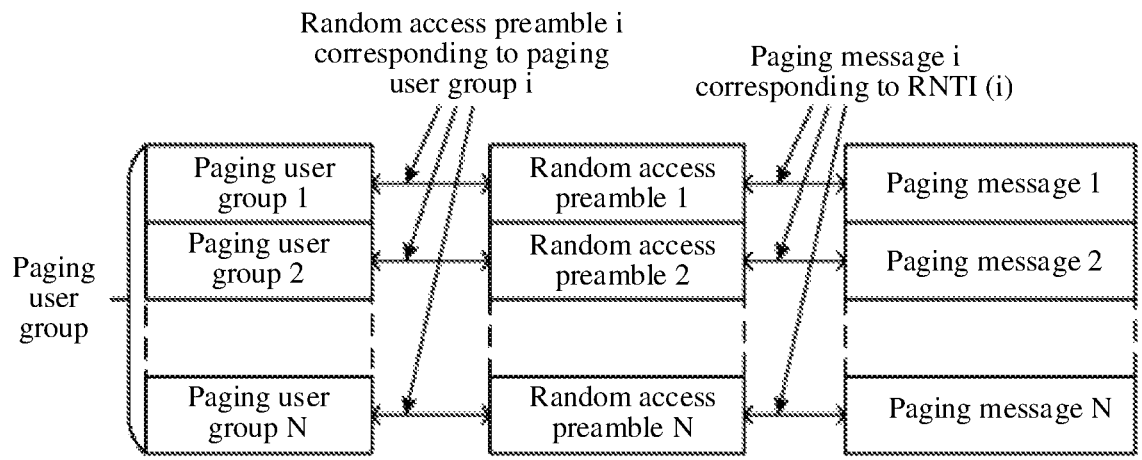
FIG. 2b is a schematic diagram of a mapping relationship between a paging user group, a random access preamble, and a paging message according to an embodiment of the present invention.

Specifically, as shown in FIG. 2b, terminal devices on a same PO are grouped into n paging user groups in advance, where n is an integer greater than 0, each paging user group includes at least one terminal device, and a grouping rule is not limited in this embodiment. For example, terminal devices on a same PO are grouped based on UE IDs. Both the terminal device and the network device can store group information of N paging user groups. Each of the N paging user groups corresponds to one paging indication bit, one random access preamble (random access preamble index), and a paging message. Different values of the paging indication bit indicate whether a terminal device in the paging user group is paged. For example, when the paging indication bit is equal to 1, it indicates that at least one terminal device in the paging user group needs to be paged. When the paging indication bit is equal to 0, it indicates that no terminal device in the paging user group needs to be paged. Different paging user groups correspond to different random access preambles, and the random access preamble corresponding to the paging user group is used to trigger a paging procedure.

The terminal device determines the paging user group and the random access preamble corresponding to the paging user group. The terminal device sends the random access preamble to the network device, and the network device receives the random access preamble from the terminal device.

In a possible design, before the network device receives the random access preamble from the terminal device, the method further includes the following.

The network device sends a paging indication message to the terminal device, where a paging indication bit that is carried by the paging indication message and that is of the paging user group of the terminal device is a preset value.

Specifically, when the network device needs to page the terminal device, the network device determines the paging user group of the terminal device, and sends the paging indication message to the terminal device, where the paging indication bit that is carried by the paging indication message and that is of the paging user group of the terminal device is the preset value. The terminal device receives the paging indication message from the network device, and when determining that the paging indication bit of the paging user group is the preset value, the terminal device sends the random access preamble corresponding to the paging user group to the network device.

When the paging indication bit is the preset value, the terminal device or a terminal device in the associated paging user group sends the random access preamble to the network device. The paging indication message may be carried in information such as DCI, RMSI, an NR-SIB1, an NR-SIB2, a system message, or a PDSCH of the paging indication message. When the DCI is used to carry the paging indication message or the DCI indicates the PDSCH of the paging indication message, the DCI of the paging indication message needs to be scrambled by using a radio network temporary identifier (RNTI). The RNTI may be a radio network temporary identifier specially used for scrambling the DCI, to be distinguished from a radio network temporary identifier corresponding to another message. In an implementation, an RNTI corresponding to the paging indication message is different from that corresponding to the paging message. In another implementation, the RNTI corresponding to the paging indication message is the same as that corresponding to the paging message. For example, the paging indication message and the paging message are sent at different time points and/or frequencies. For another example, 1-bit indication information in the DCI is used to indicate that the DCI is one of the foregoing two types. For another example, information or a reference signal on the PDCCH corresponding to the DCI is used to indicate that the DCI is one of the foregoing two types.

For example, three paging user groups are obtained through grouping in advance: a paging user group 1, a paging user group 2, and a paging user group 3. The paging user group 1 includes UE 11 and UE 12, the paging user group 2 includes UE 21 and UE 22, and the paging user group 3 includes UE31 and UE 32. When the network device needs to page the UE 11, the network device sends a paging indication message to the three paging user groups, where the paging indication message carries paging indication bits of the three paging user groups. It is assumed that the preset value is 0, a value of the paging indication bit of the paging user group 1 is 1, a value of the paging indication bit of the paging user group 2 is 0, and a value of the paging indication bit of the paging user group 3 is 0. For another example, the paging indication message carries three bits that separately indicate the paging indication bits of the three paging user groups. For example, when a preset value of a first bit of the paging indication message is 1, it indicates that a user in a first group is paged, and the user in the first group sends the random access preamble to the network device. When a preset value of a second bit of the paging indication message is 1, it indicates that a user in a second group is paged, and the user in the second group sends the random access preamble to the network device. When a preset value of a third bit of the paging indication message is 1, it indicates that a user in a third group is paged, and the user in the third group sends the random access preamble to the network device. For another example, the paging indication message carries three bits that separately indicate the paging indication bits of the three paging user groups. For example, the preset value of the first bit of the paging indication message is 0, it indicates that the user in the first group is paged, and the user in the first group sends the random access preamble to the network device. When the preset value of the second bit of the paging indication message is 0, it indicates that the user in the second group is paged, and the user in the second group sends the random access preamble to the network device. When the preset value of the third bit of the paging indication message is 0, it indicates that the user in the third group is paged, and the user in the third group sends the random access preamble to the network device. For another example, paging indications of all user groups may use a same preset value.

In a possible design, before the network device receives the random access preamble from the terminal device, the method further includes the following: The network device sends configuration information of the paging message to the terminal device.

Specifically, the configuration information may include information such as a length of the paging occasion, a quantity of paging occasions, a time length of a discontinuous reception (DRX) cycle, and a location of the PO. When paging messages on one or more POs or a control resource of the paging message or a control resource of a paging indication is time division multiplexed or frequency division multiplexed with a synchronization signal block (synchronization signal block, SS block), and one or more values may be configured in the configuration information, where the value is used to indicate an index of the paging occasion, or an index or a quantity of POs on which DCI and PDSCH are not transmitted together (for example, a part of DCI of paging indication message is frequency division multiplexed with a synchronization signal block, a PDSCH of the paging indication message is sent at another time frequency location that is predefined or that is configured by a base station, and another part of the DCI of the paging indication message and the synchronization signal block are separately sent at different time points and frequencies). A specific configuration method is mod(index, K)=m, where K indicates a quantity of POs in a synchronization signal burst set (SS burst set) period, and index indicates an index of the PO. The network device may configure m to indicate that the PO is multiplexed with the SS block. The paging occasion is a time interval, and indicates a location at which the network device sends the paging indication message and a location at which the terminal device receives the paging indication message. The configuration information may be predefined or prestored, or agreed on by the network device and the terminal device. Content that is agreed on is that when a frame number of the PO is the same as that of the SS block, DCI of the paging message and/or a PDSCH of the paging message may be frequency division multiplexed or time division multiplexed with the SS block. In a possible design, the network device sends the configuration information of the paging message by using a PBCH, RMSI, an NR-SIB1, RRC signaling, a MAC-CE, DCI, or a PDCCH-order. When the network device sends the configuration information of the paging message by using the RMSI, the terminal device first obtains information about the PBCH, and obtains, based on the information about the PBCH, a location of information related to the RMSI. When the network device sends the configuration information of the paging message by using the PBCH, the terminal device needs to obtain information about the PBCH. A frame location of the PBCH or the SS block or the SS burst set needs to be configured to obtain the information about the PBCH, and the frame location is related to a period of the PBCH or the SS burst set. For example, Mod(SFN, N)=k, where N is a quantity of frames in a period of the PBCH or the SS block or the SS burst set frame, and k is an integer from 0 to 15.

When T=5 ms or 10 ms, N may be set to 1 and k=0, and it indicates that each frame has an SS block or a PBCH.

When T=20 ms, N=2, Mod(SFN, N)=0 indicates that in the period of the SS burst set frame, a first frame has an SS block or a PBCH, and Mod(SFN, N)=1 indicates that in the period of the SS burst set frame, a second frame has an SS block or a PBCH.

When T=40 ms, N=4, Mod(SFN, N)=0 indicates that in the period of the SS burst set frame, the first frame has an SS block or a PBCH; Mod(SFN, N)=1 indicates that in the period of the SS burst set frame, the second frame has an SS block or a PBCH; Mod(SFN, N)=2 indicates that in the period of the SS burst set frame, a third frame has an SS block or a PBCH; and Mod(SFN, N)=3 indicates that in the period of the SS burst set frame, a fourth frame has an SS block or a PBCH.

When T=80 ms, N=8, Mod(SFN, N)=0 indicates that in the period of the SS burst set frame, the first frame has an SS block or a PBCH; Mod(SFN, N)=1 indicates that in the period of the SS burst set frame, the second frame has an SS block or a PBCH; Mod(SFN, N)=2 indicates that in the period of the SS burst set frame, the third frame has an SS block or a PBCH; Mod(SFN, N)=3 indicates that in the period of the SS burst set frame, the fourth frame has an SS block or a PBCH; Mod(SFN, N)=4 indicates that in the period of the SS burst set frame, a fifth frame has an SS block or a PBCH; Mod(SFN, N)=5 indicates that in the period of the SS burst set frame, a sixth frame has an SS block or a PBCH; Mod(SFN, N)=6 indicates that in the period of the SS burst set frame, a seventh frame has an SS block or a PBCH; and Mod(SFN, N)=7 indicates that in the period of the SS burst set frame, an eighth frame has an SS block or a PBCH.

When T=160 ms, N=16, Mod(SFN, N)=0 indicates that in the period of the SS burst set frame, the first frame has an SS block or a PBCH; Mod(SFN, N)=1 indicates that in the period of the SS burst set frame, the second frame has an SS block or a PBCH; Mod(SFN, N)=2 indicates that in the period of the SS burst set frame, the third frame has an SS block or a PBCH; Mod(SFN, N)=3 indicates that in the period of the SS burst set frame, the fourth frame has an SS block or a PBCH; Mod(SFN, N)=4 indicates that in the period of the SS burst set frame, the fifth frame has an SS block or a PBCH; Mod(SFN, N)=5 indicates that in the period of the SS burst set frame, the sixth frame has an SS block or a PBCH; Mod(SFN, N)=6 indicates that in the period of the SS burst set frame, the seventh frame has an SS block or a PBCH; Mod(SFN, N)=7 indicates that in the period of the SS burst set frame, the eighth frame has an SS block or a PBCH; Mod(SFN, N)=8 indicates that in the period of the SS burst set frame, a ninth frame has an SS block or a PBCH; Mod(SFN, N)=$_9$ indicates that in the period of the SS burst set frame, a tenth frame has an SS block or a PBCH; Mod(SFN, N)=10 indicates that in the period of the SS burst set frame, an eleventh frame has an SS block or a PBCH; Mod(SFN, N)=11 indicates that in the period of the SS burst set frame, a twelfth frame has an SS block or a PBCH; Mod(SFN, N)=12 indicates that in the period of the SS burst set frame, a thirteenth frame has an SS block or a PBCH; Mod(SFN, N)=13 indicates that in the period of the SS burst set frame, a fourteenth frame has an SS block or a PBCH; Mod(SFN, N)=14 indicates that in the period of the SS burst set frame, the fifteenth frame has an SS block or a PBCH; and Mod(SFN, N)=15 indicates that in the period of the SS burst set frame, the sixteenth frame has an SS block or a PBCH.

The frame location of the PBCH or the SS block or the SS burst set may alternatively be determined by the network device.

In a possible design, before receiving the random access preamble from the terminal device, the network device may further send the paging message and the paging indication message. Paging messages on different POs or different paging messages associated with the SS block or QCL paging messages may be sent through frequency division multiplexing. The network device may configure, by using at least one of RMSI, a MIB, RRC, a MAC-CE, DCI, SI, an NR-SIB1, and an NR-SIB2, a quantity of POs or paging messages that are frequency division multiplexed. For example, the network device configures that a quantity of POs that are frequency division multiplexed is 2, and it indicates that two POs are frequency division multiplexed. When calculating a time location of the PO, the terminal device may consider that two POs that are frequency division multiplexed have a same time location. In a possible implementation, the network device configures the DCI of the paging message on the PO or frequency information of a PDCCH with reference to frequency information of the RMSI or the NR-SIB1 or the NR-SIB2 by using the configuration information. For example, the DCI of the paging message on the PO or a frequency offset of the PDCCH is configured, where the frequency offset may be an offset relative to a frequency start location or a frequency end location or a frequency middle location of the PDCCH or the PDSCH of the RMSI or the NR-SIB1 or the NR-SIB2. For example, when the DCI of the paging message on the PO or bandwidth of the PDCCH is configured, the DCI of the paging message or the bandwidth of the PDCCH may be the same as bandwidth of the PDCCH of the RMSI or the NR-SIB1 or the NR-SIB2 or may be a multiple of the bandwidth of the RMSI or the NR-SIB1 or the NR-SIB2, where the multiple may be an integer multiple or a fraction multiple or predefined as one. The configuration information is at least one of RMSI, a MIB, RRC, a MAC-CE, DCI, SI, an NR-SIB1, and an NR-SIB2. QCL is quasi co-located (quasi-colocated), and indicates that beam information or Doppler information, and delay extension information of two signals or two reference signals are the same.

S202: The terminal device obtains a paging identifier associated with the random access preamble and configuration information of a paging message window.

The network device obtains the paging identifier associated with the random access preamble, or the network device obtains a paging user group associated with the random access preamble and obtains a paging identifier associated with the paging user group. The network device scrambles the PDCCH based on the paging identifier, and the paging identifier is used by the terminal device to monitor the PDCCH, to receive the paging message from the PDSCH based on an indication of the DCI of the PDCCH. The paging message window indicates a time interval at which the paging message is sent or received.

In a possible design, that the terminal device obtains the paging identifier associated with the random access preamble includes the following:

the terminal device receives the paging identifier that is from the network device and that is associated with the random access preamble; or the terminal device obtains a prestored or preconfigured paging identifier associated with the random access preamble; or the terminal device determines, based on at least one of the following information, the paging identifier associated with the random access preamble:

a total quantity of paging occasions, a total quantity of paging messages, a total quantity of random access occasions, a subcarrier spacing, a service type, a carrier frequency, a total quantity of random access preambles, an index of a random access occasion corresponding to the random access preamble, an index of the random access preamble, an index of the paging message, an index of the paging user group corresponding to the random access preamble, an index of a time-frequency resource corresponding to the random access preamble, an index of a synchronization signal block corresponding to the random access preamble, an index of a channel state information reference signal (CSI-RS) port corresponding to the random access preamble, and a random access radio network temporary identifier (RA-RNTI) corresponding to the random access preamble.

The total quantity of paging occasions, the total quantity of paging messages, the total quantity of random access occasions, and the total quantity of random access preambles are quantities in a current DRX cycle, and a length of the DRX cycle includes, but is not limited to, a subframe, a slot (slot), and an SS block. The index of the random access preamble is a sequence number of the random access preamble sent by the terminal device, and the terminal device may number the sent random access preamble by using a step size of 1. The index of the paging message is a sequence number of the paging message sent by the network device, and the terminal device may number the sent paging message by using the step size of 1. The index of the paging user group indicates a sequence number of the paging user group, and different paging user groups have different indexes. The index of the time-frequency resource corresponding to the random access preamble indicates a sequence number of the time-frequency resource occupied by the random access preamble. The index of the synchronization signal block corresponding to the random access preamble indicates a sequence number of the synchronization signal block (SS block) of the random access preamble. The index of the CSI-RS port corresponding to the random access preamble indicates a port sequence number of a CSI-RS on a synchronization signal block of the random access preamble. The terminal device may determine the paging identifier based on the index of the random access preamble, the index of the paging message, the index of the paging user group of the terminal device, the index of the time-frequency resource corresponding to the random access preamble, the index of the synchronization signal block corresponding to the random access preamble, the index of the CSI-RS port corresponding to the random access preamble, and the RA-RNTI corresponding to the random access preamble, or may query a prestored or preconfigured mapping table to obtain the paging identifier associated with the random access preamble.

It should be noted that in this embodiment, one synchronization signal block (SS block) may correspond to one or more OFDM symbols. The SS block includes at least one of the following: a primary synchronization signal (PSS), a secondary synchronization signal (SSS), a physical broadcast signal (physical broadcast channel block, or PBCH), and a demodulation reference signal (DMRS). The SS block may also be referred to as an SS/PBCH (synchronization signal/physical broadcast channel block) block.

For example, the terminal device determines the paging identifier based on any one of the following formulas:

$$RNTI(i) = I \times RA\text{-}RNTI + i; \tag{1}$$

$$RNTI(i) = K \times i + RA\text{-}RNTI; \tag{2}$$

$$RNTI(i) = RNTI_o + \mathrm{mod}(i, I); \tag{3}$$

$$RNTI(i) = RNTI_o + \mathrm{mod}(i, I) + I \times \mathrm{mod}(bst_{id}, N); \tag{4}$$

$$RNTI(i) = RNTI_o + \mathrm{mod}(i, I) + I \times \mathrm{mod}(bst_{id}, N) + I \times N \times \mathrm{mod}(t_{id}, T); \tag{5}$$

$$RNTI(i) = RNTI_o + \mathrm{mod}(i, I) + I \times \mathrm{mod}(bst_{id}, N) + I \times N \times \mathrm{mod}(t_{id}, T) + I \times N \times T \times \mathrm{mod}(f_{id}, F); \tag{6}$$

$$RNTI(i) = RNTI_o - \mathrm{mod}(i, I); \tag{7}$$

$$RNTI(i)=RNTI_o-\mathrm{mod}(i,I)-I\times\mathrm{mod}(bst_{id},N); \quad (8)$$

$$RNTI(i)=RNTI_o-\mathrm{mod}(i,I)-I\times\mathrm{mod}(bst_{id},N)-I\times N\times\mathrm{mod}(t_{id},T); \text{ and} \quad (9)$$

$$RNTI(i)=RNTI_o-\mathrm{mod}(i,I)-I\times\mathrm{mod}(bst_{id},N)-I\times N\times\mathrm{mod}(t_{id},T)-I\times N\times T\times\mathrm{mod}(f_{id},F). \quad (10)$$

For another example, the terminal device determines the paging identifier based on any one of the following formulas:

$$RNTI(i)=RNTI_o-\mathrm{floor}(i/I0); \quad (11)$$

$$RNTI(i)=RNTI_o-\mathrm{floor}(i/I0)+I\times\mathrm{floor}(bst_{id}/N0); \quad (12)$$

$$RNTI(i)=RNTI_o-\mathrm{floor}(i/I0)+I\times\mathrm{floor}(bst_{id}/N0)+I\times N\times\mathrm{floor}(t_{id}/T0); \quad (13)$$

$$RNTI(i)=RNTI_o-\mathrm{floor}(i/I0)+I\times\mathrm{floor}(bst_{id}/N0)+I\times N\times\mathrm{floor}(t_{id}/T0)+I\times N\times T\times\mathrm{floor}(f_{id}/F0); \quad (14)$$

$$RNTI(i)=RNTI_o-\mathrm{floor}(i/I0); \quad (15)$$

$$RNTI(i)=RNTI_o-\mathrm{floor}(i/I0)-I\times\mathrm{floor}(bst_{id}/N0); \quad (16)$$

$$RNTI(i)=RNTI_o-\mathrm{floor}(i/I0)-I\times\mathrm{floor}(bst_{id}/N0)-I\times N\times\mathrm{floor}(t_{id}/T0); \text{ and} \quad (17)$$

$$RNTI(i)=RNTI_o-\mathrm{floor}(i/I0)-I\times\mathrm{floor}(bst_{id}/N0)-I\times N\times\mathrm{floor}(t_{id}/T0)-I\times N\times T\times\mathrm{floor}(f_{id}/F0). \quad (18)$$

Specifically, $bst_{id}$ may be a random access resource index, N0 indicates a quantity of random access resources, that is, a random access resource group, associated with a downlink signal, N0 may be configured by the base station or may be a default value, T0 indicates a time length of the random access resource, and a time unit may be a slot, a mini-slot, an OFDM symbol, and a time length of the random access preamble format.

In another embodiment, in calculation of the RNTI in all the foregoing embodiments, locations of any two of i, $bst_{id}$, $t_{id}$, and $f_{id}$ may be exchanged. Correspondingly, locations of I, N, T, and F need to be exchanged, and correspondingly, locations of I0, N0, T0, and F0 need to be exchanged.

floor(x/y) means dividing x by y and then rounding down to the nearest integer. In another embodiment, floor may be replaced with a ceil function or another function, for example, round that corresponds to rounding up.

In the foregoing embodiment, RNTI (i) indicates a paging identifier corresponding to a random access preamble, and i indicates any one of the index of the random access preamble, the index of the paging message, the index of the paging user group of the terminal device, the index of the time-frequency resource corresponding to the random access preamble, the index of the synchronization signal block corresponding to the random access preamble, or the index of the CSI-RS port corresponding to the random access preamble. K indicates a constant greater than 0, for example, K=60. The RA-RNTI indicates a random access radio network temporary identifier corresponding to a random access preamble i. $RNTI_0$ indicates an initial paging identifier, and $RNTI_0$ is a constant greater than 0. For example, $RNTI_0=60$. For another example, $RNTI_0=65535$.

$bst_{id}$ is at least one of a downlink signal index, a downlink signal group index, an index of a downlink signal in a downlink signal group, a random access occasion (RACH occasion) index, a random access transmission occasion (RACH transmission occasion) index, a random access preamble format (RACH preamble format) index, a random access resource index, a random access preamble group index, and a random access occasion group index. The downlink signal may be a synchronization signal block SS block or a physical broadcast channel block (PBCH block). The SS block/PBCH block is a signal block including a plurality of OFDM symbols, and includes at least one of a primary synchronization signal (PSS), a secondary synchronization signal (SSS), a physical broadcast channel (PBCH), a demodulation reference signal (DMRS), and a CSI-RS. In an implementation, $bst_{id}$ is an index of a signal or a resource at a current time $t_{id}$ and/or frequency $f_{id}$.

$t_{id}$ is at least one of a downlink signal time index and a time index of a resource of the random access preamble. The time index may be one or a combination of more of a subframe number, a slot number, a mini slot (mini slot, also referred to as mini-slot), and an OFDM symbol.

$f_{id}$ is at least one of a downlink signal frequency index, a downlink signal carrier index, a downlink signal frequency index, and a frequency index of the resource of the random access preamble.

I is a first specified constant, N is a second specified constant, T is a third specified constant, F is a fourth specified constant, and K is an eighth constant.

For example, I is any integer from 1 to 64, N is any integer from 1 to 128, T is any integer from 1 to 80, F is any integer from 1 to 50, and K is any constant from 1 to 65535. In another embodiment, K indicates a quantity of all RA-RNTIs; I is a quantity of paging user groups, and/or paging messages, and/or paging occasions, and N is a quantity of downlink signals or random access occasions in a random access period.

mod(x, y) in the formula indicates a modulo operation, or may be written as x % y, or may be written as x mod y. If y is 1, no calculation is performed on a corresponding item (that is, may be omitted).

For another example, the terminal device searches a prestored or preconfigured mapping table to determine the paging identifier associated with the random access preamble. In a mapping table shown in Table 1, a random access preamble (a random access preamble index) and a paging identifier (RNTI) are in a one-to-one correspondence, and different random access preambles are associated with different paging identifiers.

TABLE 1

| Random access preamble index | Radio network temporary identifier |
|---|---|
| RAPID$_1$ | RNTI$_1$ |
| RAPID$_2$ | RNTI$_2$ |
| . . . | . . . |
| RAPIDN | RNTIN |

For another example, in a mapping table shown in Table 2, a plurality of random access preambles may correspond to a same paging identifier (RNTI).

TABLE 2

| Random access preamble index | Radio network temporary identifier |
|---|---|
| RAPID$_1$, RAPID$_2$ | RNTI$_1$ |
| RAPID$_3$, RAPID$_4$ | RNTI$_2$ |
| . . . | . . . |

For another example, in a mapping table shown in Table 3, one paging user group and one paging identifier (RNTI) are in a one-to-one correspondence, and different paging user groups correspond to different paging identifiers.

TABLE 3

| Paging user group index | Radio network temporary identifier |
|---|---|
| UEID_GRP$_1$ | RNTI$_1$ |
| UEID_GRP$_2$ | RNTI$_2$ |
| ... | ... |
| UEID_GRPN | RNTIN |

For another example, in a mapping table shown in Table 4, a plurality of paging user groups correspond to a same paging identifier (RNTI).

TABLE 4

| Paging user group index | Radio network temporary identifier |
|---|---|
| UEID_GRP$_1$, UEID_GRP$_2$ | RNTI$_1$ |
| UEID_GRP$_3$, UEID_GRP$_4$ | RNTI$_2$ |
| ... | ... |

It should be noted that Table 1 to Table 4 are only examples for description, and constitute no limitation on this embodiment of the present invention. In an implementation, RNTI$_1$ to RNTIN are any integers between 0 and 65535. In another embodiment, RNTI$_1$ to RNTIN sequentially increase or sequentially decrease, and/or are N consecutive integers, for example, N=10, RNTI$_1$=1, and RNTI$_{10}$=10. For another example, N is related to at least one of the following parameters: a quantity of POs (paging occasion) in a DRX cycle, a maximum quantity of paged UEs in a TA (tracking area), a maximum quantity of paged UEs on a PO, a band, a period of a synchronization signal block set, a frame structure, a paging message or an RMSI subcarrier spacing, and a quantity of actually transmitted synchronization signal blocks.

In a possible design, the terminal device and/or the network device may simultaneously configure a plurality of types of mapping tables. A corresponding mapping table is selected based on a value of a status identifier field, and is searched to determine the paging identifier. For example, based on the foregoing example, the terminal device simultaneously configures four mapping tables of Table 1 to Table 4, and a status identifier field for table selection is Flag. When Flag=0, the mapping table of Table 1 is used, when Flag=1, the mapping table of Table 2 is used, when Flag=2, the mapping table of Table 3 is used, and when Flag=3, the mapping table of Table 4 is used. In another possible design, the terminal device and/or the network device may select a table and/or a parameter value (including N) in a table based on a carrier frequency range. For example, when a carrier frequency is less than 3 GHz, Table 1 is selected; when the carrier frequency is greater than 3 GHz and is less than 6 GHz, Table 2 is selected; when the carrier frequency is greater than 6 GHz and is less than 40 GHz, Table 3 is selected; and when the carrier frequency is greater than 40 GHz, Table 4 is selected.

In another embodiment, the RA-RNTI is related to at least one of the following parameters: the index of the random access preamble, the index of the time-frequency resource corresponding to the random access preamble, the time index of the resource of the random access preamble, the frequency index of the resource of the random access preamble, a downlink signal index corresponding to the random access preamble, a downlink signal group index corresponding to the random access preamble, a random access resource group, a random access preamble group, a random access preamble format, a random access preamble sequence length, a band, a bandwidth, a frame structure, a quantity of random access resources in a slot (or associated with a quantity of downlink signals of a random access resource in a slot, or a quantity of random access response messages corresponding to a slot), a quantity of random access preambles on a random access resource, a quantity of random access resources associated with a downlink signal, a total quantity of random access preambles associated with a downlink signal, a time length of a random access resource, a subcarrier spacing, and a service type. The subcarrier spacing may be a subcarrier spacing of at least one of the following signals or channels: a PBCH (physical broadcast channel), RMSI (remaining minimum system information, or remaining system information), other system information (OSI), a random access preamble, a random access response, a paging message, and a message 3. The downlink signal may be a synchronization signal block and/or a CSI-RS.

For example, the terminal device and the network device determine the RA-RNTI based on any one of the following manners:

$$RA\text{-}RNTI = RNTI_o + \mod(bst_{id}, N); \quad (1)$$

$$RA\text{-}RNTI = RNTI_o + \mod(bst_{id}, N) + N \times \mod(t_{id}, T); \quad (2)$$

$$RA\text{-}RNTI = RNTI_o + \mod(bst_{id}, N) + N \times \mod(t_{id}, T) + N \times T \times \mod(f_{id}, F); \quad (3)$$

$$RA\text{-}RNTI = RNTI_o - \mod(bst_{id}, N); \quad (4)$$

$$RA\text{-}RNTI = RNTI_o - \mod(bst_{id}, N) - N \times \mod(t_{id}, T); \text{ and} \quad (5)$$

$$RA\text{-}RNTI = RNTI_o - \mod(bst_{id}, N) - N \times \mod(t_{id}, T) - N \times T \times \mod(f_{id}, F). \quad (6)$$

Another example is as follows:

$$RA\text{-}RNTI = RNTI_o + \text{floor}(bst_{id}/N0); \quad (1)$$

$$RA\text{-}RNTI = RNTI_o + \text{floor}(bst_{id}/N0) + N \times \text{floor}(t_{id}/T0); \quad (2)$$

$$RA\text{-}RNTI = RNTI_o + \text{floor}(bst_{id}/N0) + N \times \text{floor}(t_{id}/T0) + N \times T \times \text{floor}(f_{id}/F0); \quad (3)$$

$$RA\text{-}RNTI = RNTI_o - \text{floor}(bst_{id}/N0); \quad (4)$$

$$RA\text{-}RNTI = RNTI_o - \text{floor}(bstid/N0) - N \times \text{floor}(tid/T0); \text{ and} \quad (5)$$

$$RA\text{-}RNTI = RNTI_o - \text{floor}(bst_{id}/NO) - N \times \text{floor}(t_{id}/T0) - N \times T \times \text{floor}(f_{id}/F0). \quad (6)$$

Specifically, $bst_{id}$ may be a random access resource index, and N0 indicates a quantity of random access resources, that is, a random access resource group, associated with a downlink signal. N0 may be configured by the base station or may be a default value; and T0 indicates a time length of a random access resource, where a time unit may be a slot, a mini-slot mini-slot, an OFDM symbol, or a time length of the random access preamble format. floor(x/y) means dividing x by y and then rounding down to the nearest integer. In another embodiment, floor may be replaced with cell or another function, for example, round corresponding to rounding off.

In another embodiment, the RA-RNTI may be calculated by performing mod and/or floor on different parameters, and this is not limited herein.

In another embodiment, the network device notifies the terminal of a manner of determining the RA-RNTI. For example, when the network device has indication information Flag=0, a first manner is indicated; and when Flag=1, a second manner is indicated.

N is a second specified constant, T is a third specified constant, F is a fourth specified constant, N0 is a fifth constant, T0 is a sixth constant, and F0 is a seventh constant. For example, N is any integer from 1 to 128, T is any integer from 1 to 80, and F is any integer from 1 to 50. For another example, N0 and F0 are configured by the base station. For another example, T0 is determined based on a random access preamble format and a random access preamble subcarrier.

In another embodiment, a calculation manner of the paging identifier RNTI (i) and/or RA-RNTI is related to at least one of the following parameters: the index of the random access preamble, the index of the paging message, the index of the paging user group of the terminal device, the index of the time-frequency resource corresponding to the random access preamble, the time index of the resource of the random access preamble, the frequency index of the resource of the random access preamble, the downlink signal index corresponding to the random access preamble, the downlink signal group index corresponding to the random access preamble, a random access resource group, a random access preamble group, a random access preamble format, a random access preamble sequence length, a band, a bandwidth, a frame structure, a quantity of random access resources in a slot (or a quantity of downlink signals associated with a random access resource in a slot, or a quantity of random access response messages corresponding to a slot), a quantity of random access preambles on a random access resource, a quantity of random access resources associated with a downlink signal, a total quantity of random access preambles associated with a downlink signal, a time length of a random access resource, a subcarrier spacing, and a service type. For example, the calculation manner is related to a carrier frequency: When a frequency of a random access resource is less than 3 GHz, RNTI (i) and/or RA-RNTI is obtained in the first calculation manner; when the frequency of the random access resource is greater than 3 GHz and is less than 6 GHz, RNTI (i) and/or RA-RNTI is obtained in the second calculation manner; and when the frequency of the random access resource is greater than 6 GHz, RNTI (i) and/or RA-RNTI is obtained in the third calculation manner. In other words, the calculation manner of RNTI (i) and/or RA-RNTI is different in different application scenarios with different parameters, and a specific manner may be predefined, prestored, or indicated by the configuration information of the base station.

In another embodiment, in calculation of the RA-RNTI in all the foregoing embodiments, locations of any two of $bst_{id}$, $t_{id}$, and $f_{id}$ may be exchanged, correspondingly, locations of N, T, and F need to be exchanged, and correspondingly, locations of N0, T0, and F0 need to be exchanged. In an implementation, $bst_{id}$ is an index of a signal or a resource at a current time $t_{id}$ and/or frequency $f_{id}$.

In a possible design, the terminal device may receive, through signaling, the paging identifier that is from the network device and that is associated with the random access preamble, where the signaling may be at least one of an RRC message, a MAC-CE message, SI, or DCI.

In a possible design, that the terminal device obtains the configuration information of the paging message window of the paging message includes the following:

the terminal device receives the configuration information of the paging message window from the network device; or the terminal device obtains prestored or preconfigured configuration information of the paging message window; or the terminal device obtains the configuration information of the paging message window based on at least one of the following information:

a start time of the random access preamble, duration of the random access preamble, an end time of the random access preamble, time domain location information/frequency domain location information of a random access response window corresponding to the random access preamble, and a total quantity of paging user groups.

The paging message window indicates a possible sending/receiving time interval of the paging message or paging scheduling information corresponding to the paging message (the scheduling information of the paging message includes, but is not limited to, a time/frequency location corresponding to DCI of the paging message, a PDCCH of the paging message, or a control resource set (CORESET) of the paging message). The network device sends the paging message in the paging message window according to a prestored or preconfigured rule, and the terminal device receives the paging message in the same paging message window according to the preconfigured or prestored rule.

The following describes in detail specific embodiments of a process of determining the configuration information of the paging message window in the embodiments of the present invention.

In another possible implementation, the network device sends the configuration information of the paging message window to the terminal device through signaling such as SI, RRC, or DCI, and the terminal device receives the signaling such as SI, RRC, a MAC CE, or DCI from the network device, and obtains the configuration information of the paging message window that is included in the signaling. Certainly, the configuration information of the paging message window may alternatively be predefined or prestored by the terminal device, and the configuration information of the paging message window may also have another name. This is not limited in this embodiment.

For example, the network device sends the configuration information of the paging message window through RRC signaling by using the following format:

```
Supervisioninfo              SEQUENCE {
    PagingMessageWindowStart     ENUMERATED {
                                    ts2, ts3, ts4, ts5, ts6, ts7,
                                    ts8, ts10, ...},
    PagingMessageWindowSize      ENUMERATED {
                                    ts2, ts3, ts4, ts5, ts6, ts7,
                                    ts8, ts10, ...},
    PagingMessageWindowOffset    ENUMERATED {
                                    ts2, ts3, ts4, ts5, ts6, ts7,
                                    ts8, ts10, ...},
...},
``` where ts in the RRC signaling indicates a time unit, for example, a subframe, a slot, a mini-slot, an OFDM symbol, or an absolute time.

In the RRC signaling, the configuration information of the paging message window includes at least one of the following: an initial paging message window start time (PagingMessageWindowStart), an initial paging message window size (PagingMessageWindowSize), and an initial paging message window offset time (PagingMessageWindowOffset). When the network device sends indication configuration information of the paging message window by using a system message (system information, or SI), the configuration information of the paging message window may be obtained from at least one of remaining minimum system information (RMSI), RRC, a MAC-CE, a MIB (main information block), DCI, and SI (system information). The initial paging message window offset time (PagingMessageWindowOffset) is used to determine an offset time between paging message windows corresponding to two different downlink signals, or an offset between the paging message window and a sending time of the random access preamble.

In another possible implementation, the configuration information of the paging message window is completely the same as that of a random access response window. In this case, the network device needs to send only the configuration information of the random access response window, and the terminal device determines the configuration information of the paging message window based on the configuration information of the random access response window.

In an LTE system, a window size of the random access response window is configured by the network device and is relatively large, and is usually at a millisecond level, and a start time of the random access response window is usually fixed and cannot adapt to diverse service requirements and a multicarrier application scenario in a future 5G NR system. Therefore, a flexible paging message window size and a flexible paging message window start time need to be designed.

An embodiment of the present invention further discloses a method for determining a paging message window. The network device and the terminal device separately determine a window size and/or a start time of the paging message window based on a subcarrier spacing. The paging message is sent or received based on the window size and/or the start time of the paging message window. In addition, the window size of the paging message window may be related to the initial reference paging message window size.

In another possible implementation, the initial paging message window start time, the initial paging message window size, and the initial paging message window offset time are respectively an actual paging message window start time, an actual paging message window size, and an actual paging message window offset time.

In another possible implementation, the actual paging message window start time, the actual paging message window size, and the actual paging message window offset time are separately determined based on the initial paging message window start time, the initial paging message window size, the initial paging message window offset time, and other parameters. The other parameters include, but are not limited to, at least one of the following: a random access preamble format, a random access preamble length, a carrier frequency of the random access preamble, a random access preamble band, a quantity of random access occasions (RACH occasion, RO) in a slot, a quantity of downlink signals on a random access resource in a slot, a quantity of random access response messages corresponding to a slot, a quantity of paging occasions in a DRX cycle, a quantity of random access preambles on an RO, a quantity of ROs associated with a downlink signal, a total quantity of random access preambles or resources associated with a downlink signal, a quantity of actually sent downlink signals, an RO time length, a subcarrier spacing, a bandwidth, a frame structure, a service type, the start time of the random access preamble, the duration of the random access preamble, the end time of the random access preamble, the time domain location information of the random access response window corresponding to the random access preamble, the frequency domain location information of the random access response window corresponding to the random access preamble, the index of the random access preamble, the index of the paging message, the index of the paging user group corresponding to the random access preamble, the index of the time-frequency resource corresponding to the random access preamble, the index of the synchronization signal block corresponding to the random access preamble, the total quantity of paging messages, the total quantity of random access occasions, the quantity of paging user groups, the quantity of paging messages, the quantity of random access preambles associated with the paging message, the quantity of POs, and a length of the DRX cycle. The paging message window start time, the paging message window size, and the paging message window offset time may be fixed values, for example, the paging message window offset time is fixed as 0.

The subcarrier spacing may be a subcarrier spacing of at least one of a PBCH, RMSI, a random access response, a paging message, other system information, a random access preamble, an NR-SIB1 (system information block 1), and a message 3.

The subcarrier spacing may be specified in random access configuration information or the configuration information of the paging message window. In this way, a uniform manner for determining the paging message window may be provided for different subcarrier spacings, to reduce signaling overheads.

In another possible implementation, similar to a random access response in LTE, the window size of the paging message window does not change.

In a possible implementation, the window size of the paging message window is variable, for example, the window size is determined based on a subcarrier spacing.

In another possible implementation, the window size of the paging message window is not only related to a subcarrier spacing, but also needs to be determined with reference to the initial paging message window size preconfigured by the network device. The network device may notify the terminal device of the initial paging message window size by using a system message.

In another possible implementation, the network device and the terminal device both may determine the window size of the paging message window based on the initial paging message window size and a subcarrier spacing.

For example, the window size of the paging message window is PagingMessageWindowSize*Scale, where PagingMessageWindowSize is the initial paging message window size, and Scale is related to a subcarrier spacing of the paging message or an index u of the subcarrier spacing. For example, Scale=$2^u$. In another implementation, a value of Scale is shown in Table 5. Table 5 shows a correspondence between a subcarrier spacing of a random access preamble and a Scale.

TABLE 5

| Subcarrier spacing of a random access response | Scale (slot) |
|---|---|
| 15 kHz | $S_0$ |
| 30 kHz | $S_1$ |
| 60 kHz | $S_2$ |
| 120 kHz | $S_3$ |
| 240 kHz | $S_4$ |
| 480 kHz | $S_5$ |

For another example, the value of Scale is shown in Table 6. Table 6 shows a correspondence between a subcarrier spacing of a random access preamble and a Scale.

TABLE 6

| Subcarrier spacing of a random access preamble | Scale (slot) |
|---|---|
| 1.25 kHz | $S_0$ |
| 5 kHz | $S_0$ |
| 15 kHz | $S_1$ |
| 30 kHz | $S_2$ |
| 60 kHz | $S_3$ |
| 120 kHz | $S_4$ |
| 240 kHz | $S_5$ |
| 480 kHz | $S_6$ |

It should be noted that in Table 5 and Table 6, S0 to S6 may be any non-negative integers between 0 and 128. Optionally, for any two subcarrier spacings i and j, if the subcarrier spacing i<j, $S_i \leq S_j$. Optionally, for any two subcarrier spacings i and j, if the subcarrier spacing i<j, $S_i \geq S_j$.

In another possible implementation, PagingMessageWindowStart may be indicated by an offset between a last sending time location of the random access preamble and a start time of the paging message window. The last sending time of the random access preamble and the start time of the paging message window may be indicated by a subframe, a slot, a mini-slot mini-slot, or an OFDM symbol.

For example, when the random access preamble length L=839, the start time of the paging message window is fixed as 3 ms; and when L=127 or 139, the start time of the paging message window is fixed as 0 ms. The random access preamble length is indicated by signaling (for example, indication information indicating the random access preamble length occupies 1 bit). For another example, when a carrier frequency is less than 6 GHz, the start time of the paging message window is fixed as 3 ms; when the carrier frequency is not less than 6 GHz, the start time of the paging message window is fixed as 1 ms (or a slot, a mini-slot, or an OFDM symbol). For another example, when the quantity of paging messages or paging user groups is N, the window size of the paging message window is N*PagingMessageWindowSize, where PagingMessageWindowSize indicates the window size of the paging message window.

In the foregoing solution, the start time of the paging message window (PagingMessageWindowStart) may alternatively be determined based on a subcarrier spacing, for example, PagingMessageWindowStart=W*$2^u$ slots, where W may be any prestored or preconfigured non-negative integer. For another example, when the carrier frequency is less than 3 GHz, PagingMessageWindowStart=3*$2^u$ slots; when the carrier frequency is greater than 3 GHz and is less than 6 GHz, PagingMessageWindowStart=2*$2^u$ slots; and when the carrier frequency is greater than 6 GHz, PagingMessageWindowStart=$2^u$ slots. u is an index of the subcarrier spacing.

In another possible implementation, the initial paging message window start time PagingMessageWindowStart in the configuration information of the paging message window is an optional parameter. In another embodiment, the paging message window start time is a fixed value and does not need to be sent by the network device. In another embodiment, the paging message window start time may be obtained through table lookup based on parameters such as a carrier frequency, a bandwidth, a frame structure, a subcarrier spacing, and a service type used in a random access process. For example, the paging message window start time=W*$2^u$ slots, where W may be any prestored or preconfigured non-negative integer. For another example, when the carrier frequency is less than 3 GHz, the paging message window start time=3*$2^u$ slots; when the carrier frequency is greater than 3 GHz and is less than 6 GHz, the paging message window start time=2*$2^u$ slots; and when the carrier frequency is greater than 6 GHz, the paging message window start time=$2^u$ slots. u is an index of the subcarrier spacing.

In another possible implementation, a random access resource (associated with a downlink signal) and a paging message window have a correspondence, and an offset time is calculated from a start location of the paging message window. The terminal device obtains a random access resource (and/or group) index and/or a downlink signal (and/or group) index. The terminal device determines the start time of the paging message window based on initial offset time information for receiving the paging message, the random access resource (and/or group) index, and/or the downlink signal (and/or group) index. For example, it is assumed that a RACH subframe/slot includes four random access resources (a random access resource group may be a random access resource on a time-frequency resource, or may correspond to a random access resource set of a plurality of different frequency domain resources on a same time domain resource, a random access resource may include one or more random access preambles, and the random access preamble used to request the paging message is within the random access resource) numbered as 0, 1, 2, and 3 (respectively associated with downlink signals 0, 1, 2, and 3). The start time of the paging message window corresponding to a first random access resource/random access resource group (numbered as 0) in the subframe/the slot of the random access resource is a start time of a random access resource after the last subframe/slot for sending the random access preamble. A paging message window corresponding to an $i^{th}$ random access resource (or an index of a downlink signal associated with a random access resource, numbered as i−1) is a time window obtained after a window corresponding to the first random access resource is translated towards a time axis by (i−1)*PagingMessageWindowOffset subframes/slots/mini-slots. In another embodiment, paging message windows corresponding to one or more random access resources of a subframe, a slot, a mini-slot, and an OFDM symbol are completely the same, that is, PagingMessageWindowOffset=0. An offset unit may be determined based on the foregoing other parameters, for example, determined based on the manner for determining the paging message window. Details are not described herein again.

In an LTE system, the terminal device needs to receive a random access response (RAR) in a random access response window, but actually, the network device may send an RAR only at a particular time in the random access response window. Therefore, electricity waste of the terminal device is caused as the terminal device needs to monitor the entire random access response window.

An embodiment of the present invention provides a method for triggering transmission of a paging message through random access. The terminal device receives the paging message at intervals in the paging message window, and does not need to monitor the entire paging message window. Similarly, the network device sends the paging message at intervals only in the paging message window, that is, in the paging message window, the paging message appears once at intervals, where the interval may be fixed or may not be fixed. In another possible implementation, each paging message window and an offset time appear at a same interval StepSize in time, for example, a time segment (T+2, T+4, . . . , and T+2n) in which the paging message may appear in the paging message window indicates a time at which the network device may send the paging message, and/or a time at which the terminal device may need to monitor the paging message. A window of a paging message i corresponding to an $i^{th}$ random access resource (or a downlink signal associated with the random access resource, numbered as i−1) in a RACH subframe/slot is a time window obtained after the window corresponding to the first random access resource is translated towards the time axis by (i−1)*StepSize*PagingMessageWindowOffset subframes/slots/mini-slots. The terminal device receives an RAR only in the following window time:

(i−1)*StepSize*PagingMessageWindowOffset+(k−1)*StepSize, where k=1, 2, . . . , and PagingMessageWindowSize, and i and k are numbered starting from 1.

It may be understood that the paging message i appears at equal intervals of a StepSize.

The interval of the paging message window may be determined and delivered to the terminal device by the network device.

For example, StepSize=2, i=1, PagingMessageWindowSize=n, and PagingMessageWindowStart=1.

For another example, StepSize is configured by using signaling, and the signaling may be at least one of radio resource control signaling, a MAC CE, system information, downlink control information, and the like, and is sent by the network device to the terminal device. Optionally, StepSize may alternatively be determined based on subcarrier spacing information or a subcarrier spacing index u. For example, an implementation similar to that of Scale may be used, and details are not described herein again.

In a possible implementation, the paging message may be sent at a time in a period: a time length of the period, an appearance time location in the period, and/or a quantity of periods. Any one or more of the foregoing three parameters may appear based on a format predefined or prestored or specified by the base station. For example, a time length of the period is four slots, the appearance time location in the period is 0110 (indicating appearing at a second time and a fourth time), and the quantity of periods is 2, that is, a total window size is eight slots. In this configuration, a possible sending/receiving time location of the paging message is only four slots. It should be noted that a similar method may also be used for the random access response window.

Optionally, PagingMessageWindowSize and/or PagingMessageWindowOffset are/is further related to parameters such as a carrier frequency range, a bandwidth, a frame structure, and a service type.

In the foregoing method, the terminal device does not need to continuously monitor the paging message at all time points in the entire paging message window, and instead monitors the paging message in time segments that are spaced in the paging message window, thereby reducing consumption of electricity of the terminal device.

In another possible implementation, a time unit of the random access preamble is a slot, and a time unit of the paging message is a mini-slot. Different random access resources trigger paging messages sent on different beams. In the paging message window, one slot has four mini-slots. The paging message triggered by an $i^{th}$ random access preamble (located on an $i^{th}$ random access resource, and correspondingly associated with a downlink signal i) is sent in an $i^{th}$ mini-slot (i=0, 1, 2 or 3). A total of four paging messages can be sent in one slot. A paging message window start time corresponding to each of the four paging messages is a corresponding mini-slot in a slot T+3, that is, a paging message window start time of an $i^{th}$ random access preamble in a slot T is an $i^{th}$ mini-slot in the slot T+3. That is, an offset time between paging message windows of a plurality of paging messages is 0 slot (but there is a mini-slot offset). A random access window start time (PagingMessageWindowStart) is at least three slots, for example, a start time of the random access preamble/a resource group 3 is actually three slots+three mini-slots.

In another possible implementation, a paging message window start time (PagingMessageWindowStart), a paging message window offset time (PagingMessageWindowOffset), a paging message window size, or an initial paging message window size (PagingMessageWindowSize) includes two parts, where each part corresponds to a different time unit. For example, a time unit of a first part is a slot, and a time unit of a second part is a mini-slot mini-slot. A time of the first part may be specified by signaling (for example, specified by system information, a PBCH, RMSI, RRC signaling, DCI, or a MAC CE), and a time of the second part may be specified by signaling, or may be determined in an implicit manner. For example, a time location of a specific mini-slot of the paging message may be specified by signaling, or is obtained in an implicit manner based on the index of the random access preamble/resource, the index of the paging message, and the index of the paging user group. For a specific implementation, refer to an indication manner of a paging message length, and details are not described herein again.

In addition, the network device may send the configuration information to the terminal device to indicate the start time and the length of the paging message window; and the terminal device determines a time unit of the start time and the length of the paging message window based on the configuration information of the network device. For example, the configuration information sent by the network device is FlagWin. When FlagWin=0, the time unit of the start time and the length of the paging message window is a slot; when FlagWin=1, the start time and the length of the paging message window include both time units of a slot and a mini-slot; when FlagWin=3, the time unit of the start time and the length of the paging message window is a mini-slot; and when FlagWin=4, the time unit of the window size of the paging message window is a slot, and appears at intervals of a StepSize preset or configured by the network device. Certainly, another indication manner may be alternatively used, and this is not limited in this embodiment.

In a possible design, the network device may configure a PDCCH monitoring interval or a PDSCH continuous symbol quantity of the paging message based on at least one of a main information block (MIB), RMSI, RRC, a MAC-CE, system information, an NR-SIB1, and DCI. The PDSCH continuous symbol quantity of the paging message may be indicated by using indication information, and the continuous symbol quantity may alternatively be a slot type, or may be a continuous symbol quantity of a scheduling message, or may be a continuous symbol quantity, that is, a quantity of symbols scheduled by a PDSCH. For example, 2 bits are used to indicate that the continuous symbol quantity of the paging message is one of 2, 4, 7, and 14 OFDM symbols, or 2 bits may be used to indicate that a PDSCH continuous symbol quantity for transmitting RMSI may be one of 2, 4, and 7 OFDM symbols, or 2 bits may be used to indicate that a PDSCH continuous symbol quantity for transmitting RMSI may be one of 4, 7, and 14 OFDM symbols, or 2 bits may be used to indicate that a PDSCH continuous symbol quantity for transmitting RMSI may be one of 2, 7, and 14 OFDM symbols, or 2 bits may be used to indicate that a PDSCH continuous symbol quantity for transmitting RMSI may be one of 2, 4, and 14 OFDM symbols, or 1 bit is used to indicate whether the PDSCH continuous symbol quantity of the paging message is the same as an RMSI continuous symbol quantity, or the 1-bit information indicates that the continuous symbol quantity of the paging message is 14 OFDM symbols or an RMSI continuous symbol quantity, or the 1-bit information indicates that the continuous symbol quantity of the paging message is 14 OFDM symbols or 7 OFDM symbols, or the 1-bit information indicates that the continuous symbol quantity of the paging message is 14 OFDM symbols or 4 OFDM symbols, or the 1-bit information indicates that the continuous symbol quantity of the paging message is 14 OFDM symbols or 2 OFDM symbols, or the 1-bit information indicates that the continuous symbol quantity of the paging message is 7 OFDM symbols or 4 OFDM symbols, or the 1-bit information indicates that the continuous symbol quantity of the paging message is 7 OFDM symbols or 2 OFDM symbols, or the 1-bit information indicates that the continuous symbol quantity of the paging message is 4 OFDM symbols or 2 OFDM symbols, or 1 bit is used to indicate slot-based scheduling or non-slot-based scheduling. It is predefined in a protocol that the continuous symbol quantity type of the paging message is the same as a PDSCH continuous symbol quantity of system information, an NR-SIB1, or RMSI. The continuous symbol quantity type of the paging message may alternatively be predefined. A slot continuous symbol quantity type is a slot type of continuous 2, 4, 7, or 14 OFDM symbols. The continuous symbol quantity is not limited to 2, 4, 7, and 14, or may be any one of 1 to 14, or may be a combination of several quantities.

A PDCCH monitoring interval of the paging message may be further configured by using at least one of a main information block (MIB), RMSI, RRC, a MAC-CE, system information, an NR-SIB1, and DCI, and the interval is at least one of 2, 4, 7, and 14 OFDM symbols. For example, 2 bits may be used to indicate that the PDCCH interval type of the paging message is one of 2, 4, 7, and 14 OFDM symbols, or 1 bit is used to indicate whether the PDCCH monitoring interval of the paging message is the same as a PDCCH monitoring interval type of RMSI, or the 1-bit information indicates that the PDCCH interval type of the paging message is 14 OFDM symbols or an RMSI type, or the 1-bit information indicates that the PDCCH interval type of the paging message is 14 OFDM symbols or 7 OFDM symbols, or the 1-bit information indicates that the PDCCH interval type of the paging message is 14 OFDM symbols or 4 OFDM symbols, or the 1-bit information indicates that the PDCCH interval type of the paging message is 14 OFDM symbols or 2 OFDM symbols, or the 1-bit information indicates that the PDCCH interval type of the paging message is 7 OFDM symbols or 4 OFDM symbols, or the 1-bit information indicates that the PDCCH interval type of the paging message is 7 OFDM symbols or 2 OFDM symbols, or the 1-bit information indicates that the PDCCH interval type of the paging message is 4 OFDM symbols or 2 OFDM symbols, or 1 bit is used to indicate slot-based scheduling or non-slot-based scheduling. The monitoring period or the monitoring interval is not limited to 2, 4, 7, and 14 symbols, or may be any one of 1 to 14 symbols, or may be a combination of several quantities.

In a possible design, the network device configures RMSI scheduling information by using a PBCH, may configure an RMSI slot type or a continuous symbol quantity by using a PBCH or a MIB message, or may configure a slot type or a continuous symbol quantity for RMSI transmission by using DCI. For example, 2-bit information is used to indicate that a PDSCH continuous symbol quantity for RMSI transmission may be one of 2, 4, 7, and 14 OFDM symbols, or 2 bits may be used to indicate that the PDSCH continuous symbol quantity for RMSI transmission may be one of 2, 4, and 7 OFDM symbols, or 2 bits may be used to indicate that the PDSCH continuous symbol quantity for RMSI transmission may be one of 4, 7, and 14 OFDM symbols, or 2 bits may be used to indicate that the PDSCH continuous symbol quantity for RMSI transmission may be one of 2, 7, and 14 OFDM symbols, or 2 bits may be used to indicate that the PDSCH continuous symbol quantity for RMSI transmission may be one of 2, 4, and 14 OFDM symbols, or 1-bit information may be used to indicate that the PDSCH continuous symbol quantity for RMSI transmission is either 14 OFDM symbols or 7 OFDM symbols; or the 1-bit information may be used to indicate that a PDSCH slot type for RMSI transmission is either 14 OFDM symbols or 4 OFDM symbol; or the 1-bit information may be used to indicate that the PDSCH continuous symbol quantity for RMSI transmission is either 14 OFDM symbols or 2 OFDM symbols; or the 1-bit information may be used to indicate that the PDSCH continuous symbol quantity for RMSI transmission is either 7 OFDM symbols or 4 OFDM symbols; or the 1-bit information may be used to indicate that the PDSCH continuous symbol quantity for RMSI transmission is either 7 OFDM symbols or 2 OFDM symbols; or the 1-bit information may be used to indicate that the PDSCH continuous symbol quantity for RMSI transmission is either 4 OFDM symbols or 2 OFDM symbols, or 1 bit is used to indicate slot-based scheduling or non-slot-based scheduling. The continuous symbol quantity is not limited to 2, 4, 7, and 14, or may be any one of 1 to 14, or may be a combination of several quantities. In another possible implementation, the method for triggering and sending/receiving the paging message in the present invention may also be applied to an on demand other system information, that is, one random access preamble is associated with one system message. When the terminal requires a system message i, a random access preamble corresponding to the system message is used to request the system message i on a random access resource associated with a synchronized downlink signal. After sending the random access preamble to request the system message i, the terminal device receives the system message i in a system message window by using an RNTI (i). A manner for generating the RNTI (i), a window of the system message i, and a method for sending the system message i by the base station/receiving the system message i by the terminal are similar to a manner for generating an RNTI (i) used in a process that the terminal device requests the paging message, the base station sends the paging message, and the terminal device receives the paging message, a window of the paging message, and a method for sending the system message i by the base station/receiving the system message i by the terminal device. Details are not described herein again.

In another possible implementation, a same terminal device may simultaneously send a plurality of random access preambles to request one or more paging messages/system messages. After sending the plurality of random access preambles, the terminal device receives one or more corresponding paging messages and/or system messages. A paging message/system message length of the terminal device may be a union set of one or more paging message/system message windows corresponding to random access resources of the plurality of random access preambles. To be specific, the terminal device sends the plurality of random access preambles to the network device in a plurality of random access resources/preamble groups, and the terminal device separately receives, in the union set of the paging message/system message windows corresponding to the plurality of random access preambles, one or more paging messages/system messages corresponding to the plurality of random access preambles. To be specific, the plurality of paging message/system message windows corresponding to the plurality of random access preambles are overlapped in time, and the union set of the plurality of paging message/system message windows corresponding to the plurality of random access preambles is used as an entire paging message/system message window of the terminal device.

According to this embodiment of the present invention, a plurality of paging messages requested by the random access preamble sent in a same slot are responded to, an offset time between receiving time points of the paging messages of the terminal device is configured, and a plurality of paging message windows may be configured jointly, so that signaling overheads are reduced, windows may or may not intersect, and receiving complexity of the terminal device is reduced.

In another possible implementation, the paging message window is determined based on a random access response window. For example, the paging message window and the random access response window are completely the same. For another example, based on any one of the foregoing methods for determining the start time and the length of the paging message window, an initial value or an actual value of a configured/preset/prestored parameter used in the paging message window is directly replaced with an initial value or an actual value of a configured/preset/prestored parameter in the random access response window. For example, an initial paging message window start time is replaced with an initial random access response window start time, and/or an initial paging message length is replaced with an initial random access response window size, and/or an initial paging message window offset time is replaced with an initial random access response window offset time. For another example, a plurality of paging message windows corresponding to a same downlink signal are completely the same, and the paging message window is determined based on the random access response window and/or a quantity N1 of paging user groups or a quantity N2 of paging messages. For example, the paging message window size=N1× random access response window size, or the paging message window size=N2× random access response window size, and the paging message window start time is the same as the random access response window start time.

In a possible design, the terminal device does not need to generate the configuration information of the paging message window of the random access preamble, and instead receives the configuration information of the paging message window of the random access preamble sent by the network device. The network device generates the configuration information of the paging message window based on at least one of the following information: a start time of the random access preamble, duration of the random access preamble, an end time of the random access preamble, time domain location information of a random access response window corresponding to the random access preamble, frequency domain location information of the random access response window corresponding to the random access preamble, and a total quantity of paging user groups.

The network device sends the configuration information of the paging message window to the terminal device.

For generation of the configuration information of the paging message window by the network device, refer to the process in which the terminal device generates the configuration information of the paging message window, and details are not described herein again.

S203: The network device obtains a paging identifier and/or a paging user group associated with the random access preamble.

Specifically, the network device determines that a type of the random access preamble is to trigger a paging procedure, and the network device obtains the paging identifier and/or the paging user group associated with the random access preamble. The paging identifier is used to scramble a physical downlink control channel, and the physical downlink control channel is used to indicate a physical downlink shared channel for sending the paging message.

In a possible design, that the network device obtains the paging identifier associated with the random access preamble includes the following:

the network device obtains a prestored or preconfigured paging identifier associated with the random access preamble; or the network device determines, based on one or more pieces of the following information, the paging identifier associated with the random access preamble:

an index of the random access preamble, an index of the paging message, an index of the paging user group of the terminal device, an index of a time frequency resource corresponding to the random access preamble, an index of a synchronization signal block corresponding to the random access preamble, an index of a channel state information reference signal (CSI-RS) port corresponding to the random access preamble, and a random access radio network temporary identifier (RA-RNTI) corresponding to the random access preamble.

For a manner in which the network device obtains, based on a prestored or preconfigured manner, the paging identifier associated with the random access preamble, refer to the process in which the terminal device obtains the paging identifier based on a prestored or preconfigured manner in S202, and details are not described herein again.

For a process in which the network device determines the paging identifier associated with the random access preamble, refer to the process in which the terminal device generates the paging identifier in S202, and details are not described herein again.

In a possible design, the network device sends the paging identifier associated with the random access preamble to the terminal device. The network device may send the paging identifier to the terminal device by using signaling, where the signaling may be at least one of an RRC message, a MAC-CE message, SI, or DCI.

S203: The network device sends a paging message to the terminal device, and the terminal device receives the paging message from the network device.

The network device sends the paging message to the terminal device in the paging message window, and sends the random access response to the terminal device. In the random access response, an RAR subheader corresponding to the random access preamble has no corresponding MAC RAR, that is, the terminal device does not perform random access and uplink synchronization based on the random access response. The network device scrambles the physical downlink control channel in the paging message window based on the paging identifier. The physical downlink control channel corresponds to the physical downlink shared channel for transmitting the paging message, and the physical downlink control channel is used to transmit DCI of the paging message.

In a possible design, the network device sends the paging message in the paging message window. For a method used by the network device to obtain the configuration information of the paging message window, refer to the process in which the terminal device obtains the paging message window in S202, and details are not described herein again. The network device may send the configuration information of the paging message window to the terminal device.

In a possible design, the method further includes the following: the network device sends the paging message to the terminal device, where the paging message may include at least one of a user equipment identifier list (UE ID list or UE ID record list), system change information, warning information of a natural disaster such as an earthquake and a tsunami, an uplink scheduling grant (UL grant) of a message 3, a C-RNTI (or TC-RNTI, temporary cell-radio network temporary identifier), a non-contention-based random access preamble (for example, a random access preamble index and/or a random access resource index), and a timing advance (TA).

For example, when the paging message includes both a UE ID and a non-contention-based random access preamble, each UE ID in the paging message may be associated with one non-contention-based random access preamble; or some UE IDs in the paging message may be associated with one non-contention-based random access preamble and other UE IDs are not associated with a non-contention-based random access preamble. In another embodiment, different UE IDs correspond to a completely same non-contention-based random access preamble or completely different non-contention-based random access preambles, or some UE IDs are associated with a same non-contention-based random access preamble. For another example, the base station device may indicate which one of the foregoing three manners is currently used.

For another example, when the paging message includes both a UE ID and an uplink scheduling grant (UL grant) of a message 3, each UE ID in the paging message may be associated with one uplink scheduling grant (UL grant) of the message 3; or each of some UE IDs in the paging message may be associated with one uplink scheduling grant (UL grant) of the message 3 and other UE IDs are not associated with an uplink scheduling grant. In another embodiment, uplink scheduling grants (UL grant) of the message 3 associated with different UE IDs are completely the same or completely different, or some UE IDs are associated with a same uplink scheduling grant. For another example, the base station device may indicate which one of the foregoing three manners is currently used.

For another example, when the paging message includes both a UE ID, an uplink scheduling grant (UL grant) of a message 3, and a TA, the TA may be a common TA for all terminals in the paging message or a plurality of TAs for a plurality of terminals, each UE ID in the paging message is associated with one uplink scheduling grant (UL grant) of the message 3 and a TA; or each of some UE IDs in the paging message is associated with one uplink scheduling grant (UL grant) of the message 3 and a TA and other UE IDs are not associated with an uplink scheduling grant and a TA. In another embodiment, uplink scheduling grants (UL grant) of the message 3 and/or TAs associated with different UE IDs are completely the same or completely different, or some UE IDs are associated with a same uplink scheduling grant and/or a same TA. For another example, the base station device may indicate which one of the foregoing three manners is currently used.

For another example, when the paging message includes both a UE ID and a C-RNTI (or a TC-RNTI), each UE ID in the paging message may be associated with one C-RNTI (or TC-RNTI); or each of some UE IDs in the paging message may be associated with one C-RNTI (or TC-RNTI) and other UE IDs are not associated with the C-RNTI (or TC-RNTI). In another embodiment, C-RNTIs (or TC-RNTIs) associated with different UE IDs are completely the same or completely different, or some UE IDs are associated with a same C-RNTI (or TC-RNTI). For another example, the base station device may indicate which one of the foregoing three manners is currently used.

For another example, the paging message may alternatively not include the random access preamble, and include only UE ID information of the paged terminal.

In an implementation, the base station indicates a format or content of the paging message before sending the paging message or DCI corresponding to the paging message, for example, the format or the content of the paging message is one of the foregoing embodiments.

In another implementation, specific formats or content of paging messages corresponding to different synchronization signal blocks of a same cell are different, or when synchronization signal blocks corresponding to random access preambles used to request paging messages are different, formats or content of the paging messages are different. For example, paging information corresponding to some downlink signal blocks may include UE ID information of a paged terminal, an uplink scheduling grant, and a TA (for example, in an area relatively close to the network device or having a relatively small TA value, all users may share a same TA); and paging information corresponding to some other synchronization signal blocks includes a UE ID of a paged terminal and a non-contention-based random access preamble (for example, in an area relatively far away from the base station, a TA is inaccurate). For another example, paging information corresponding to some synchronization signal blocks may include a UE ID of a paged terminal and a non-contention-based random access preamble (for example, when an area covered by the synchronization signal block has a relatively small quantity of terminals or a relatively large quantity of non-contention-based random access resources); and paging information corresponding to some other synchronization signal blocks includes a UE ID of a paged terminal (for example, when an area covered by the synchronization signal block has a relatively large quantity of terminals or a relatively small quantity of non-contention-based random access resources).

In another implementation, specific formats or content of paging messages corresponding to different synchronization signal blocks of a same cell are completely the same. Optionally, the format or the content of the paging message is specified by the network device by using signaling. The signaling may be radio resource control (RRC) signaling, system information (SI), media access control-control element (MAC CE) signaling, downlink control information (DCI), a physical downlink control channel order (PDCCH order), and the like.

In another implementation, the paging message includes all of a non-contention-based random access preamble, an uplink scheduling grant of a message 3, a C-RNTI (or a TC-RNTI), and a TA, and the paging message may be applied to paging of a terminal in an inactive state.

In the foregoing embodiment, the paging message includes the uplink scheduling grant (UL grant) of the message 3, the C-RNTI (or the TC-RNTI), the non-contention-based random access preamble, or the timing advance (TA), so that the random access preamble for triggering the paging message is fully used, to avoid that contention-based random access is performed again after the terminal is paged, thereby reducing a delay.

In a possible design, after sending the random access preamble and successfully receiving a paging message in the paging message window, the terminal device stops receiving a paging message. In a possible design, after the terminal device sends the random access preamble and receives no corresponding paging message in a corresponding paging message window, it is considered that sending of the random access preamble encounters a problem, and an upper layer may determine whether to send a random access preamble again to request a paging message again. In another possible design, after the terminal device sends the random access preamble and successfully receives a paging message in the paging message window, if the terminal device is not paged in the paging message, the terminal device continues to receive a paging message, or the terminal device may autonomously select whether to continue to receive a paging message, or the terminal device determines, based on indication information configured by the network device, a quantity of paging messages that continue to be received (for example, the network device indicates a quantity of subsequent paging messages by using the paging message already sent, or the network device indicates a quantity of paging messages by using other signaling), or the terminal device stops receiving a paging message, and considers that the terminal device is not paged in the network, or the terminal device stops receiving a paging message, and considers that all terminal devices have been paged in the network.

In a possible design, the method further includes:

when the random access preamble needs to be retransmitted, if a retransmission quantity reaches a maximum retransmission quantity (maximum number of preamble transmission) associated with the random access preamble or a maximum retransmission quantity associated with the paging message, stopping retransmission; or if the terminal device reaches a next DRX cycle, stopping retransmission; or if the paging message received by the terminal device carries no identifier of the terminal device, stopping retransmission.

Specifically, the maximum retransmission quantity associated with the random access preamble and the maximum retransmission quantity associated with the paging message may be configured by the network device, and are notified by the network device to the terminal device. A notification manner includes, but is not limited to, at least one of the following signaling: SI, an RRC message, a MAC-CE message, and a PDCCH order. The maximum retransmission quantity may alternatively be obtained by the terminal device by querying a prestored mapping table. The terminal device prestores the mapping table indicating a mapping relationship between the random access preamble and the maximum retransmission quantity. In the mapping table, different random access preambles may correspond to different maximum retransmission quantities, or a plurality of random access preambles correspond to a same maximum retransmission quantity. This is not limited in this embodiment.

In the method shown in FIG. 2a, the network device sends the paging message to the terminal device based on triggering by the random access preamble, and can use an existing random access procedure, to reduce signaling overheads.

Figure 3A:
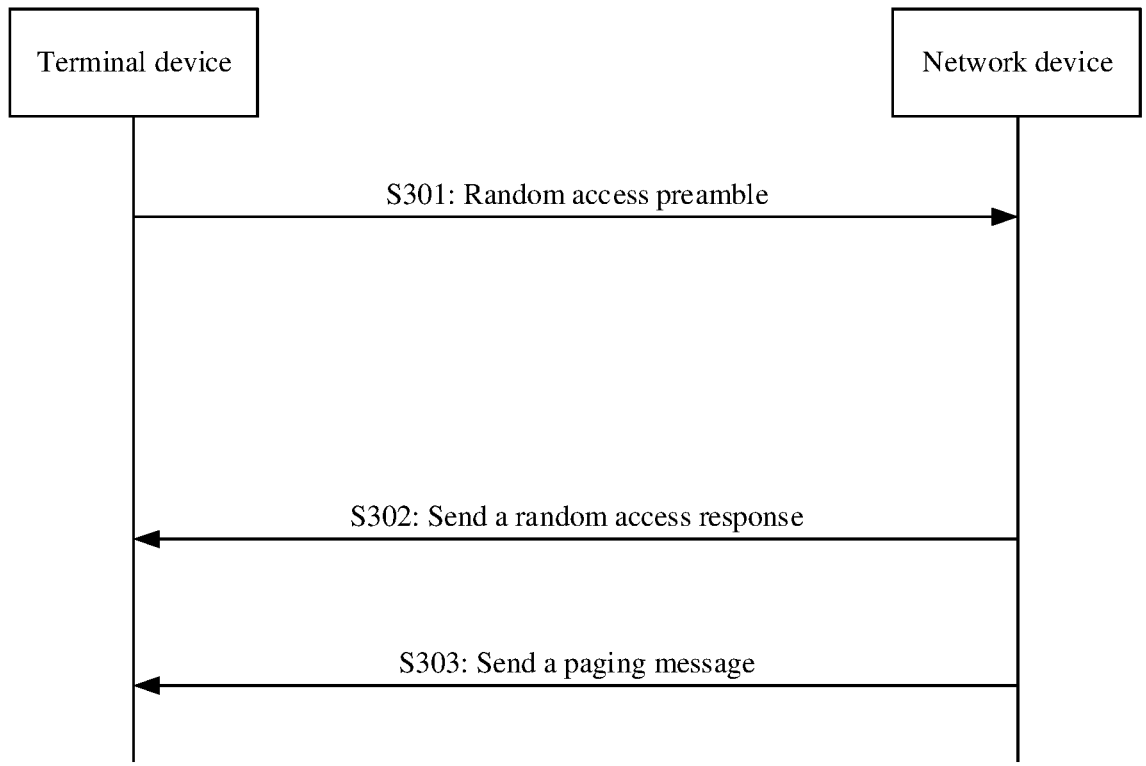
FIG. 3a is another schematic flowchart of a paging method according to an embodiment of the present invention.

FIG. 3a is a schematic flowchart of a paging method according to an embodiment of the present invention. In this embodiment of the present invention, the method includes the following steps.

S301: A terminal device sends a random access preamble to a network device, and the network device receives the random access preamble from the terminal device.

Terminal devices on a same paging occasion are grouped into n paging user groups, where n is an integer greater than 0. Each paging user group is associated with one random access preamble and one paging message. The terminal device determines a paging user group of the terminal device and obtains a random access preamble associated with the paging user group. The random access preamble associated with each paging user group is used to request the paging message. The terminal device sends the random access preamble to the network device, and the network device receives the random access preamble from the terminal device.

In a possible design, before the network device receives the random access preamble from the terminal device, the method further includes the following: the network device sends a paging indication message to the terminal device, where a paging indication bit that is carried by the paging indication message and that is of the paging user group of the terminal device is a preset value.

Specifically, the paging indication bit is configured for each paging user group. When needing to page the terminal device, the network device determines the paging user group of the terminal device, and sends the paging indication message to the terminal device. The paging indication bit that is carried by the paging indication message and that is of the paging user group of the terminal device is the preset value. The terminal device receives the paging indication message from the network device, and when determining that a value of the paging indication bit of the paging user group of the terminal device is the preset value, the terminal device sends the random access preamble corresponding to the paging user group to the network device.

When the paging indication bit is the preset value, the terminal device or a terminal device in the associated paging user group sends the random access preamble to the network device. The paging indication message may be carried in information such as DCI, RMSI, an NR-SIB1, an NR-SIB2, a system message, or a PDSCH of the paging indication message. When the DCI is used to carry the paging indication message or the DCI indicates the PDSCH of the paging indication message, the DCI of the paging indication message needs to be scrambled by using a radio network temporary identifier (RNTI). The RNTI may be a radio network temporary identifier specifically used for scrambling the DCI, to be distinguished from a radio network temporary identifier corresponding to another message. In an implementation, an RNTI corresponding to the paging indication message is different from that corresponding to the paging message. In another implementation, the RNTI corresponding to the paging indication message is the same as that corresponding to the paging message. For example, the paging indication message and the paging message are sent at different time points and/or frequencies. For another example, 1-bit indication information in the DCI is used to indicate that the DCI is one of the foregoing two types. For another example, an implicit manner is used to indicate that the DCI is one of the foregoing two types, where the implicit manner includes a demodulation reference signal, a CRC mask, a cyclic shift, scrambling, and the like.

For example, three paging user groups are obtained through grouping in advance: a paging user group 1, a paging user group 2, and a paging user group 3. The paging user group 1 includes UE 11and UE 12, the paging user group 2 includes UE 21 and UE 22, and the paging user group 3 includes UE 31 and UE 32. When needing to page the UE 11, the network device sends the paging indication message to the three paging user groups, where the paging indication message carries paging indication bits of the three paging user groups. Assuming that the preset value is 0, a value of the paging indication bit of the paging user group 1 is 1, a value of the paging indication bit of the paging user group 2 is 0, and a value of the paging indication bit of the paging user group 3 is 0.

In a possible design, before the network device receives the random access preamble from the terminal device, the method further includes the following: The network device sends configuration information of the paging message to the terminal device.

Specifically, the configuration information may include information such as a PO length, a PO quantity, a DRX cycle length, and a PO (time and/or frequency) location. When paging messages on one or more POs or a control resource of the paging message or a control resource of a paging indication is multiplexed with a synchronization signal block (synchronization signal block, SS block), an index of the paging occasion may be configured in the configuration information. A specific configuration method is mod(index, K)=m, where K indicates a PO quantity in a synchronization signal burst set (SS burst set) period, and index indicates a PO index. The network device may configure m to indicate that the PO is multiplexed with the SS block.

S302: The network device sends a random access response to the terminal device, and the terminal device receives the random access response from the network device.

Figure 3B:
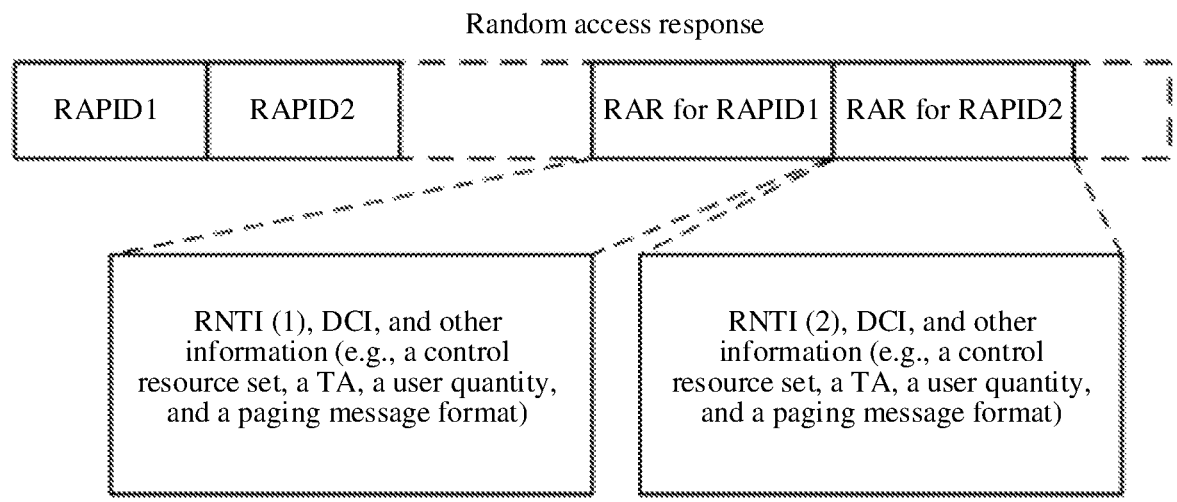
FIG. 3b is a schematic diagram of a message structure of a random access response according to an embodiment of the present invention.

The network device determines that a type of the random access preamble is used to request the paging message, and the network device determines paging scheduling information and/or a paging identifier corresponding to the random access preamble. The paging scheduling information includes, but is not limited to, at least one of an RNTI, frequency information, time information, a modulation and coding scheme, a reference signal, a subcarrier spacing, and DCI, and the paging scheduling information is carried in a MAC RAR corresponding to the random access preamble. For example, a MAC RAR in a random access response includes information shown in FIG. 3b. The terminal device obtains the paging scheduling information from the received random access response. The paging identifier may be an RNTI. For a manner in which the network device determines the RNTI, refer to description in the embodiment of FIG. 2a, and details are not described herein again.

S303: The network device sends a paging message to the terminal device, and the terminal device receives the paging message from the network device.

The network device sends the paging message based on the paging scheduling information, and the terminal device receives the paging message from the network device based on the paging scheduling information.

In the embodiment shown in FIG. 3a, the network device sends the paging message to the terminal device based on triggering by the random access preamble, and can use an existing random access procedure, to reduce signaling overheads.

Figure 3C:
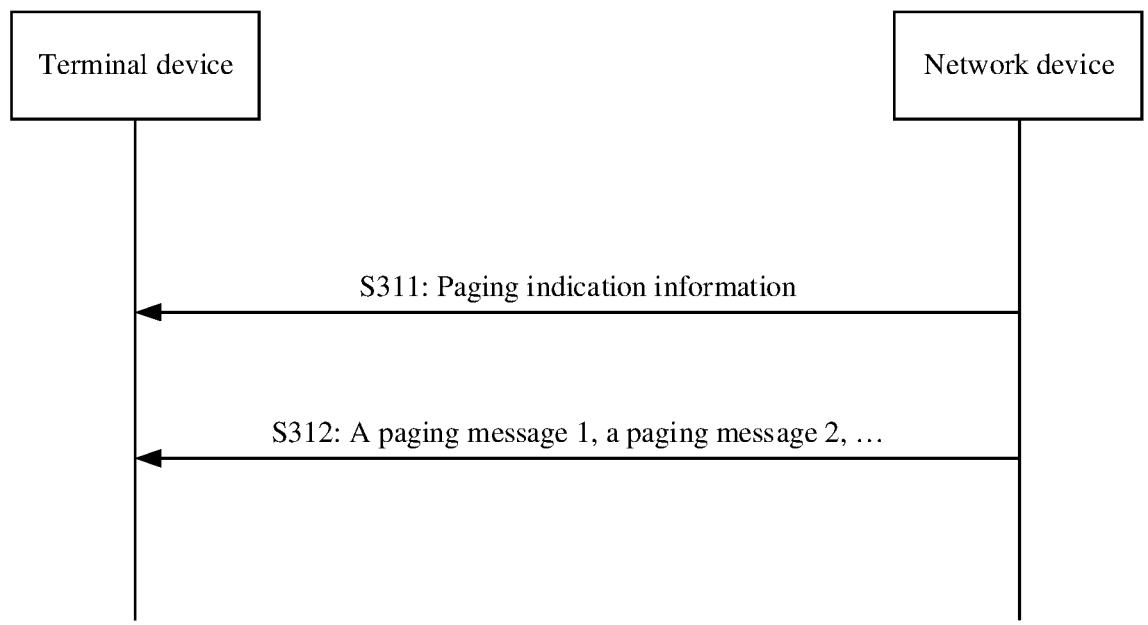
FIG. 3c is still another schematic flowchart of a paging method according to an embodiment of the present invention.

In another embodiment, after sending paging indication message to the terminal device, the network device sends the paging message to the terminal device. The terminal device receives the paging indication message. If a paging indication bit that is carried in the paging indication message and that is of the paging user group of the terminal device is a preset value, the terminal device continues to receive a paging message corresponding to the paging user group of the terminal device; otherwise, the group of the terminal device is not paged. FIG. 3c is a schematic flowchart of a paging method according to an embodiment of the present invention. In this embodiment of the present invention, the method includes:

S311: A network device sends paging indication message to a terminal device, and the terminal device receives the paging indication message from the network device.

A paging indication bit that is carried in the paging indication message and that is of the paging user group of the terminal device is a preset value. A method for sending the paging indication message may be the same as the method in the embodiments of FIG. 2a and FIG. 3a, and details are not described herein again.

S312: The network device sends a paging message to the terminal device, and the terminal device receives the paging message from the network device.

The network device sends the paging message based on paging scheduling information, and the terminal device receives the paging message from the network device based on the paging scheduling information. The scheduling information is a PDCCH of the paging message or PDCCH DCI. The scheduling information of the paging message may be sent along with the paging message, or may not be sent along with the paging message.

In a possible design, the network device first sends the paging indication message, and then sends a plurality of paging messages and corresponding DCI (or PDCCHs). Optionally, the DCI (or the PDCCHs) of the plurality of paging messages is separately scrambled by using different RNTIs, where the RNTI corresponds to the paging user group or the paging message based on a rule predefined or prestored or specified by the network device; or the DCI (or the PDCCHs) of the plurality of paging messages is scrambled by using a same RNTI, where the paging indication message indicates the paging messages corresponding to the DCI (and one or more paging user groups corresponding to the paging messages); or the DCI (or the PDCCHs) of the plurality of paging messages is scrambled by using a same RNTI, where the DCI (or the PDCCHs) of the plurality of paging messages indicates the paging messages corresponding to the DCI (and one or more paging user groups corresponding to the paging messages). In an implementation, different paging messages are scrambled by using different RNTIs in a manner that is the same as that in the embodiment corresponding to FIG. 3a, for example, is the same as Table 3 or Table 4 or an RNTI calculation formula. Details are not described herein again. In an implementation, a sending time of the paging message is the same as that in the method embodiment of FIG. 3a. For example, the terminal device receives the paging message in a paging message receiving window. The paging message receiving window is the same as that in the method embodiment of FIG. 3a, and details are not described herein again.

For another example, information about the paging message receiving window is indicated by the base station by using signaling.

This embodiment of the present invention and the method embodiment in FIG. 3a are based on a similar idea, and also have same technical effects. For a specific process, refer to description in the method embodiment in FIG. 3a, and details are not described herein again.

In a possible design, a slot type of the paging indication message is the same as that of one or more corresponding paging messages in the present invention. In a possible design, a subcarrier spacing of the paging indication message is the same as that of the one or more corresponding paging messages. In a possible design, a sending time of the paging indication message and a sending interval of the one or more corresponding paging messages may be configured, and may be configured by using a MIB, RMSI, SI, an NR-SIB1, an NR-SIB2, RRC, a MAC-CE, DCI, and the like. In a possible design, the paging indication message is sent based on a time window, and the one or more paging messages are also sent based on the time window. A window size of the time window and a start time of the time window may be configured by using a MIB, RMSI, SI, an NR-SIB1, an NR-SIB2, RRC, a MAC-CE, DCI, and the like.

In a possible design, the network device may determine, based on prior information of the terminal device, whether to send the paging message on some time-frequency resources that are associated with a synchronization signal block or that are QCL.

In a possible design, the base station indicates a sending manner of the paging message, for example, by using signaling FlagPaging. When FlagPaging=0, the manner in FIG. 3a is indicated, when FlagPaging=1, the manner in FIG. 3c is indicated, and when FlagPaging=2, another manner (for example, an LTE paging mechanism) is indicated. The examples are used herein only for description, and constitute no limitation in practice. The signaling may be at least one of a MIB, RMSI, SI, an NR-SIB1, an NR-SIB2, RRC, a MAC-CE, and DCI.

The following embodiments use the following parameters:

$T_s$ indicates a basic time unit (that is, a sampling interval, which may be predefined or prestored, or may be a specific value configured by the network device, or $T_s$ is related to a subcarrier spacing and a sampling point quantity) of the terminal device and/or the network device.

The sampling point quantity is a predefined or preconfigured constant or a value configured by the network device. For example, when a subcarrier spacing is 15 kHz and a bandwidth is 20 MHz, the sampling point quantity is 2048. For another example, the sampling point quantity is an inverse fast Fourier transform (IFFT) size or a maximum subcarrier quantity.

u indicates a subcarrier index. For example, when u=0, the subcarrier spacing is 15 kHz; when u=1, the subcarrier spacing is 30 kHz; when u=2, the subcarrier spacing is 60 kHz; when u=3, the subcarrier spacing is 120 kHz; when u=4, the subcarrier spacing is 240 kHz; and when u=5, the subcarrier spacing is 480 kHz.

$k = \Delta f_{max} \times N_{f,max} / (\Delta f_{ref} \times N_{f,ref})$, where $\Delta f_{max}$ indicates a maximum subcarrier spacing supported by the terminal device;

$N_{f,max}$ indicates a constant, and may be related to a maximum sampling point quantity and/or a maximum subcarrier spacing supported by the terminal device;

$\Delta f_{ref}$ indicates a subcarrier spacing currently used by the terminal device; and $N_{f,ref}$ indicates a constant, and may be related to a sampling point quantity or a subcarrier spacing currently used by the terminal device.

For example, the subcarrier spacing $\Delta f_{max}$ is 480 kHz, $N_{f,max}$=4096, $\Delta f_{ref}$=15 kHz, and $N_{f,ref}$=2048. In this case, $T_s=1/(480000 \times 4096)$, and $\kappa$=64.

Figure 4:
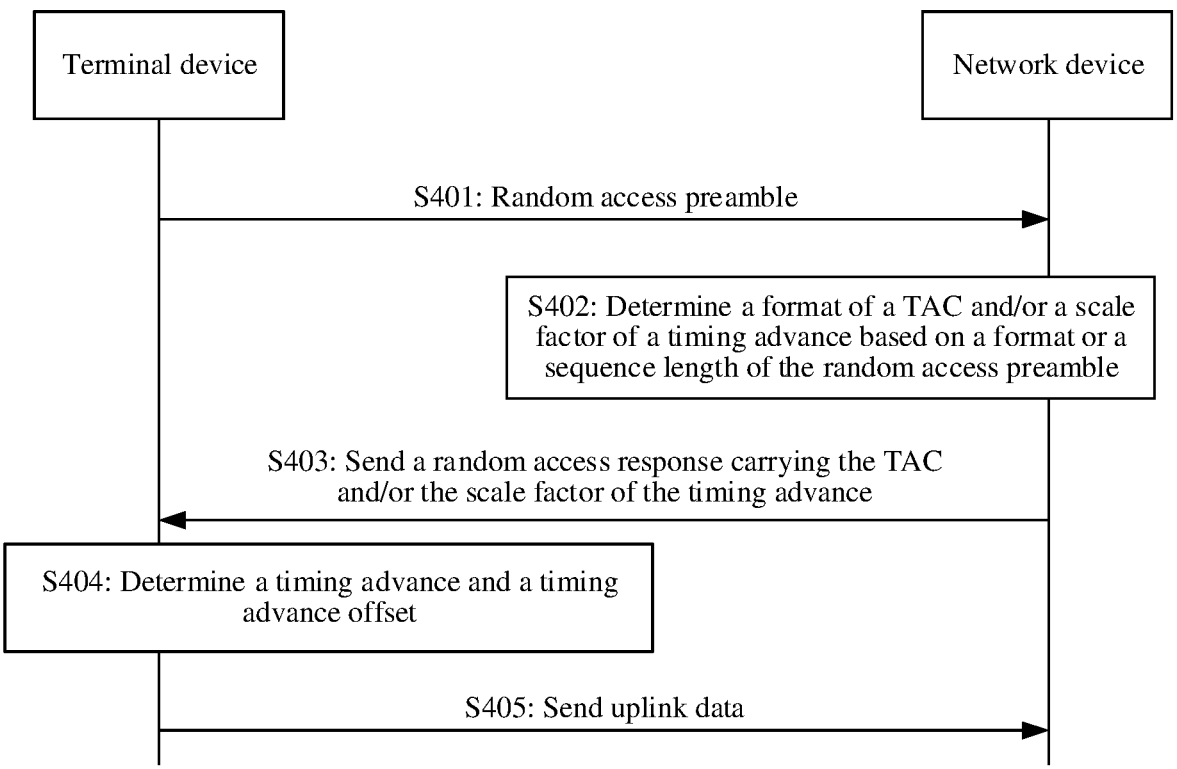
FIG. 4 is a schematic flowchart of a communication timing method according to an embodiment of the present invention.

FIG. 4 is a schematic flowchart of a communication timing method according to an embodiment of the present invention. In this embodiment of the present invention, the method includes:

S401: A terminal device sends a random access preamble to a network device, and the network device receives the random access preamble from the terminal device.

The terminal device initiates a random access procedure when needing to perform uplink synchronization. The terminal device sends the random access preamble to the network device, where a format of the random access preamble is not limited, for example, a sequence length of the random access preamble is 31, 63, 71, 127, 139, or 839.

S402: The network device determines a format of a TAC and/or a scale factor based on the format of the random access preamble.

The format of the random access preamble includes a type and/or a length, and the format of the TAC includes a length of the TAC. The network device determines the format of the TAC and/or the scale factor of a timing advance based on the format of the random access preamble. The network device may prestore or preconfigure a mapping table, where the mapping table indicates a mapping relationship between an index of the random access preamble and the length of the TAC and/or the scale factor. The network device queries the table to obtain the length of the TAC and/or the scale factor based on the index of the random access preamble sent by the terminal device.

In a possible design, the length of the TAC increases along with a length of the random access preamble. For example, when the sequence length of the random access preamble is 839, the length of the TAC is 11 bits; when the sequence length of the random access preamble is 31, 63, 71, 127, or 139, the length of the TAC is less than 11 bits, and the length of the TAC may be any length between 1 bit and 11 bits. For another example, when the sequence length of the random access preamble is 127 or 139, the length of the TAC is 8 bits.

In a possible design, the scale factor increases along with the length of the random access preamble. For example, when the sequence length of the random access preamble is 839, the value of the scale factor is 16; when the sequence length of the random access preamble is 31, 63, 71, 127, or 139, the value of the scale factor is less than 16, and the scale factor may be, for example, 0.25, 0.5, 1, 2, 4, or 8. For another example, when the sequence length of the random access preamble is 839, the scale factor is greater than 16.

In a possible design, the scale factor increases along with the length of the random access preamble. For example, when the sequence length of the random access preamble is 839, the scale factor is $\alpha=16\times\kappa$; and when the sequence length of the random access preamble is 31, 63, 71, 127, or 139, the scale factor is less than $16\times\kappa$. For example, the scale factor is $\alpha=0.125\times\kappa$, $0.25\times\kappa$, $0.5\times\kappa$, $1\times\kappa$, $2\times\kappa$, $4\times\kappa$, or $16\times\kappa$. For example, when the sequence length of the random access preamble is 839, the scale factor is greater than $16\times\kappa$.

S403: The network device sends a random access response to the terminal device, and the terminal device receives the random access response from the network device.

The random access response carries the TAC, or the random access response carries the TAC and the scale factor determined in S402. The terminal device receives the random access response from the network device and determines the TAC and another field in the random access response.

S404: The terminal device determines a timing advance and a timing advance offset.

S405: The terminal device sends uplink data to the network device, and the network device receives the uplink data from the terminal device.

The terminal device sends the uplink data (for example, msg3) to the network device based on a timing adjustment (the timing advance and/or the timing advance offset) determined in S404, and the network device receives the uplink data from the terminal device.

Specifically, the timing adjustment (that is, timing adjustment/timing/timing advance/time advance) may also be referred to as a transmission timing adjustment, and specifically includes a timing advance T1. (for example, indicated as $T1=N_{TA} \times T_s$, where $N_{TA}$ indicates an adjusted sampling point quantity) and a timing advance offset (fixed timing advance offset) T2 (for example, indicated as $T2=N_A \times T_s$, where $N_A$ indicates an adjusted sampling point quantity) between an uplink and a downlink. For example, T1 may be a time offset between uplink and downlink communication links that is caused by a space transmission channel, and T2 may be a time offset required by uplink-to-downlink switching. Still further, T1 is related to an actual transmission channel, and therefore changes in a transmission process. An initial value is estimated and obtained in a random access process, and is adjusted in a data communication process based on an uplink reference signal.

In a possible design, the initial value of the timing advance T1 is obtained in a random access process, and is updated in an uplink transmission process.

In a possible design, in an initial uplink synchronization (that is, depending on random access) process, the terminal device determines an initial timing advance based on at least one of a TAC value, a subcarrier spacing index, a scale factor, the sequence length of the random access preamble, and a basic time unit. For example, the initial value of the timing advance T1 is obtained based on the following formula:

$$N_{TA}=T_A \times \alpha \times T_s \times \kappa \times 2^{-u},$$

where $N_{TA}$ indicates the timing advance, $T_A$ indicates the TAC value and is notified by the network device to the terminal device by using the random access response, α indicates the scale factor, and u is the subcarrier spacing index.

For another example, the initial value of the timing advance T1 is obtained based on the following formula:

$$N_{TA}=T_A \times \alpha$$

A unit of the formula is Ts, $N_{TA}$ indicates the timing advance, $T_A$ indicates the TAC value and is notified by the network device to the terminal device by using the random access response, α indicates the scale factor, $\alpha=16 \times \kappa \times 2^{-u}$, and u is the subcarrier spacing index. Specifically, when the sequence length of the random access preamble is 139, u may be a subcarrier spacing index of the random access preamble. Further specifically, u may be an index corresponding to a subcarrier spacing of an initial access bandwidth (a corresponding subcarrier spacing is $15 \times 2^u$ kHz, and u is an integer, for example, u=0, 1, 2, . . . , or 8; for another example, u indicates an index corresponding to a subcarrier spacing of a random access message 3).

The format of the TAC and/or the scale factor is related to the sequence length of the random access preamble. For example, when the sequence length of the random access preamble is 839, the length of the TAC is 11 bits. For another example, when the sequence length of the random access preamble is 127 or 139, the length of the TAC is not greater than 8 bits (for example, 8 bits). For another example, when the sequence length of the random access preamble is 839, α=16. For another example, when the sequence length of the random access preamble is 127 or 139, α=8.

The format of the TAC and/or the scale factor is related to the sequence length of the random access preamble. For example, when the sequence length of the random access preamble is 839, the length of the TAC is 11 bits. For another example, when the sequence length of the random access preamble is 127 or 139, the length of the TAC is not greater than 8 bits (for example, 8 bits). For another example, when the sequence length of the random access preamble is 839, α=16×κ. For another example, when the sequence length of the random access preamble is 127 or 139, α=8×κ.

For another example, u indicates a subcarrier index corresponding to a subcarrier spacing used for a message 3 and/or other uplink data transmission.

In a possible design, the format of the TAC and/or the scale factor may be obtained based on signaling information of the network device, where signaling may be at least one of an RRC message, a MAC-CE message, SI, RMSI, or DCI. For example, the network device adds indication information FlagTAC to the SI. FlagTAC=0 corresponds to an 11-bit format of the TAC and the scale factor of 16. FlagTAC=1 corresponds to an 11-bit format of the TAC and the scale factor of 8.

In a possible design, the format of the TAC and/or the scale factor may be obtained based on signaling information of the network device, where signaling may be at least one of an RRC message, a MAC-CE message, SI, RMSI, or DCI. For example, the network device adds indication information FlagTAC to the SI. FlagTAC=0 corresponds to an 11-bit format of the TAC and the scale factor of 16×κ. FlagTAC=1 corresponds to an 11-bit format of the TAC and the scale factor of 8×κ.

In another possible design, during updating of the timing advance, the terminal device may determine the initial timing advance based on at least one of the TAC value, the subcarrier spacing index, the scale factor, the sequence length of the random access preamble, and the basic time unit. For example, the timing advance is calculated by using the following formula:

$$N_{TA,new}=N_{TA,old}+(T_A-N_U) \times \alpha \times \kappa \times 2^u,$$

where $N_{TA,old}$ indicates a previously updated TAC value, and $N_U$ is a constant, for example, $N_U$ may be a value such as 31, 15, or 7.

For another example, the timing advance is calculated based on the following formula:

$$N_{TA,new}=N_{TA,old}+(T_A-N_U) \times \alpha.$$

In another embodiment, $N_U$ may be determined based on at least one of the subcarrier spacing, the sequence length of the random access preamble, and the format of the TAC. For example, the length of the TAC is 6 bits, and $N_U$ is 31. For another example, the length of the TAC is 5 bits, and $N_u$ is 15. For another example, the length of the TAC is 4 bits, and $N_u$ is 7. For selection of another parameter, refer to the method in the formula in the initial synchronization update process. Details are not described herein again.

In another embodiment, a value of $N_U$, and the format of the TAC and/or the scale factor are related to the format of the random access preamble, the length of the random access preamble, a carrier frequency of the random access preamble, a band of the random access preamble (a carrier frequency and a band of a random access resource corresponding to the random access preamble), a quantity of random access occasions (RACH occasion, RO) in a slot, a quantity of downlink signals on a random access resource in a slot, a quantity of random access response messages corresponding to a slot, a quantity of random access preambles on an RO, a quantity of ROs associated with a downlink signal, a total quantity of random access preambles or resources associated with a downlink signal, a quantity of actually sent downlink signals, an RO time length, a subcarrier spacing, a bandwidth, a frame structure, and a service type. A specific method is similar to that of the foregoing paging message window, and details are not described herein again.

In another embodiment, a scale factor used when an uplink timing advance is updated is the same as that obtained in a random access process. In another embodiment, the scale factor used when the uplink timing advance is updated is different from that obtained in the random access process. For example, the scale factor used during random access is 16, but the scale factor used when the uplink timing advance is updated is 8. For another example, a subcarrier spacing used for a message 3 during random access is 15 kHz and a used scale factor is 16; and a subcarrier spacing used during uplink data communication is 30 kHz and the scale factor used when the timing advance is updated is 8.

When the length of the random access preamble decreases, the network device supports smaller coverage, and a corresponding TAC value decreases. In this case, the network device can reduce the length of the TAC and/or reduce the value of the scale factor.

For example, when the length L of the random access preamble is 127/139, the length of the TAC is any value of 1 to 10, for example, the length of the TAC is 8 bits.

For another example, when the length L of the random access preamble is 127/139, the scale factor is any value of 0 to 16, and further specifically, may be any value of 0.25, 0.5, 1, 2, 4, 8, 16, 32, and 64.

For another example, when the length L of the random access preamble is 127/139, the length of the TAC is any value of 1 to 10, and the scale factor is any value of 0.25, 0.5, 1, 2, 4, 8, 16, 32, and 64.

In a possible design, the determining the fixed timing advance offset includes: determining the fixed timing advance offset based on at least one parameter of the format of the random access preamble, the sequence length of the random access preamble, the carrier frequency of the random access preamble, the band of the random access preamble (a carrier frequency and a band of a random access resource corresponding to the random access preamble), a quantity of random access occasions (RACH occasion, RO) in a slot, a subcarrier spacing of uplink data (or a subcarrier spacing index u of uplink data), a quantity of downlink signals on a random access resource in a slot, a quantity of random access response messages corresponding to a slot, a quantity of random access preambles on an RO, a quantity of ROs associated with a downlink signal, a total quantity of random access preambles or resources associated with a downlink signal, a quantity of actually sent downlink signals, a quantity of actually transmitted downlink signals, an RO time length, a subcarrier spacing, a bandwidth, a frame structure, and a service type. For example, the timing advance offset may be applied so that the terminal device sends data to the network device by advancing $(N_{TA} + N_{TAoffset}) \times T_s$ moments. $N_{TAoffset}$ is a fixed timing advance offset, or may be referred to as a timing advance offset. For another example, the timing advance offset is used for switching between uplink and downlink data transmission.

For example, the timing advance offset is determined based on the following formula:

$$N_\Delta = \beta_u \times T_s \times 2^u,$$

where $N_\Delta$ is the timing advance offset, where the timing advance offset is used for switching between uplink and downlink data transmission, $\beta_u$ indicates an offset factor corresponding to a subcarrier of the terminal device, $T_s$ indicates a basic time unit of the terminal device, and u indicates a subcarrier index.

For another example, the timing advance offset is determined based on the following formula: $N_\Delta = \beta_u \times \alpha$ basic time units. $\alpha$ is a scale factor, for example, $\alpha = \kappa$, and c is any value of 0.125, 0.25, 0.5, 1, 2, 4, 8, 16, 32, and 64.

For another example, the timing advance offset is determined based on the following formula:

$$N_\Delta = \alpha_u \times N_{TA,offset}^{ref} \times T_s \times 2^u,$$

where $\alpha_u$ indicates a scale factor corresponding to a subcarrier of the terminal device, $N_{TA,offset}^{ref}$ indicates a reference timing advance offset, $T_s$ indicates a basic time unit of the terminal device, and u indicates a current subcarrier index.

For another example, the timing advance offset is determined based on the following formula: $N_\Delta = N_{TA,offset}^{ref} \times \alpha_\mu$ basic time units. $\alpha_\mu$ indicates a scale factor corresponding to a subcarrier of the terminal device, and u indicates a current subcarrier index.

Specifically, an NR system supports a plurality of numerologies, for example, subcarrier spacings such as 15 kHz, 30 kHz, 120 kHz, 240 kHz, and 480 kHz. Different subcarrier spacings have different sampling frequencies. For example, a 15 kHz subcarrier spacing has a sampling frequency of 30.72 MHz, and correspondingly, $T_{s,0} = 1/30.72e6$; a 30 kHz subcarrier spacing has a sampling frequency of 61.44 MHz, and correspondingly, $T_{s,1} = 1/61.44e6$; a 60 kHz subcarrier spacing has a sampling frequency of 122.88 MHz, and correspondingly, $T_{s,2} = 1/122.88e6$; a 120 kHz subcarrier spacing has a sampling frequency of 245.76 MHz, and correspondingly, $T_{s,3} = 1/245.76e6$; and a 240 kHz subcarrier spacing has a sampling frequency of 491.52 MHz, and correspondingly, $T_{s,4} = 1/491.52e6$. Different sampling frequencies have different sampling intervals (that is, basic time units), a relatively large subcarrier spacing has a relatively small sampling interval, a relatively small subcarrier spacing has a relatively large sampling interval, and the sampling interval may also be a time unit or a basic time unit.

Based on different subcarrier spacings, the terminal device or the network device may calculate the timing advance offset based on the foregoing formula. For example, when the subcarrier spacing is 15 kHz, an offset factor $N_\Delta = 156 \times T_{s,0}$; when the subcarrier spacing is 30 kHz, an offset factor is $312 \times T_{s,1}$; when the subcarrier spacing is 60 kHz, an offset factor $N_\Delta = 624 \times T_{s,2}$; when the subcarrier spacing is 120 kHz, an offset factor $N_\Delta = 1248 \times T_{s,3}$; and when the subcarrier spacing is 240 kHz, an offset factor $N_\Delta = 1248 \times T_{s,4}$.

In a possible design, based on different subcarrier spacings, the terminal device or the network device may calculate the timing advance offset based on the foregoing formula. For example, when the subcarrier spacing is 15 kHz, the timing advance offset $N_A=156 \times T_{s,0}$; when the subcarrier spacing is 30 kHz, the timing advance offset is $312 \times T_{s,1}$; when the subcarrier spacing is 60 kHz, the timing advance offset $N_A=624 \times T_{s,2}$; when the subcarrier spacing is 120 kHz, the timing advance offset $N_A=1248 \times T_{s,3}$; and when the subcarrier spacing is 240 kHz, the timing advance offset $N_A=1248 \times T_{s,4}$.

In a possible design, the determining the timing advance offset includes:

$$N_A=\beta_u \times T_s \times \kappa \times 2^{-u}.$$

$\beta_u$ indicates an offset factor of the subcarrier of the terminal device and is a constant. The offset factor $\beta_u$ is related to the format of the random access preamble, the length of the random access preamble, the carrier frequency of the random access preamble, the band of the random access preamble (a carrier frequency and a band of a random access resource corresponding to the random access preamble), a quantity of random access occasions (RACH occasion, RO) in a slot, a subcarrier spacing of uplink data (or a subcarrier spacing index u of uplink data), a quantity of downlink signals on a random access resource in a slot, a quantity of random access response messages corresponding to a slot, a quantity of random access preambles on an RO, a quantity of ROs associated with a downlink signal, a total quantity of random access preambles or resources associated with a downlink signal, a quantity of actually sent downlink signals, a quantity of actually transmitted downlink signals, an RO time length, a subcarrier spacing, a bandwidth, a frame structure, and a service type.

For another example, the determining the timing advance offset includes: $N_A=\beta_u \times \alpha$ basic time units.

In a possible design, the determining the timing advance offset includes:

$$N_A=\alpha_u \times N_{TA,offset}^{ref} \times T_s \times \kappa \times 2^{-u},$$

where $\alpha_u$ indicates a scale factor corresponding to the subcarrier of the terminal device, and $N_{TA,offset}^{ref}$ indicates a reference timing advance offset.

For another example, the determining the timing advance offset includes $N_A=N_{TA,offset}^{ref} \times \alpha_\mu$ basic time units.

The offset factor $\beta_u$ is related to the format of the random access preamble, the length of the random access preamble, the carrier frequency of the random access preamble, the band of the random access preamble (a carrier frequency and a band of a random access resource corresponding to the random access preamble), a quantity of random access occasions (RACH occasion, RO) in a slot, a subcarrier spacing of uplink data (or a subcarrier spacing index u of uplink data), a quantity of downlink signals on a random access resource in a slot, a quantity of random access response messages corresponding to a slot, a quantity of random access preambles on an RO, a quantity of ROs associated with a downlink signal, a total quantity of random access preambles or resources associated with a downlink signal, a quantity of actually sent downlink signals, a quantity of actually transmitted downlink signals, an RO time length, a subcarrier spacing, a bandwidth, a frame structure, and a service type.

For another example, the timing advance offset is related to the format of the random access preamble, the length of the random access preamble, the carrier frequency of the random access preamble, the band of the random access preamble (a carrier frequency and a band of a random access resource corresponding to the random access preamble), a quantity of random access occasions (RACH occasion, RO) in a slot, a subcarrier spacing of uplink data (or a subcarrier spacing index u of uplink data), a quantity of downlink signals on a random access resource in a slot, a quantity of random access response messages corresponding to a slot, a quantity of random access preambles on an RO, a quantity of ROs associated with a downlink signal, a total quantity of random access preambles or resources associated with a downlink signal, a quantity of actually sent downlink signals, a quantity of actually transmitted downlink signals, an RO time length, a subcarrier spacing, a bandwidth, a frame structure, and a service type.

In a possible design, when subcarrier spacings are the same, different sampling frequencies correspond to different timing advance offsets. For example, when the subcarrier spacing is 480 kHz, two terminal devices having a sampling frequency of 480×2048 kHz and a sampling frequency of 480×4096 kHz may have different timing advance offsets.

In a possible design, different bands correspond to different offset factors.

For example, when the frequency is less than 6 GHz, the offset factor is K1 (for example, K1=624); and when the frequency is greater than 6 GHz, the offset factor is K2 (for example, K2=312). Optionally, K1≥K2, and K1 and K2 may be any values between 1 and 624.

In a possible design, different bands correspond to different timing advance offsets. For example, when the frequency is less than 6 GHz, the timing advance offset is K1 (for example, K1=624); and when the frequency is greater than 6 GHz, the timing advance offset is K2×κ (for example, K2=312). Optionally, K1≥K2, and K1 and K2 may be any values between 1 and 624.

In a possible design, the timing advance offset is a fixed value. For example, the timing advance offset is any one of 20 μs, 10 μs, 5 μs, or 2.5 μs for different subcarrier spacings and different sampling frequencies.

For example, the timing advance offset is K3 reference time units for different subcarrier spacings and different sampling frequencies. The reference time unit may be a minimum basic time unit. A calculation method of the minimum basic time unit is as follows: The subcarrier spacing $\Delta f_{max}$ is 480 kHz and $N_{f,max}=4096$, and the minimum basic time unit is $T_s=1/(480000 \times 4096)$. The reference time unit may alternatively be a maximum time unit. A calculation method of the maximum basic time unit is as follows: The subcarrier spacing $\Delta f_{max}$ is 15 kHz and $N_{f,max}=2048$, and the maximum basic time unit $T_s=1/(15000 \times 2048)$. The reference time unit may alternatively be an intermediate value of the minimum basic time unit and the maximum basic time unit. K3 may be any one of 624, 312, 156, 78, 39, 32, 16, 8, 4, and 2, or any one between 1 and 624.

For another example, the fixed timing advance offset is further related to another parameter. The another parameter includes, but is not limited to, at least one of the following: the format of the random access preamble, the sequence length, the carrier frequency, and the band of the random access preamble, a quantity of ROs in a slot (or a quantity of downlink signals on a random access resource associated with a slot, or a quantity of random access response messages corresponding to a slot), a quantity of random access preambles on an RO, a quantity of ROs associated with a downlink signal, a total quantity of random access preambles associated with a downlink signal, an RO time length, a subcarrier spacing, a service type, a quantity of paging user groups, a quantity of paging messages, and a quantity of random access preambles associated with the paging message.

A fixed timing advance offset factor is further related to another parameter. The another parameter includes, but is not limited to, at least one of the following: the format of the random access preamble, the sequence length, the carrier frequency, and the band of the random access preamble, a quantity of ROs in a slot (or a quantity of downlink signals on a random access resource associated with a slot, or a quantity of random access response messages corresponding to a slot), a quantity of random access preambles on an RO, a quantity of ROs associated with a downlink signal, a total quantity of random access preambles associated with a downlink signal, an RO time length, a subcarrier spacing, a service type, a quantity of paging user groups, a quantity of paging messages, and a quantity of random access preambles associated with the paging message.

In a possible design, in a random access procedure, a time unit in each step is related to a subcarrier spacing used by the terminal device. For example, steps in the random access process include: steps of transmitting a message 1 (msg1, also referred to as a random access preamble), a message 2 (msg2, also referred to as a random access response), a message 3 (msg3), and a message 4 (msg4).

In an implementation, after sending the random access preamble (the message 1), the terminal device needs to monitor, in a random access response window, a PDCCH corresponding to the message 2. A start time of the random access response window is determined based on at least one of the last sending time of the message 1, a constant k0 predefined or prestored or configured by the network device, and a subcarrier spacing of the message 2; or a length of the random access response window is determined based on the subcarrier spacing of the message 2 and/or an initial length that is of the random access response window and that is configured by the network device.

After the terminal device receives the random access response corresponding to the random access preamble, a start time at which the terminal device sends the message 3 is determined based on at least one of the last receiving time of the message 2, the subcarrier spacing of the message 3, a predefined constant k1, and a delay k2 configured by the network device. A value of k2 may be configured by using at least one of a random access response, a MAC CE, DCI, SI, and RRC signaling.

After sending the message 3, the terminal device needs to monitor the message 4 at time and frequency locations corresponding to the message 4 (or a CORESET of a PDCCH of the message 4). The time location at which the message 4 is monitored may be determined based on at least one of a time k4 predefined or prestored or configured by the network device and the subcarrier spacing of the message 4, and the frequency location at which the message 4 is monitored is predefined or prestored or configured by the network device.

In the random access process, based on different subcarrier spacings, timing time units of the terminal device or the network device are also different. The time unit is a slot or a subframe for different subcarrier spacings. For example, a time unit slot of an uplink signal (the message 1 and/or the message 3) having a 15 kHz subcarrier spacing is 1 ms; and a time unit slot of a downlink signal (the message 2 and/or the message 4) having a 120 kHz subcarrier spacing is 125 μs. Therefore, the message 1, the message 2, the message 3, and the message 4 are related to different time units.

Embodiment A1

A time unit (marked as S1) and a specific time of the message 1 are specified through configuration by using a random access resource. A time unit (marked as S2) of the message 2 is determined based on the subcarrier spacing of the message 2; a time unit (marked as S3) of the message 3 is determined based on the subcarrier spacing of the message 3; and a time unit (marked as S4) of the message 4 is determined based on the subcarrier spacing of the message 4. However, because the subcarrier spacings of the message 1, the message 2, the message 3, and the message 4 may be different and there is a time sequence relationship, time alignment of the message 1, the message 2, the message 3, and the message 4 needs to be considered. Specifically, the sending time of the message 2 is determined based on a time at which sending of the message 1 is completed, and a time of the message 2 is determined based on the random access response window, including the start time and the window size of the random access response window; the sending time of the message 3 is determined based on an uplink scheduling grant in the message 2; and a sending time of the message 4 is determined by the base station, and a CORESET of the message 4 (referring to time and frequency resource locations of a PDCCH corresponding to the message 4) is predefined in a protocol or configured by the base station by using signaling.

Embodiment A2

In an implementation, the time unit S2 of the message 2 is determined based on the subcarrier spacing of the message 2 and/or indication information of the base station. The random access response window and the start time of the window size may be determined based on at least one of the time unit S2 of the message 2, the time unit S1 of the message 1, the initial time length k0 of the random access response window, and a length L of the random access response window. For example, the time at which sending of the message 1 is completed is T (based on the time unit S1 of the message 1). If the start time of the random access response window is based on the time unit S1 and the initial time length is k0, the time unit of the start time of the random access response window is ceil((T+k0)*S1/S2) in the message 2. If the start time of the response window is based on the time unit S1 and the initial time length is k0, the time unit of the start time of the random access response window is ceil(T*S1/S2)+k0 in the message 2. For another example, if the length of the random access response window is based on the time unit S1 and the length is L, the time unit of the start time of the random access response window is ceil(L*S1/S2) in the message 2.

Embodiment A3

In an implementation, the time unit S3 of the message 3 is determined based on at least one of the subcarrier spacing of the message 3 and/or the indication information of the base station. The sending time of the message 3 is determined based on at least one of a receiving time n of the message 2, a processing delay of the message 2, an uplink and downlink switching delay k1 (predefined in a protocol or prestored or configured by the base station by using signaling), an offset k2 specified in the message 2, the time unit S2 of the message 2, and the time unit S3 of the message 3. For example, the receiving time of the message 2 is n (based on the time unit S2 of the message 2). If the time k1 is based on the time unit S2 and the time k2 is based on the time unit S2, the sending time of the message 3 (at the time unit S3 of the message 3) is ceil((n+k1+k2)*S2/S3); if the time k1 is based on the time unit S2 and the time k2 is based on the time unit S3, the sending time of the message 3 (at the time unit S3 of the message 3) is ceil(((n+k1)*S2+k2*S3)/S3); if the time k1 is based on the time unit S3 and the time k2 is based on the time unit S2, the sending time of the kHz mini-slot (for example, 1 to 13 OFDM symbols, specifically, 2/4/7 OFDM symbols), S3 is based on a 15 kHz slot, and S4 is based on a 15 kHz slot. More other examples are shown in the following Table 7. In the table, the second to the fourth and the sixth to the eighth columns in a same row separately correspond to a possible subcarrier spacing combination of different carrier frequencies. In each subcarrier spacing, a time granularity may be based on a slot, or a mini-slot of different OFDM symbol quantities. This is not limited herein, that is, combination may be performed in any manner.

TABLE 7

| Preamble format | S0/S2/S4 | S1 | S3 | Preamble format | S0/S2/S4 | S1 | S3 |
|---|---|---|---|---|---|---|---|
| Subcarrier spacing combination when a carrier frequency <6 GHz | 15 kHz | 15 kHz | 15 kHz | Subcarrier spacing combination when a carrier frequency >6 GHz | 120 kHz | 60 kHz | 60 kHz |
| | 15 kHz | 15 kHz | 30 kHz | | 120 kHz | 60 kHz | 120 kHz |
| | 15 kHz | 15 kHz | 60 kHz | | 120 kHz | 60 kHz | 240 kHz |
| | 15 kHz | 30 kHz | 15 kHz | | 120 kHz | 120 kHz | 60 kHz |
| | 15 kHz | 30 kHz | 30 kHz | | 120 kHz | 120 kHz | 120 kHz |
| | 15 kHz | 30 kHz | 60 kHz | | 120 kHz | 120 kHz | 240 kHz |
| | 30 kHz | 15 kHz | 15 kHz | | 240 kHz | 60 kHz | 60 kHz |
| | 30 kHz | 15 kHz | 30 kHz | | 240 kHz | 60 kHz | 120 kHz |
| | 30 kHz | 15 kHz | 60 kHz | | 240 kHz | 60 kHz | 240 kHz |
| | 30 kHz | 30 kHz | 15 kHz | | 240 kHz | 120 kHz | 60 kHz |
| | 30 kHz | 30 kHz | 30 kHz | | 240 kHz | 120 kHz | 120 kHz |
| | 30 kHz | 30 kHz | 60 kHz | | 240 kHz | 120 kHz | 240 kHz |
| | 60 kHz | 15 kHz | 15 kHz | | 60 kHz | 60 kHz | 60 kHz |
| | 60 kHz | 15 kHz | 30 kHz | | 60 kHz | 60 kHz | 120 kHz |
| | 60 kHz | 15 kHz | 60 kHz | | 60 kHz | 60 kHz | 240 kHz |
| | 60 kHz | 30 kHz | 15 kHz | | 60 kHz | 120 kHz | 60 kHz |
| | 60 kHz | 30 kHz | 30 kHz | | 60 kHz | 120 kHz | 120 kHz |
| | 60 kHz | 30 kHz | 60 kHz | | 60 kHz | 120 kHz | 240 kHz |

Note:
For all the foregoing subcarriers, a measure maybe further grouped into a slot and a mini-slot. A mini-slot maybe 1 to 13 OFDM symbols in a corresponding subcarrier spacing, for example, a length of 2, 4, or 7 OFDM symbols. A length of a time unit and/or a mini-slot may be indicated by configuration information of the base station, or may be predefined.

message 3 (at the time unit S3 of the message 3) is ceil(((n+k2)*S2+k1*S3)/S3) or ceil(((n+k2)*S2)/S3)+k1; if the time k1 is based on the time unit S3 and the time k2 is based on the time unit S3, the sending time of the message 3 (at the time unit S3 of the message 3) is ceil((n*S2+(k1+k2)*S3)/S3) or ceil((n*S2)/S3)+(k1+k2).

Embodiment A4

In an implementation, the time unit S4 of the message 4 is determined based on the subcarrier spacing of the message 4 and/or the indication information of the base station. The time location of the CORESET of the message 4 may be specified as k4 (which may be a time location or may be a time location set) based on a system message, and is determined based on at least one of the time unit S3 of the message 3, a sending time T3 of the message 3 (based on the time unit S3 of the message 3), a synchronization signal, and/or the time unit S0 of the system message. For example, if the time location k4 of the CORESET of the message 4 is based on the time unit S0 of the system message, a possible time location of the CORESET is ceil((T3*S3+k4*S0)/S4); and if the time location k4 of the CORESET of the message 4 is based on the time unit S4 of the message 4, a possible time location of the CORESET is ceil((T3*S3+k4*S4)/S4) or ceil(T3*S3/S4)+k4.

In the foregoing embodiment, any two of S0 to S4 are based on different time granularities and subcarrier spacings. For example, S0 is based on a 15 kHz mini-slot (for example, 1 to 13 OFDM symbols, specifically, 2/4/7 OFDM symbols), S1 is based on a 15 kHz slot, S2 is based on a 15

In all the foregoing embodiments A1 to A4, the time measure and the time unit have a same meaning, and may be a subframe, a slot, a mini-slot, an OFDM symbol, or an absolute time. The slot, the mini-slot, and the OFDM symbol are a time length corresponding to a subcarrier of a corresponding message (for example, a synchronization signal, a system message, the random access preamble, the message 2, the message 3, or the message 4). In another implementation, the foregoing time measures (or the time units) may be converted into each other, or converted into an absolute time (for example, a millisecond and a second), or converted into a combination of a plurality of time measures (for example, 18 OFDM symbols may be converted into 1 slot and 4 OFDM symbols).

In another implementation, random access may fail. For example, sending of the random access preamble fails, sending of the random access response fails, sending of the message 3 fails, or a conflict occurs. After random access fails, retransmission is required, and a retransmission time may be determined based on at least one of a backoff time, a receiving time of the random access response, the last time of the random access response window, the subcarrier spacing of the message 1, a carrier frequency, and a service type.

Embodiment 1

If the random access response is received at an $n^{th}$ time (herein, the time is based on the time unit of the message 2, and may be a subframe, a slot, a mini-slot, or an OFDM symbol), a corresponding downlink shared channel does not include a response of an already sent random access preamble, and an upper layer instructs to continue to retransmit the message 1, the terminal device should send a new random access preamble after a k1$^{th}$ time not later than the n$^{th}$ time (herein, the time is based on the time unit of the message 1, and may be a subframe, a slot, a mini-slot, or an OFDM symbol). Specifically, for example, the time unit of the message 2 is S2, the time unit of the message 1 is S1, and the time unit of k1 is S1 (that is, the same time unit as that of the message 1). In this case, a sending time of a new random access preamble is ceil(n*S2/S1)+k1, where k1 is a non-negative integer, for example, k1=0, k1=1, k1=2, k1=3, k1=4, or k1=5. For another example, S1=1 ms and S2=125 μs, that is, a sending time of a new random access preamble is ceil(n/8)+k1.

Embodiment 2

If the random access response is received at an n$^{th}$ time (herein, the time is based on the time unit of the message 2, and may be a subframe, a slot, a mini-slot, or an OFDM symbol), a corresponding downlink shared channel does not include a response of an already sent random access preamble, and an upper layer instructs to continue to retransmit the message 1, the terminal device should send a new random access preamble at a k1$^{th}$ time not later than the n$^{th}$ time (herein, the time is based on the time unit of the message 2, and may be a subframe, a slot, a mini-slot, or an OFDM symbol). Specifically, for example, the time unit of the message 2 is S2, the time unit of the message 1 is S1, and the time unit of k1 is S2 (that is, the same time unit as that of the message 2). In this case, a sending time of a new random access preamble is ceil((n+1(1)*S2/S1), where k1 is a non-negative integer, for example, k1=0 to 40. For another example, S1=1 ms and S2=125 μs, that is, a sending time of a new random access preamble is ceil((n+k1)/8).

Embodiment 3

If the random access response is received at an n$^{th}$ time (herein, the time is based on the time unit of the message 2, and may be a subframe, a slot, a mini-slot, or an OFDM symbol), a corresponding downlink shared channel does not include a response of an already sent random access preamble, and an upper layer instructs to continue to retransmit the message 1, the terminal device should send a new random access preamble at a k1$^{th}$ time not later than the n$^{th}$ time (herein, the time is based on the time unit S3 different from that of the message 2 or the message 1). Specifically, for example, the time unit of the message 2 is S2, the time unit of the message 1 is S1, and the time unit of k1 is S3. In this case, a sending time of the new random access preamble is ceil((n*S2+k1*S3)/S1), where k1 is a non-negative integer, for example, k1=0 to 40. For another example, S1=1 ms, S2=125 μs, and S3=0.5 ms, that is, the sending time of the new random access preamble is ceil((n+4*k1)/8).

Embodiment 4

If no random access response (that is, the message 2) is received at the last n$^{th}$ time in the random access response window (herein, the time is based on the time unit of the message 2, and may be a subframe, a slot, a mini-slot, or an OFDM symbol), and an upper layer instructs to continue to retransmit the message 1, the terminal device should send a new random access preamble after a k2th time not later than the n$^{th}$ time (herein, the time is based on the time unit of the message 1, and may be a subframe, a slot, a mini-slot, or an OFDM symbol). Specifically, for example, the time unit of the message 2 is S2, the time unit of the message 1 is S1, and the time unit of k2 is S1 (that is, the same time unit as that of the message 1). In this case, a sending time of the new random access preamble is ceil(n*S2/S1)+k2, where k2 is a non-negative integer, for example, k2=0, k2=1, k2=2, k2=3, or k2=4. For another example, S1=1 ms and S2=125 μs, that is, the sending time of the new random access preamble is ceil(n/8)+k2.

Embodiment 5

If no random access response (that is, the message 2) is received at the last n$^{th}$ time in the random access response window (herein, the time is based on the time unit of the message 2, and may be a subframe, a slot, a mini-slot, or an OFDM symbol), and an upper layer instructs to continue to retransmit the message 1, the terminal device should send a new random access preamble at a k2th time not later than the n$^{th}$ time (herein, the time is based on the time unit of the message 2, and may be a subframe, a slot, a mini-slot, or an OFDM symbol). Specifically, for example, the time unit of the message 2 is S2, the time unit of the message 1 is S1, and the time unit of k2 is S2 (that is, the same time unit as that of the message 2). In this case, a sending time of the new random access preamble is ceil((n+k2)*S2/S1), where k2 is a non-negative integer, for example, k2=0 to 40. For another example, S1=1 ms and S2=125 μs, that is, the sending time of the new random access preamble is ceil((n+k2)/8).

Embodiment 6

If no random access response (that is, the message 2) is received at the last n$^{th}$ time in the random access response window (herein, the time is based on the time unit of the message 2, and may be a subframe, a slot, a mini-slot, or an OFDM symbol), and an upper layer instructs to continue to retransmit the message 1, the terminal device should send a new random access preamble at a k2th time not later than the n$^{th}$ time (herein, the time is based on the time unit S3 different from that of the message 2 or the message 1). Specifically, for example, the time unit of the message 2 is S2, the time unit of the message 1 is S1, and the time unit of k2 is S3. In this case, a sending time of the new random access preamble is ceil((n*S2+k2*S3)/S1), where k2 is a non-negative integer, for example, k2=0 to 40. For another example, S1=1 ms, 52=125 μs, and S3=0.5 ms, that is, the sending time of the new random access preamble is ceil((n+4*k2)/8).

In another embodiment, time units of k1 in Embodiment 1 to Embodiment 3 and k2 in Embodiment 4 to Embodiment 6 are respectively completely the same, and only conditions under which the random access preamble is sent again are different. Time units of the message 1 in Embodiment 1 to Embodiment 3 and the message 1 in Embodiment 4 to Embodiment 6 are respectively completely the same, and only conditions under which the random access preamble is sent again are different. Time units of the message 2 in Embodiment 1 to Embodiment 3 and the message 2 in Embodiment 4 to Embodiment 6 are respectively completely the same, and only conditions under which the random access preamble is sent again are different.

In another embodiment, values of k1 and k2 are related to at least one of a cause, an event, and a service type triggering random access, and a carrier frequency of random access. For example, a service type triggering a random access preamble is a low-delay service, k1=2 and k2=2; otherwise, k1=5 and k2=4. For another example, when the carrier frequency is less than 6 GHz, k1=5 and k2=4, and when the carrier frequency is greater than 6 GHz, k1=10 and k2=8. In this embodiment, the values of k1 and k2 are only used as an example for description, and may be other values in practice or are determined based on another manner.

In all the foregoing embodiments, ceil(x/y) indicates rounding a result obtained by dividing x by y up to the nearest integer. If x is an integer multiple of y, no ceil operation may be required. In another embodiment, the ceil function may be replaced by another function, for example, round or floor that respectively corresponds to rounding off and rounding down to the nearest integer.

In all the foregoing embodiments 1 to 6, the time measure and the time unit have a same meaning, and may be a subframe, a slot, a mini-slot, or an OFDM symbol. The slot, the mini-slot, and the OFDM symbol are a time length corresponding to a subcarrier of a corresponding message (for example, a synchronization signal, a system message, the random access preamble, the message 2, the message 3, or the message 4). In another implementation, the foregoing time measures (or the time units) may be converted into each other, or converted into an absolute time (for example, a millisecond and a second), or converted into a combination of a plurality of time measures (for example, 18 OFDM symbols may be converted into 1 slot and 4 OFDM symbols).

In another embodiment, the message 2 includes backoff value indication information BI (backoff indicator). A waiting time measure that is specified in the field and that is used by the UE to retransmit a random access preamble sequence is related to the format of the random access preamble, the length of the random access preamble, the carrier frequency of the random access preamble, the band of the random access preamble (a carrier frequency and a band of a random access resource corresponding to the random access preamble), a quantity of random access occasions (RACH occasion, RO) in a slot, a subcarrier spacing of uplink data (or a subcarrier spacing index u of uplink data), a quantity of downlink signals on a random access resource in a slot, a quantity of random access response messages corresponding to a slot, a quantity of random access preambles on an RO, a quantity of ROs associated with a downlink signal, a total quantity of random access preambles associated with a downlink signal, a quantity of actually transmitted downlink signals, an RO time length, a subcarrier spacing, a bandwidth, a frame structure, a service type, a random access resource period (or a quantity of random access resources associated with a downlink signal in a downlink signal set or a time length occupied by the random access resources), a quantity of synchronization signal blocks of a downlink signal, a quantity of actually sent downlink signals, a service type, a carrier frequency, a frame structure, a band, and a bandwidth. The subcarrier spacing may be a subcarrier spacing of an SS/PBCH, RMSI, msg1, msg2, msg3, and the like. A specific related manner is similar to that in the foregoing embodiments, and details are not described herein again.

Based on the description in the embodiment of FIG. 4, the network device determines different TAC formats and different TA precision based on different lengths of the random access preambles, to reduce RAR signaling overheads and improve TA precision on a UE side. Time offsets of uplink and downlink switching of different numerologies are different, and different time offsets of uplink and downlink switching are defined for different numerologies, to improve application flexibility. Random access processes of different numerologies require different time units, to improve time timing precision.

In a next-generation communications system (for example, an NR communications system), a same TAG (timing advance group) may have a plurality of bandwidths having different waveform parameters. The bandwidths have different subcarrier spacings and CPs (cyclic prefix), and therefore have different requirements on scale factors of transmission timing adjustments and transmission timing adjustment ranges. For example, the plurality of different subcarrier spacings and/or CPs in the same TAG may be subcarrier spacings and/or CPs of all semi-statically (semi-static) configured channels/frequency bands for uplink data transmission. The channels/frequency bands for uplink data transmission include: an initial access uplink bandwidth part, a supplementary uplink access bandwidth (supplementary uplink, SUL), a component carrier, an uplink bandwidth part (UL BWP), or an activated uplink bandwidth part (activated UL BWP), or may be all quasi co-located (QCL) subcarrier spacings used for an uplink transmission signal. The frequency resources for uplink transmission have same or similar transmission timing adjustments and/or transmission timing adjustment ranges.

In a current solution, the scale factor of the transmission timing adjustment is a fixed value. For example, the scale factor is fixed as a scale factor corresponding to a minimum subcarrier spacing in the TAG. For another example, the scale factor is fixed as a scale factor corresponding to a maximum subcarrier spacing in the TAG. For another example, the scale factor is related to a carrier frequency. When the carrier frequency is greater than $C_1$ GHz and less than $C_2$ GHz (for example, $C_1=0$ GHz and $C_2=3$ GHz, for another example, $C_1=0$ GHz and $C_2=6$ GHz, for another example, $C_1=0$ GHz and $C_2=30$ GHz, for another example, $C_1=0$ GHz and $C_2=40$ GHz, for another example, $C_1=3$ GHz and $C_2=6$ GHz, for another example, $C_1=6$ GHz and $C_2=30$ GHz, for another example, $C_1=6$ GHz and $C_2=40$ GHz, for another example, $C_1=40$ GHz and $C_2=100$ GHz, and for another example, $C_1=100$ GHz and $C_2=\infty$ GHz), the scale factor is fixed as $\alpha=16\times\kappa\times 2^{-u}$ basic time units. u is an index corresponding to a subcarrier spacing of $15\times 2^u$ kHz, for example, u is equal to any integer from 0 to 7. For another example, when the carrier frequency is greater than 0 GHz and less than 6 GHz, the scale factor is fixed as $\alpha=16\times\kappa$ or $\alpha=8\times\kappa$ or $\alpha=4\times\kappa$. For another example, when the carrier frequency is greater than 6 GHz and less than 40 GHz, the scale factor is fixed as $\alpha=4\times\kappa$ or $\alpha=2\times\kappa$ or $\alpha=1\times\kappa$. For another example, when the carrier frequency is greater than 40 GHz and less than 100 GHz, the scale factor is fixed as $\alpha=1\times\kappa$ or $\alpha=0.5\times\kappa$ or $\alpha=0.125\times\kappa$.

If a same scale factor (or is referred to as granularity) and a same transmission timing adjustment range are used in the same TAG, there is a problem of an excessively large scale factor or an excessively small transmission timing adjustment range. Therefore, a flexible scale factor configuration solution is required.

This application provides a new random access method to resolve the foregoing technical problem, and the method may further correspond to a future 5G proposal. An example is as follows:

The TAC format in the MAC CE should be able to provide both timing adjustment range and granularity for a plurality of uplink bandwidth parts (UL BWP), which are possibly with different numerologies. In one example with two UL BWPs, the SCS of UL BWP1 is 60 kHz and the SCS of UL BWP2 is 15 kHz. If the 60 kHz and 15 kHz share the same TAC format and granularity of 60 kHz, the maximum timing adjustment value for 15 kHz will be reduced by ¼, that is, reduced from ±5 km (±16.67 μs) to ±1.25 km (±4.17 μs). In TS 25.104, the path changes will be up to 10 us, for example, Path1 changes from −5 us to 5 us (copy and paste here for the easy reference). If 1 bit in the 6 bits TA command is used to indicate the TA granularity, actually the range can be up to ±((16.67+4.17)/2=±10.42 μs. Although it is slightly smaller than the LTE value, it could satisfy the following TS 25.104 test requirement.

1. Two paths, Path1 and Path2 are randomly selected from the group [−5, −4, −3, −2, −1, 0, 1, 2, 3, 4, 5] μs. The paths have equal magnitudes and equal phases.

2. After 191 ms, Path 1 vanishes and reappears immediately at a new location randomly selected from the group [−5, −4, −3, −2, −1, 0, 1, 2, 3, 4, 5] μs but excludes the point Path2. The magnitudes and the phases of the tap coefficients of Path 1 and Path 2 shall remain unaltered.

3. After an additional 191 ms, Path2 vanishes and reappears immediately at a new location randomly selected from the group [−5, −4, −3, −2, −1, 0, 1, 2, 3, 4, 5] μs but excludes the point Path1. The magnitudes and the phases of the tap coefficients of Path 1 and Path 2 shall remain unaltered.

4. The sequence in 2) and 3) is repeated.

Furthermore, for an NR cell with both normal and supplementary uplink carrier in a same TAG, the problem of sharing one common and fixed granularity will be deteriorated due to larger difference between the subcarrier spacing. For example, the SCS of UL BWP in normal uplink is 120 kHz and the SCS of UL BWP in supplementary uplink is 15 kHz. If the 120 kHz and 15 kHz share the same TAC format and granularity of 120 kHz, the maximum timing adjustment value for 15 kHz will be reduced by ⅛, that is, reduced from ±5 km to ±0.625 km. If the 120 kHz and 15 kHz share the same TAC format and granularity of 15 kHz, the minimum timing adjustment value±16×64 Ts, which is almost the same as the 120 kHz normal cyclic prefix (18×64 Ts). Similarly, the system performance of uplink transmission over the normal UL will be degraded due to unaligned uplink timing.

To avoid the insufficient or inaccurate timing adjustment, the timing granularity should be adaptive such as to satisfy the multiple numerologies. A bit in the 6 bits TA command should be used to indicate the TA granularity and timing, for example as shown in FIG. 3. Note that, if the maximum and minimum SCS is the same, that is, only one SCS, the TA adjustment value is the same as the agreement for single numerology case.

Proposal 7: One bit in the 6 bits TAC indicates the granularity for a plurality of UL BWPs with possible different numerology, where 0/1 means that granularity follows the maximum/minimum SCS of all activated UL BWPs within the TAG. Specifically, the TA adjustment value is given by:

Bit=0: granularity X follows the maximum SCS:

$$N_{TA,new}=N_{TA,old}+(TA_{5bit}-15)\times X;\text{ and}$$

Bit=1: granularity Y follows the minimum SCS:

$$N_{TA,new} = \begin{cases} N_{TA,old} + (TA_{5bit} - 15)\times Y - 16\times X, & TA_{5bit} < 16 \\ N_{TA,old} + (TA_{5bit} - 15)\times Y + 16\times X, & \tau A_{5bit} \geq 16 \end{cases}.$$

Below table 8 shows a granularity of a TA command for different SCSs.

TABLE 8

| Subcarrier spacing (kHz) | Unit | note |
|---|---|---|
| 15 | 16*64 Ts | Ts = 1/(64*30.72*10⁶) seconds |
| 30 | 8*64 Ts | |
| 60 | 4*64 Ts | |
| 120 | 2*64 Ts | |

Figure 17:
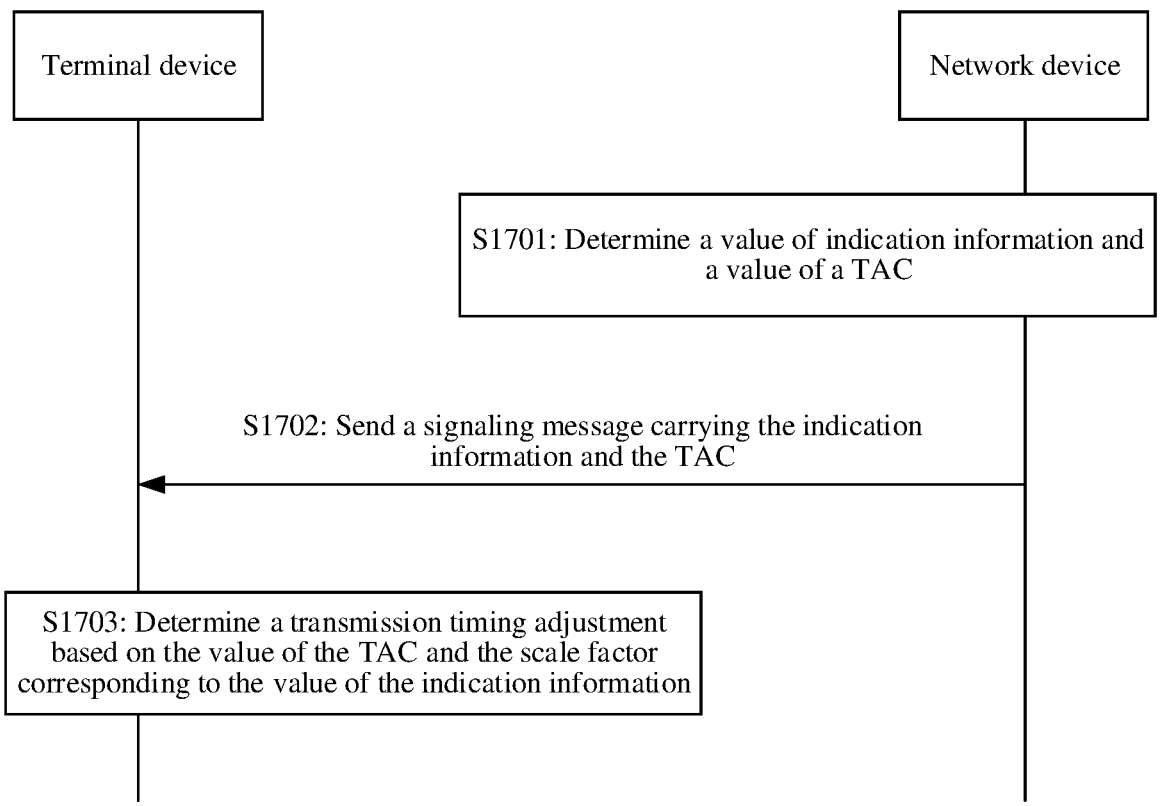
FIG. 17 is a schematic flowchart of a communication timing method according to an embodiment of the present invention.

FIG. 17 is a schematic flowchart of a data transmission method according to an embodiment of the present invention. In this embodiment of the present invention, the method includes the following steps.

S1701: A network device determines a value of indication information and a value of a TAC.

Specifically, the indication information is N1 bits, the TAC is N2 bits, and N1 and N2 are integers greater than or equal to 1. Different values of the indication information correspond to different scale factors and time adjustment ranges of the transmission timing adjustment. N1 is any integer from 1 to 3, and N2 is any integer from 3 to 8. For example, N1=1 and N2=5. Optionally, N1+N2=6.

For example, N1=1. When the value of the indication information is equal to 0, a corresponding scale factor is $\alpha_0$, and the time adjustment range of the transmission timing adjustment is indicated as:

$$N_{TA,new}=N_{TA,old}+(T_A-15)\times\alpha_0.$$

When the value of the indication information is equal to 1, a corresponding scale factor is $\alpha_1$, and the time adjustment range of the transmission timing adjustment is indicated as:

$$N_{TA,new} = \begin{cases} N_{TA,old} + (T_A - 15)\times\alpha_1 - 16\times\alpha_0, & T_A < 16 \\ N_{TA,old} + (T_A - 15)\times\alpha_1 + 16\times\alpha_0, & T_A \geq 16 \end{cases}.$$

Figure 18:
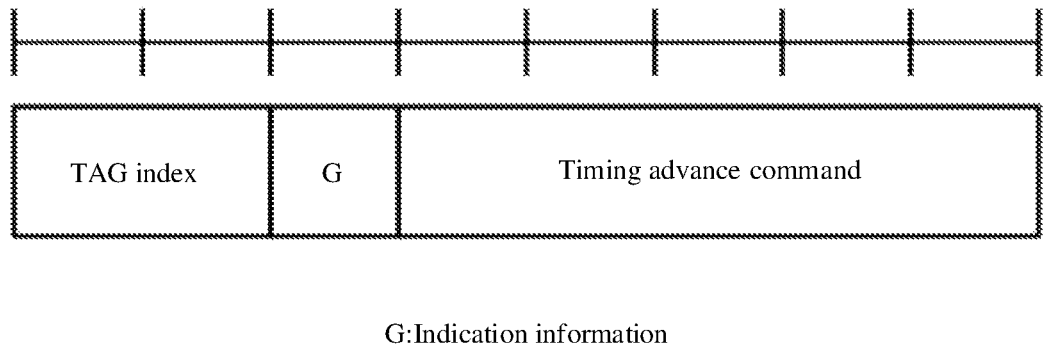
FIG. 18 is a schematic diagram of a format of a signaling message according to an embodiment of the present invention.

The time adjustment range of the transmission timing adjustment is shown in FIG. 18.

For another example, a correspondence between a subcarrier spacing and the scale factor is shown in the following table 9.

TABLE 9

| Subcarrier spacing (kHz) | Scale factor (Ts) |
|---|---|
| 15 | 16 × κ |
| 30 | 8 × κ 8 × κ |
| 60 | 4 × κ |
| 120 | 2 × κ |
| 240 | 1 × κ |
| 480 | 0.5 × κ |
| 960 | 0.25 × κ |
| 1920 | 0.125 × κ 0.125 × κ |

For another example, G=0 corresponds to the scale factor of 30 kHz and G=1 corresponds to the scale factor of 15 kHz, and $\alpha_0$=8×κ, α=16×κ. For another example, G=0 corresponds to the scale factor of 60 kHz and G=1 corresponds to the scale factor of 15 kHz, and $\alpha_0$=4×κ, $\alpha_1$,=16×κ For another example, G=0 corresponds to the scale factor of 120 kHz and G=1 corresponds to the scale factor of 15 kHz, and $\alpha_0$=2×κ, α=16×κ. For another example, G=0 corresponds to the scale factor of 240 kHz and G=1 corresponds to the scale factor of 15 kHz, and $\alpha_0$=1×κ, $\alpha_1$=16×κ. For another example, G=0 corresponds to the scale factor of 480 kHz and G=1 corresponds to the scale factor of 15 kHz, and $\alpha_0$=0.5×κ, $\alpha_1$, =16×κ. For another example, G=0 corresponds to the scale factor of 960 kHz and G=1 corresponds to the scale factor of 15 kHz, and $\alpha_0=0.25\times\kappa$, $\alpha_1=16\times\kappa$. For another example, G=0 corresponds to the scale factor of 1920 kHz and G=1 corresponds to the scale factor of 15 kHz, and $\alpha_0=0.125\times\kappa$, $\alpha_1=16\times\kappa$. For another example, G=0 corresponds to the scale factor of 60 kHz and G=1 corresponds to the scale factor of 30 kHz, and $\alpha_0=4\times\kappa$, $\alpha_1=8\times\kappa$. For another example, G=0 corresponds to the scale factor of 120 kHz and G=1 corresponds to the scale factor of 30 kHz, and $\alpha_0=2\times\kappa$, $\alpha=8\times\kappa$. For another example, G=0 corresponds to the scale factor of 240 kHz and G=1 corresponds to the scale factor of 30 kHz, and $\alpha_0=1\times\kappa$, $\alpha=8\times\kappa$. For another example, G=0 corresponds to the scale factor of 480 kHz and G=1 corresponds to the scale factor of 30 kHz, and $\alpha_0=0.5\times\kappa$, $\alpha=8\times\kappa$. For another example, G=0 corresponds to the scale factor of 960 kHz and G=1 corresponds to the scale factor of 30 kHz, and $\alpha_0=0.25\times\kappa$, $\alpha_1=8\times\kappa$. For another example, G=0 corresponds to the scale factor of 1920 kHz and G=1 corresponds to the scale factor of 30 kHz, and $\alpha_0=0.125\times 8\times\kappa$. For another example, G=0 corresponds to the scale factor of 120 kHz and G=1 corresponds to the scale factor of 60 kHz, and $\alpha_0=2\times\kappa$, $\alpha=4\times\kappa$. For another example, G=0 corresponds to the scale factor of 240 kHz and G=1 corresponds to the scale factor of 60 kHz, and $\alpha_0=1\times\kappa$, $\alpha=4\times\kappa$. For another example, G=0 corresponds to the scale factor of 480 kHz and G=1 corresponds to the scale factor of 60 kHz, and $\alpha_0=0.5\times\kappa$, $\alpha_1=4\times\kappa$. For another example, G=0 corresponds to the scale factor of 960 kHz and G=1 corresponds to the scale factor of 60 kHz, and $\alpha_0=0.25\times\kappa$, $\alpha_1=4\times\kappa$. For another example, G=0 corresponds to the scale factor of 1920 kHz and G=1 corresponds to the scale factor of 60 kHz, and $\alpha_0=0.125\times\kappa$, $\alpha_1=4\times\kappa$. For another example, G=0 corresponds to the scale factor of 240 kHz and G=1 corresponds to the scale factor of 120 kHz, and $\alpha_0=1\times\kappa$, $\alpha_1=2\times\kappa$. For another example, G=0 corresponds to the scale factor of 480 kHz and G=1 corresponds to the scale factor of 120 kHz, and $\alpha_0=0.5\times\kappa$, $\alpha_1=2\times\kappa$. For another example, G=0 corresponds to the scale factor of 960 kHz and G=1 corresponds to the scale factor of 120 kHz, and $\alpha_0=0.25\times\kappa$, $\alpha_1=2\times\kappa$. For another example, G=0 corresponds to the scale factor of 1920 kHz and G=1 corresponds to the scale factor of 120 kHz, and $\alpha_0=0.125\times\kappa$, $\alpha_1=2\times\kappa$. For another example, G=0 corresponds to the scale factor of 480 kHz and G=1 corresponds to the scale factor of 240 kHz, and $\alpha_0=0.5\times\kappa$, $\alpha_1=1\times\kappa$. For another example, G=0 corresponds to the scale factor of 960 kHz and G=1 corresponds to the scale factor of 240 kHz, and $\alpha_0=0.25\times\kappa$, $\alpha_1=1\times\kappa$. For another example, G=0 corresponds to the scale factor of 1920 kHz and G=1 corresponds to the scale factor of 240 kHz, and $\alpha_0=0.125\times\kappa$, $\alpha_1=1\times\kappa$. For another example, G=0 corresponds to the scale factor of 960 kHz and G=1 corresponds to the scale factor of 480 kHz, and $\alpha_0=0.25\times\kappa$, $\alpha_1=8\times\kappa$. For another example, G=0 corresponds to the scale factor of 1920 kHz and G=1 corresponds to the scale factor of 480 kHz, and $\alpha_0=0.125\times\kappa$, $\alpha=8\times\kappa$. G indicates the indication information.

In another possible implementation, N1=1. One TAG includes uplink bandwidth parts of a plurality of different subcarrier spacings. When the indication information G=0, the indication information indicates the scale factor of a maximum subcarrier spacing in a TAG associated with a terminal device. When the indication information G=1, the indication information indicates the scale factor of a minimum subcarrier spacing in the TAG associated with the terminal device. In all the foregoing embodiments, the scale factors and the time adjustment ranges corresponding to the indication information G=0 and the indication information G=1 may be exchanged. For example, the value of the indication information of 0 indicates a relatively small time adjustment range and the scale factor corresponding to the maximum subcarrier in the TAG associated with the terminal device; and the value of the indication information of 1 indicates a relatively large time adjustment range and the scale factor corresponding to the minimum subcarrier in the TAG associated with the terminal device.

S1702: The network device sends, to the terminal device, a signaling message carrying the indication information and the TAC, and the terminal device receives the signaling message from the network device.

Specifically, the signaling message may be a MAC CE or DCI. Optionally, the signaling message further includes a timing advance group index TAG index, and the timing advance group is used to indicate an index of the TAG associated with the terminal device. For example, the signaling message is shown in FIG. 18.

S1703: The terminal device determines a transmission timing adjustment based on the value of the TAC and the scale factor corresponding to the value of the indication information.

Specifically, the terminal device determines the associated scale factor based on the value of the indication information, determines the transmission timing adjustment based on the scale factor and the value of the TAC, and sends an uplink signal based on the determined transmission timing adjustment.

In a possible implementation, N1=1; and when the value of the indication information is equal to 1, the scale factor corresponding to the value of the indication information is a prestored or preconfigured fixed value; or when the value of the indication information is equal to 0, the value of the indication information is related to a minimum subcarrier spacing in the TAG associated with the terminal device.

In a possible implementation, N1=1; and when the value of the indication information is equal to 0, the scale factor indicated by the indication information is a prestored or preconfigured fixed value; or when the value of the indication information is equal to 1, the indication information indicates the scale factor of a maximum subcarrier spacing in the TAG associated with the terminal device.

In a possible implementation, N1=1; and when the value of the indication information is equal to 0, the scale factor indicated by the indication information is a prestored or preconfigured fixed value; or when the value of the indication information is equal to 1, the indication information indicates the scale factor corresponding to the minimum subcarrier spacing in the TAG associated with the terminal device.

The fixed value is related to a carrier frequency. For example, when the carrier frequency is greater than 0 GHz and less than 6 GHz, a fixed scale factor is $16\times\kappa$ or $8\times\kappa$ another scale factor is the scale factor corresponding to the maximum subcarrier spacing in the TAG associated with the terminal device; or another scale factor is a fixed value, for example, $8\times\kappa$ or $4\times\kappa$; or another scale factor is the scale factor corresponding to the minimum subcarrier spacing in the TAG associated with the terminal device. For another example, when the carrier frequency is greater than 6 GHz and less than 40 GHz, the fixed scale factor is $4\times\kappa$ or $2\times\kappa$, another scale factor is the scale factor corresponding to the maximum subcarrier spacing in the TAG associated with the terminal device; or another scale factor is a fixed value, for example, $2\times\kappa$ or $1\times\kappa$; or another scale factor is the scale factor corresponding to the minimum subcarrier spacing in the TAG associated with the terminal device. When the carrier frequency is greater than 40 GHz and less than 100

GHz, the fixed scale factor is 1Nκ or 0.5×κ, another scale factor is the scale factor corresponding to the maximum subcarrier spacing in the TAG associated with the terminal device; or another scale factor is a fixed value, for example, 0.5×κ or 0.25×κ; or another scale factor is the scale factor corresponding to the minimum subcarrier spacing in the TAG associated with the terminal device.

In a possible implementation, N1=1; and when the value of the indication information is equal to 0, the value of the indication information is a prestored or preconfigured first fixed value; or when the value of the indication information is equal to 1, the value of the indication information is a prestored or preconfigured second fixed value.

For example, the first fixed value is $\alpha_0 = 16 \times \kappa \times 2^{-u_0}$, and the second fixed value is $\alpha_1 = 16 \times \kappa \times 2^{-u_1}$, where $u_0$ and $u_1$ are different non-negative integers, for example, any two different integers from 0 to 7. Corresponding time adjustment ranges are respectively:

$$N_{TA,new} = N_{TA,old} + (T_A - 15) \times \alpha_0; \text{ and}$$

$$N_{TA,new} = \begin{cases} N_{TA,old} + (T_A - 15) \times \alpha_1 - 16 \times \alpha_0, & T_A < 16, \\ N_{TA,old} + (T_A - 15) \times \alpha_1 + 16 \times \alpha_0, & T_A \geq 16. \end{cases}$$

The first fixed value and the second fixed value are related to a carrier frequency range. For example, when the carrier frequency is greater than 0 GHz and less than 6 GHz, the first fixed value and the second fixed value are respectively: $\alpha_0 = 4 \times \kappa$ and $\alpha_1 = 16 \times \kappa$; or $\alpha_0 = 8 \times \kappa$ and $\alpha_1 = 16 \times \kappa$; or $\alpha_0 = 4 \times \kappa$ and $\alpha_1 = 8 \times \kappa$. For example, when the carrier frequency is greater than 6 GHz and less than 40 GHz, the first fixed value and the second fixed value are respectively: $\alpha_0 = 1 \times \kappa$ and $\alpha_1 = 4 \times \kappa$; or $\alpha_0 = 2 \times \kappa$ and $\alpha = 4 \times \kappa$; or $\alpha_0 = 1 \times \kappa$ and $\alpha_1 = 2 \times \kappa$.

In another possible implementation, N1=2 and N2=4, the value of the indication information includes 00, 01, 10, and 11, and different values of the indication information separately correspond to different scale factors and time adjustment ranges. Examples are as follows.

The indication information G=00 corresponds to the scale factor $\alpha_0$ and corresponds to the following time adjustment range:

$$N_{TA,new} = N_{TA,old} + (T_A - 7) \times \alpha_0.$$

The indication information G=01 corresponds to the scale factor $\alpha_1$ and corresponds to the following time adjustment range:

when $T_\alpha < 8, N_{TA,new} = N_{TA,old} + (T_A - 7) \times \alpha_1 - 8 \times \alpha_0;$ and when $T_\alpha \leq 8, N_{TA,new} = N_{TA,old} + (T_A - 7) \times \alpha_1 - 8 \times \alpha_0.$ The indication information G=10 corresponds to the scale factor $\alpha_2$ and corresponds to the following time adjustment range:

when $T_\alpha < 8, N_{TA,new} = N_{TA,old} + (T_A - 7) \times \alpha_2 - 8 \times (\alpha_0 + \alpha_1);$ and when $T_\alpha \leq 8, N_{TA,new} = N_{TA,old} + (T_A - 7) \times \alpha_2 - 8 \times (\alpha_0 + \alpha_1).$ The indication information G=11 corresponds to the scale factor $\alpha_3$ and corresponds to the following time adjustment range:

when $T_\alpha < 8, N_{TA,new} = N_{TA,old} + (T_A - 7) \times \alpha_3 - 8 \times (\alpha_0 + \alpha_1 + \alpha_2);$ and when $T_\alpha \leq 8, N_{TA,new} = N_{TA,old} + (T_A - 7) \times \alpha_3 - 8 \times (\alpha_0 + \alpha_1 + \alpha_2).$ In another possible implementation, in all the foregoing embodiments in which the scale factor of the TAG is related to the carrier frequency, carrier frequency ranges of all uplink channels in the TAG are the same. For example, the carrier frequency range is greater than 0 GHz and less than 6 GHz. For another example, the carrier frequency range is greater than 6 GHz and less than 40 GHz. For another example, the carrier frequency range is greater than 40 GHz and less than 100 GHz.

In another possible implementation, one TAG has a total of $N_1$ different scale factors, the TAC has $N_2$ possible values, and a 0th scale factor $\alpha_0$ corresponds to the following time adjustment range:

$$N_{TA,new} = N_{TA,old} + \left(T_A - \frac{N_2}{2} + 1\right) \times \alpha_0.$$

A time adjustment range corresponding to an $i^{th}$ scale factor $\alpha_i$ is:

when $T_A < \frac{N_2}{2}$, $$N_{TA,new} = N_{TA,old} + \left(T_A - \frac{N_2}{2} + 1\right) \times \alpha_i - \frac{N_2}{2} \times \sum_{j=0}^{i-1} \alpha_j; \text{ and}$$

when $T_A \geq \frac{N_2}{2}$, $$N_{TA,new} = N_{TA,old} + \left(T_A - \frac{N_2}{2} + 1\right) \times \alpha_i + \frac{N_2}{2} \times \sum_{j=0}^{i-1} \alpha_j.$$

Parameters in the foregoing embodiment are described below:

In a possible implementation, the scale factor of the TAC may be further indicated by DCI.

In a possible implementation, the scale factor of the TAC and the index of the TAG may be further sent by using another field of a MAC CE. For example, the scale factor of the TAC, the adjustment range, and/or the index of the TAG are sent by using an LCID (logical channel identity, the logical channel index) field in a MAC subheader, and/or are jointly indicated by other fields in a MAC subheader. Specifically, the scale factor of the TAC may be indicated by using an LCID, and different LCID values indicate different scale factors, for example, LCID values of 11, 12, 13, and 14 respectively indicate scale factors: 16×κ, 8×κ 4×κ, and 2×κ.

In this embodiment of the present invention, the terminal device determines the transmission timing adjustment based on the TAC and different scale factors indicated in the indication information carried in the signaling message, and can flexibly adjust the sending time based on different granularities and adapt to different scenarios.

FIG. 17 shows a data transmission method in an embodiment of the present invention in detail. The following provides a data receiving apparatus 19 (apparatus 19 for short below) in an embodiment of the present invention.

Figure 19:
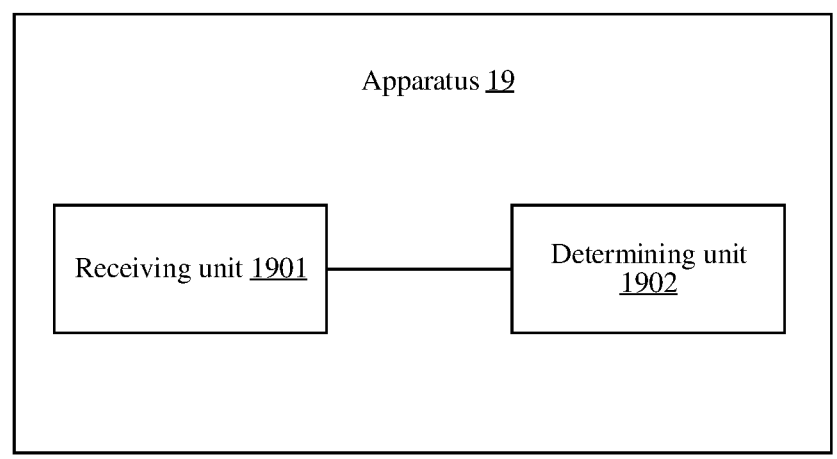
FIG. 19 is another schematic structural diagram of a communication timing apparatus according to an embodiment of the present invention.

It should be noted that the apparatus 19 shown in FIG. 19 may implement a terminal device side in the embodiment shown in FIG. 17. The apparatus 19 includes a receiving unit 1901 and a determining unit 1902. The receiving unit 1901 is configured to receive a signaling message from a network device, where the signaling message includes indication information and a TAC timing advance command, the indication information is N1 bits, the TAC is N2 bits, different values of the indication information correspond to different scale factors, and N1 and N2 are integers greater than or equal to 1.

The determining unit 1902 is configured to determine a transmission timing adjustment based on a value of the TAC and a scale factor corresponding to a value of the indication information.

In a possible design, N1=1, 2, or 3, and N2=3, 4, 5, 6, 7, or 8.

In a possible design, N1=1; and when the value of the indication information is equal to 0, the scale factor corresponding to the value of the indication information is related to a maximum subcarrier spacing in a timing advance group TAG associated with the terminal device; or when the value of the indication information is equal to 1, the scale factor corresponding to the value of the indication information is related to a minimum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a maximum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a maximum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured first fixed value; or when the value of the indication information is equal to 1, the scale factor corresponding to the value of the indication information is a prestored or preconfigured second fixed value.

In a possible design, the signaling message includes a MAC CE or DCI, and the signaling message further includes a timing advance group index TAG index.

The apparatus 19 may be a terminal device, or the apparatus 19 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 17 are based on a same idea, and also have same technical effects. For a specific process, refer to description in the method embodiment in FIG. 17, and details are not described herein again.

Figure 20:
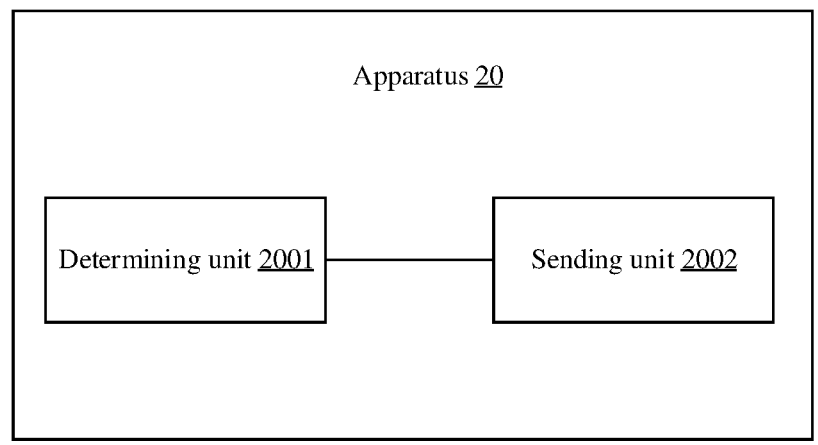
FIG. 20 is another schematic structural diagram of a communication timing apparatus according to an embodiment of the present invention.

It should be noted that a data sending apparatus 20 (apparatus 20 for short below) shown in FIG. 20 may implement a network side in the embodiment shown in FIG. 17. The apparatus 20 includes a determining unit 2001 and a sending unit 2002. The determining unit 2001 is configured to determine a value of indication information and a value of a TAC, where the indication information is N1 bits, the TAC is N2 bits, different values of the indication information correspond to different scale factors, and N1 and N2 are integers greater than or equal to 1.

The sending unit 2002 is configured to send, to a terminal device, a signaling message carrying the indication information and the TAC.

In a possible design, N1=1, 2, or 3, and N2=3, 4, 5, 6, 7, or 8.

In a possible design, N1=1; and when the value of the indication information is equal to 0, the scale factor corresponding to the value of the indication information is related to a maximum subcarrier spacing in a timing advance group TAG associated with the terminal device; or when the value of the indication information is equal to 1, the scale factor corresponding to the value of the indication information is related to a minimum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a maximum subcarrier spacing in a TAG associated with the terminal device.

In a possible design, N1=1; and when the value of the indication information is equal to 1, the scale factor corresponding to the value of the indication information is a prestored or preconfigured fixed value; or when the value of the indication information is equal to 0, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a maximum subcarrier spacing in a TAG associated with the terminal device.

In a possible design, N1=1; and when the value of the indication information is equal to 0, the scale factor corresponding to the value of the indication information is a prestored or preconfigured fixed value; or when the value of the indication information is equal to 1, the scale factor corresponding to the value of the indication information is related to a minimum subcarrier spacing in a TAG associated with the terminal device.

In a possible design, N1=1; and when the value of the indication information is equal to 0, the scale factor corresponding to the value of the indication information is a prestored or preconfigured first fixed value; or when the value of the indication information is equal to 1, the scale factor corresponding to the value of the indication information is a prestored or preconfigured second fixed value.

In a possible design, the signaling message includes a MAC CE or DCI, and the signaling message further includes a timing advance group index TAG index.

The apparatus 20 may be a network device, or the apparatus 20 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 17 are based on a same idea, and also have same technical effects. For a specific process, refer to description in the method embodiment in FIG. 17, and details are not described herein again.

FIG. 2a shows a paging method in an embodiment of the present invention in detail. The following provides a paging apparatus 5 (apparatus 5 for short below) in an embodiment of the present invention.

Figure 5:
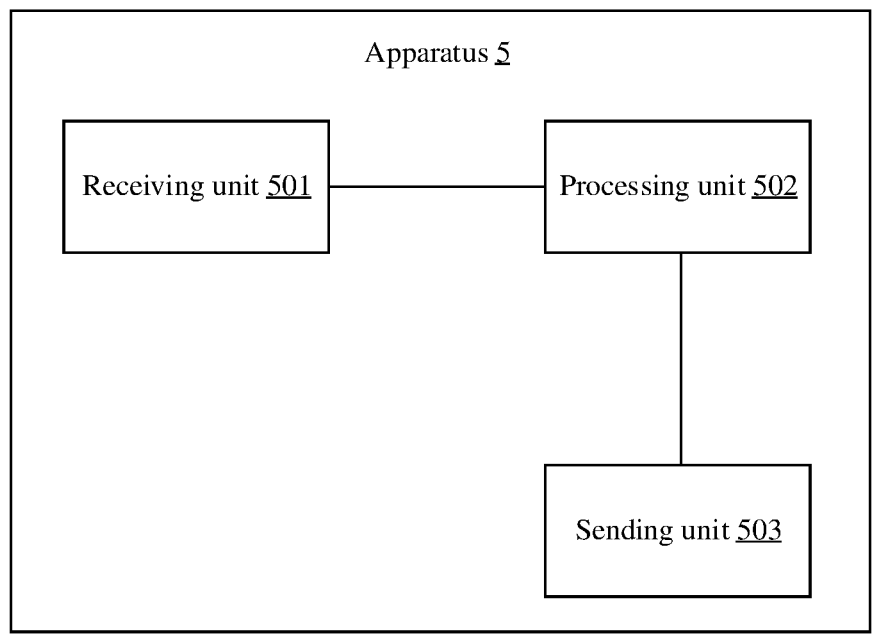
FIG. 5 is a schematic structural diagram of a paging apparatus according to an embodiment of the present invention.

It should be noted that the apparatus 5 shown in FIG. 5 may implement a network device side in the embodiment shown in FIG. 2a. The apparatus 5 includes a receiving unit 501, a processing unit 502, and a sending unit 503. The receiving unit 501 is configured to receive a random access preamble from a terminal device, where the random access preamble is used to request a paging message. For example, the receiving unit 501 performs S201. The processing unit 502 is configured to obtain a paging identifier associated with the random access preamble. For example, the processing unit 502 performs S203. The sending unit 503 is configured to send a paging message to the terminal device based on the paging identifier. For example, the sending unit 503 performs S204.

The apparatus 5 may be a network device, or the apparatus 5 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 2a are based on a same idea, and also have same technical effects. For a specific process, refer to description in the method embodiment in FIG. 2a, and details are not described herein again.

Figure 6:
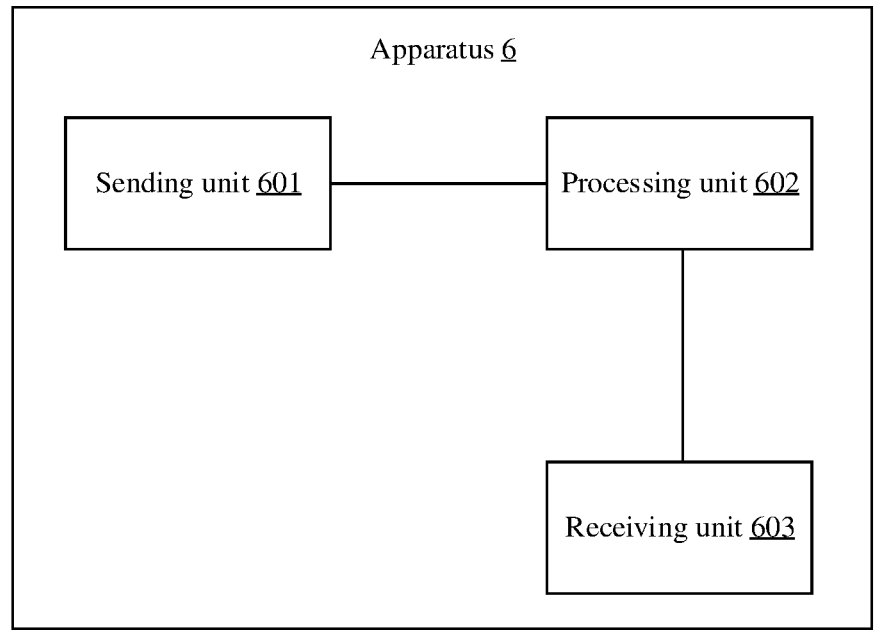
FIG. 6 is another schematic structural diagram of a paging apparatus according to an embodiment of the present invention.

It should be noted that a paging apparatus 6 (apparatus 6 for short below) shown in FIG. 6 may implement the terminal device side in the embodiment shown in FIG. 2a. The apparatus 6 includes: a sending unit 601, a processing unit 602, and a receiving unit 603. The sending unit 601 is configured to send a random access preamble to a network device, where the random access preamble is used to request a paging message corresponding to a paging user group of the apparatus. For example, the sending unit 601 performs S201. The processing unit 602 is configured to obtain a paging identifier associated with the random access preamble. For example, the processing unit 602 performs S202. The receiving unit 603 is configured to receive a paging message from the network device based on the paging identifier. For example, the receiving unit 603 performs S204.

The apparatus 6 may be a network device, or the apparatus 6 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 2a are based on a same idea, and also have same technical effects. For a specific process, refer to description in the method embodiment in FIG. 2a, and details are not described herein again.

Figure 7:
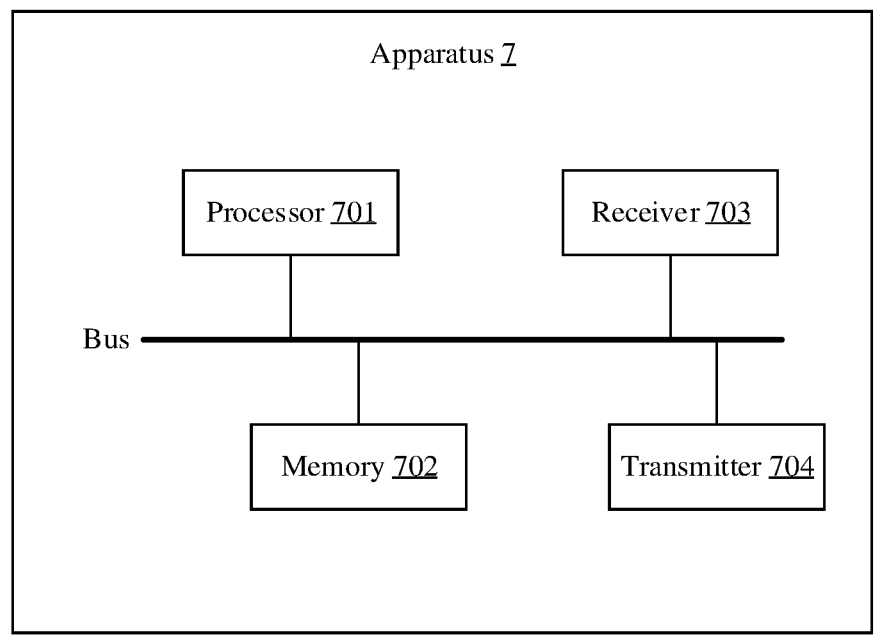
FIG. 7 is another schematic structural diagram of a paging apparatus according to an embodiment of the present invention.

As shown in FIG. 7, an embodiment of the present invention further provides a paging apparatus 7 (apparatus 7 for short below).

In a possible design, the apparatus 7 is a network device, and the network device includes:

a memory 702, configured to store a program and data, where there may be one or more memories, the memory may be any form of storage medium, for example, the memory may be a random access memory (RAM for short), a read-only memory (ROM for short), or a flash, and the memory 702 may be separately located in the network device or may be located in a processor 701;

a receiver 703, configured to receive a signal, where the receiver 703 may be a separate chip or may be a receiver circuit or an input interface in the processor 701, optionally, the receiver 703 may further include a receive antenna, and the receiver 703 is configured to receive a random access preamble from a terminal device, where the random access preamble is used to request a paging message, for example, the receiver 703 performs S201;

the processor 704 configured to execute the program code stored by the memory 702, where when the program code is run, the processor 701 is configured to obtain a paging identifier associated with the random access preamble, for example, the processor 701 performs S203; and a transmitter 704, configured to transmit a signal, where the transmitter 704 may be a separate chip or may be a transmitter circuit or an output interface in the processor 704 optionally, the transmitter 704 may further include a transmit antenna, the transmit antenna included in the transmitter 704 and the receive antenna included in the receiver 703 may be two antennas separately disposed or may be one antenna, and the transmitter 704 is configured to send a paging message to the terminal device based on the paging identifier, for example, the transmitter 704 performs S204.

The receiver 703, the transmitter 704, the memory 702, and the processor 701 communicate with each other through an internal connection path, for example, are connected by a bus.

In a possible design, the apparatus 7 may be a chip, for example, may be a communications chip in the network device, and is configured to perform a related function of the processor 701 in the network device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is executed, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 2a are based on a same idea, and also have same technical effects. For a specific process, refer to description in the method embodiment in FIG. 2a, and details are not described herein again.

Figure 8:
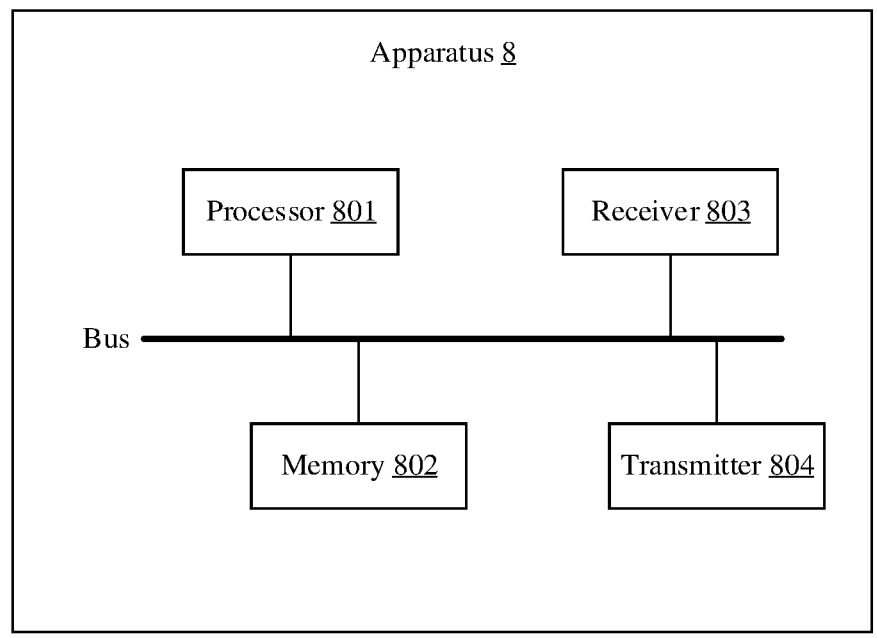
FIG. 8 is another schematic structural diagram of a paging apparatus according to an embodiment of the present invention.

As shown in FIG. 8, an embodiment of the present invention further provides a paging apparatus 8 (apparatus 8 for short below).

In a possible design, the apparatus 8 is a terminal device. The terminal device includes: a processor 801, a memory 802, a receiver 803, and a transmitter 804.

The memory 802 is configured to store a program and data, where there may be one or more memories, the memory may be any form of storage medium, for example, the memory may be a random access memory (English: random access memory, RAM for short), a read-only memory (English: read only memory, ROM for short), or a flash, and the memory 802 may be separately located in the terminal device or may be located in the processor 801.

The transmitter 804 is configured to transmit a signal, where the transmitter 804 may be a separate chip or may be a transmitter circuit or an output interface in the processor 801, optionally, the transmitter 804 may further include a transmit antenna, the transmit antenna included in the transmitter 804 and a receive antenna included in the receiver 803 may be two antennas separately disposed or may be one antenna, and the transmitter 804 is configured to send a random access preamble to a network device, where the random access preamble is used to request a paging message corresponding to a paging user group of the apparatus, for example, the transmitter 804 performs S201.

The processor 801 is configured to execute the program code stored by the memory 802, where when the program code is run, the processor 801 is configured to obtain a paging identifier associated with the random access preamble, for example, the processor 801 performs S202.

The receiver 803 is configured to receive a signal, where the receiver 803 may be a separate chip or may be a receiver circuit or an input interface in the processor 801, optionally, the receiver 803 may further include a receive antenna, and the receiver 803 is configured to receive a paging message from the network device based on the paging identifier, for example, the receiver 803 performs S204.

The receiver 803, the transmitter 804, the memory 802, and the processor 801 communicate with each other through an internal connection path, for example, are connected by a bus.

In a possible design, the apparatus 8 may be a chip, for example, may be a communications chip in the terminal device, and is configured to perform a related function of the processor 801 in the terminal device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is executed, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 2a are based on a same idea, and also have same technical effects. For a specific process, refer to description in the method embodiment in FIG. 2a, and details are not described herein again.

FIG. 3a shows a paging method in an embodiment of the present invention in detail. The following provides a paging apparatus 9 (apparatus 9 for short below) in an embodiment of the present invention.

Figure 9:
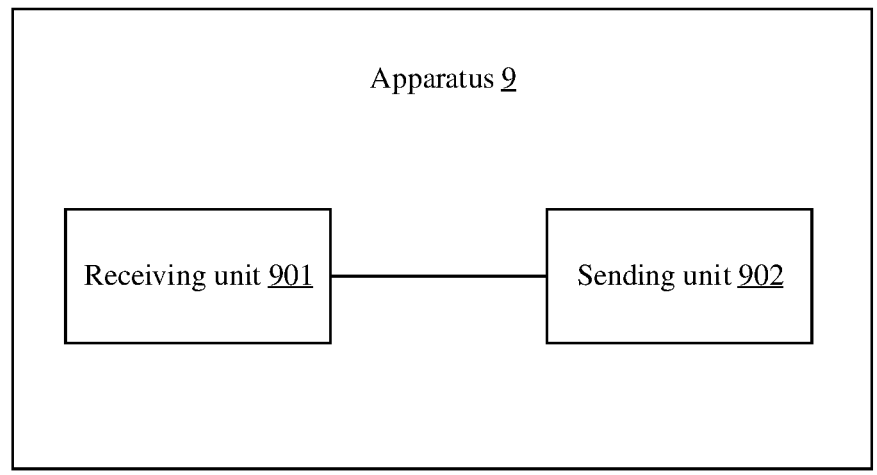
FIG. 9 is another schematic structural diagram of a paging apparatus according to an embodiment of the present invention.

It should be noted that the apparatus 9 shown in FIG. 9 may implement a network device side in the embodiment shown in FIG. 3a. The apparatus 9 includes a receiving unit

901 and a sending unit 902. The receiving unit 901 is configured to receive a random access preamble from a terminal device, where the random access preamble is associated with a paging user group of the terminal device, and the random access preamble is used to request a paging message, for example, perform S301. The sending unit 902 is configured to send a random access response to the terminal device, where the random access response carries paging scheduling information and/or a paging identifier associated with the random access preamble, the paging scheduling information includes at least one of frequency information, time information, a modulation and coding scheme, a reference signal, a subcarrier spacing, and downlink control information, for example, perform S302. The sending unit 902 is further configured to send a paging message to the terminal device based on the paging scheduling information, for example, perform S303.

The apparatus 9 may be a network device, or the apparatus 9 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 3*a* are based on a same idea, and also have same technical effects. For a specific process, refer to description in the method embodiment in FIG. 3*a*, and details are not described herein again.

Figure 10:
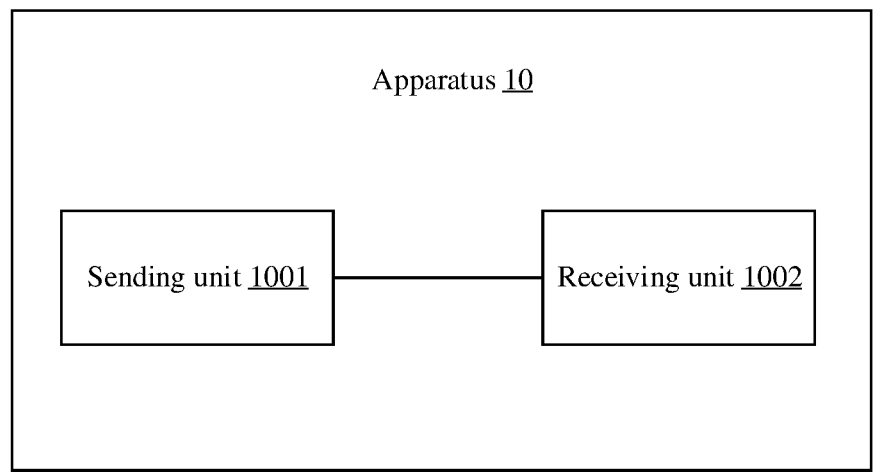
FIG. 10 is another schematic structural diagram of a paging apparatus according to an embodiment of the present invention.

It should be noted that a paging apparatus 10 (apparatus 10 for short below) shown in FIG. 10 may implement a terminal device side in the embodiment shown in FIG. 3*a*. The apparatus 10 includes: a sending unit 1001 and a receiving unit 1002. The sending unit 1001 is configured to send a random access preamble to a network device, where the random access preamble is associated with a paging user group of the terminal device, for example, perform S301. The receiving unit 1002 is configured to receive a random access response from the network device, where the random access response carries paging scheduling information and/or a paging identifier associated with the random access preamble, the paging scheduling information includes at least one of frequency information, a modulation and coding scheme, a reference signal, subcarrier spacing information, and DCI, for example, perform S302. The receiving unit 1002 is further configured to receive a paging message from the network device based on the paging scheduling information, for example, perform S303.

The apparatus 10 may be a terminal device, or the apparatus 10 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 3*a* are based on a same idea, and also have same technical effects. For a specific process, refer to description in the method embodiment in FIG. 3*a*, and details are not described herein again.

Figure 11:
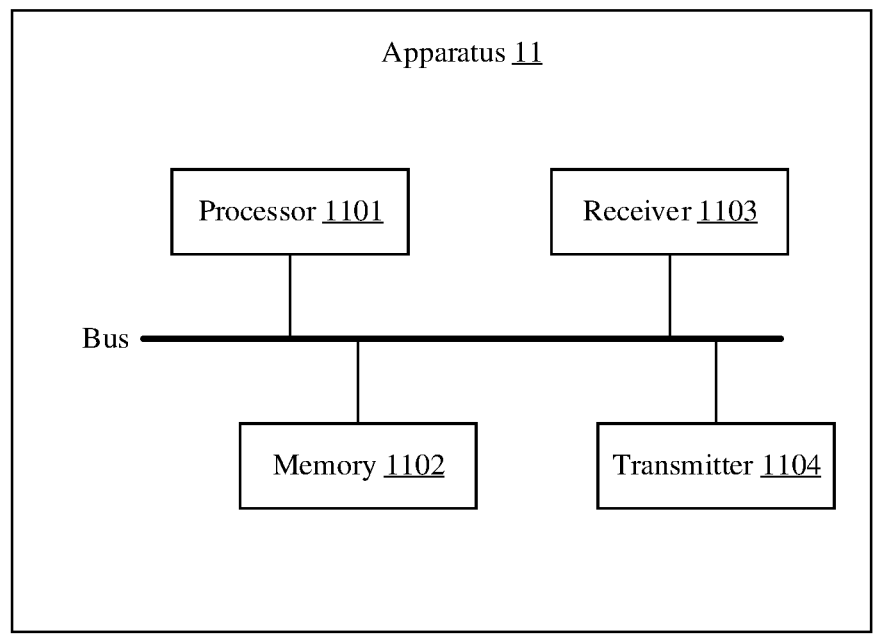
FIG. 11 is another schematic structural diagram of a paging apparatus according to an embodiment of the present invention.

As shown in FIG. 11, an embodiment of the present invention further provides a paging apparatus 11 (apparatus 11 for short below).

In a possible design, the apparatus 11 is a network device, and the network device includes:

a memory 1102, configured to store a program and data, where there may be one or more memories, the memory may be any form of storage medium, for example, the memory may be a random access memory (RAM for short), a read-only memory (ROM for short), or a flash, and the memory 1102 may be separately located in the network device or may be located in a processor 1101;

a receiver 1103, configured to receive a signal, where the receiver 1103 may be a separate chip or may be a receiver circuit or an input interface in the processor 1101, optionally, the receiver 1103 may further include a receive antenna, and the receiver 1103 is configured to receive a random access preamble from a terminal device, where the random access preamble is associated with a paging user group of the terminal device, and the random access preamble is used to request a paging message, for example, perform S301;

the processor 1101, configured to execute an instruction corresponding to the program code stored by the memory 1102; and a transmitter 1104, configured to transmit a signal, where the transmitter 1104 may be a separate chip or may be a transmitter circuit or an output interface in the processor 1101, optionally, the transmitter 1104 may further include a transmit antenna, the transmit antenna included in the transmitter 1104 and the receive antenna included in the receiver 1103 may be two antennas separately disposed or may be one antenna, the transmitter 1104 is configured to send, to a data server, a media signal quality value measured on an uplink port, a media signal quality value measured on a downlink port, an identifier of the network device, and a port type corresponding to each media signal quality value. For example, the transmitter 1104 is configured to send a random access response to the terminal device, where the random access response carries paging scheduling information and/or a paging identifier associated with the random access preamble, the paging scheduling information includes at least one of frequency information, time information, a modulation and coding scheme, a reference signal, a subcarrier spacing, and downlink control information (DCI), for example, perform S302.

The transmitter 1104 is further configured to send a paging message to the terminal device based on the paging scheduling information, for example, perform S303.

The receiver 1103, the transmitter 1104, the memory 1102, and the processor 1101 communicate with each other through an internal connection path, for example, are connected by a bus.

In a possible design, the apparatus 11 may be a chip, for example, may be a communications chip in the network device, and is configured to perform a related function of the processor 1101 in the network device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is run, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 3a are based on a same idea, and also have same technical effects. For a specific process, refer to description in the method embodiment in FIG. 3a, and details are not described herein again.

Figure 12:
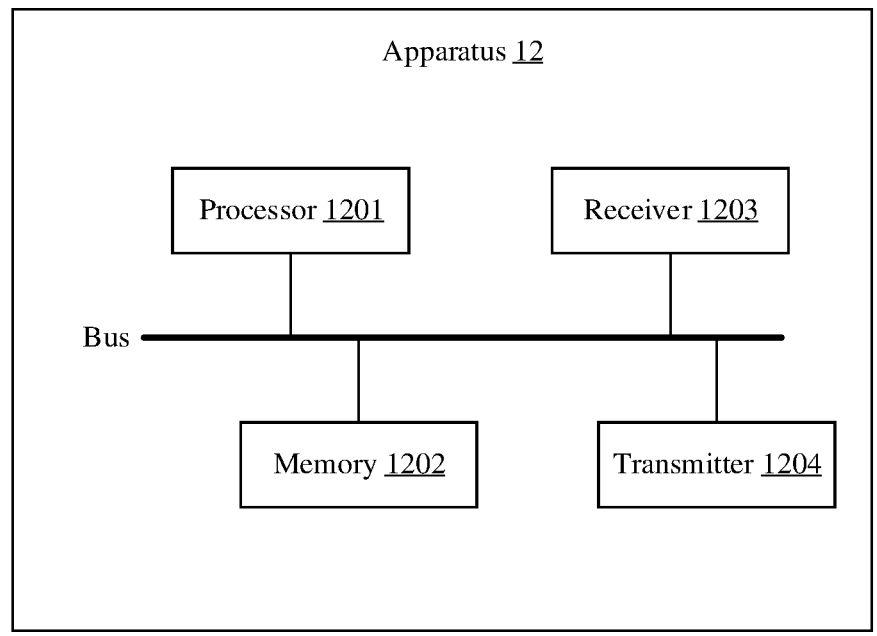
FIG. 12 is another schematic structural diagram of a paging apparatus according to an embodiment of the present invention.

As shown in FIG. 12, an embodiment of the present invention further provides a paging apparatus 12 (apparatus 12 for short below).

In a possible design, the apparatus 12 is a terminal device. The terminal device includes: a processor 1201, a memory 1202, a receiver 1203, and a transmitter 1204.

The memory 1202 is configured to store a program and data, where there may be one or more memories, the memory may be any form of storage medium, for example, the memory may be a random access memory (English: random access memory, RAM for short), a read-only memory (English: read only memory, ROM for short), or a flash, and the memory 1202 may be separately located in the terminal device or may be located in the processor 1201.

The processor 1201 is configured to execute the program code stored by the memory 1202.

The transmitter 1204 is configured to transmit a signal, where the transmitter 1204 may be a separate chip or may be a transmitter circuit or an output interface in the processor 1201, optionally, the transmitter 1204 may further include a transmit antenna, the transmit antenna included in the transmitter 1204 and a receive antenna included in the receiver 1203 may be two antennas separately disposed or may be one antenna, and the transmitter 1204 is configured to send a random access preamble to a network device, where the random access preamble is associated with a paging user group of the terminal device, for example, perform S301.

The receiver 1203 is configured to receive a signal. The receiver 1203 may be a separate chip, or may be a receiver circuit or an input interface in the processor 1201. Optionally, the receiver 1203 may further include a receive antenna. The receiver 1203 is configured to receive a random access response from the network device, where the random access response carries paging scheduling information and/or a paging identifier associated with the random access preamble, the paging scheduling information includes at least one of frequency information, a modulation and coding scheme, a reference signal, subcarrier spacing information, and DCI, for example, perform S302.

The receiver 1203 is further configured to receive a paging message from the network device based on the paging scheduling information, for example, perform S303.

The receiver 1203, the transmitter 1204, the memory 1202, and the processor 1201 communicate with each other through an internal connection path, for example, are connected by a bus.

In a possible design, the apparatus 12 may be a chip, for example, may be a communications chip in the terminal device, and is configured to perform a related function of the processor 1201 in the terminal device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is run, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 3a are based on a same idea, and also have same technical effects. For a specific process, refer to description in the method embodiment in FIG. 3a, and details are not described herein again.

FIG. 4 shows a communication timing method in an embodiment of the present invention in detail. The following provides a communication timing apparatus 13 (apparatus 13 for short below) in an embodiment of the present invention.

Figure 13:
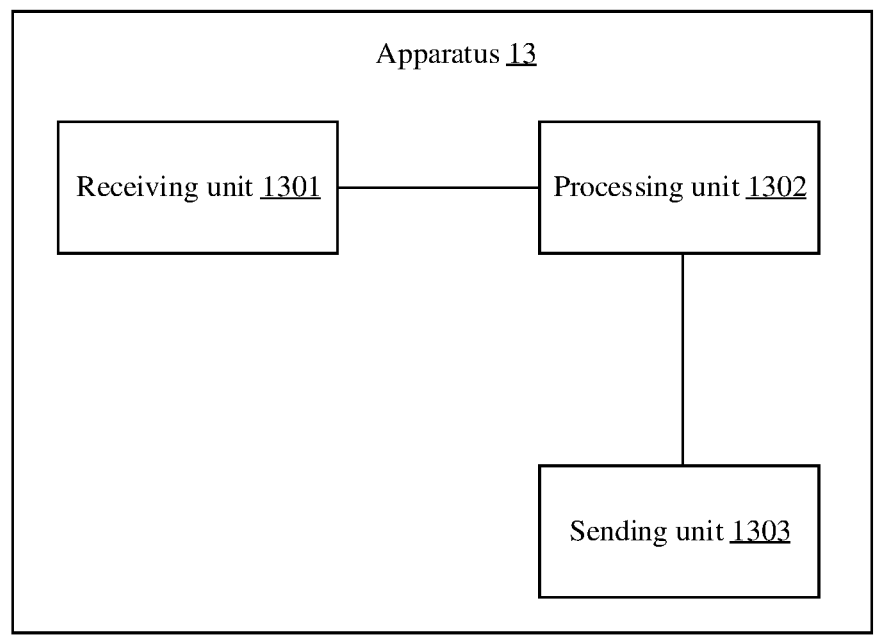
FIG. 13 is another schematic structural diagram of a communication timing apparatus according to an embodiment of the present invention.

It should be noted that the apparatus 13 shown in FIG. 13 may implement a network device side shown in FIG. 4. The apparatus 13 includes a receiving unit 1301, a processing unit 1302, and a sending unit 1303. The receiving unit 1301 is configured to receive a random access preamble from a terminal device, for example, perform S401. The processing unit 1302 is configured to determine a format of a TAC and/or a scale factor of a timing advance based on a format of the random access preamble, for example, perform S402. The sending unit 1303 is configured to send, to the terminal device, a random access response carrying the TAC and/or the scale factor, for example, perform S403.

The apparatus 13 may be a network device, or the apparatus 13 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 4 are based on a same idea, and also have same technical effects. For a specific process, refer to description in the method embodiment in FIG. 4, and details are not described herein again.

Figure 14:
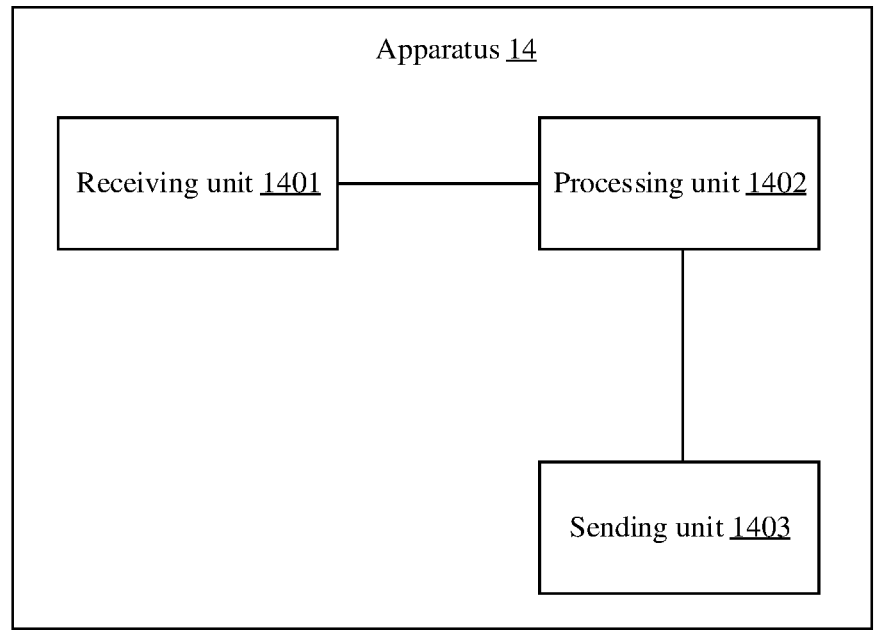
FIG. 14 is another schematic structural diagram of a communication timing apparatus according to an embodiment of the present invention.

It should be noted that a communication timing apparatus 14 (apparatus 14 for short below) shown in FIG. 14 may implement a terminal device side in the embodiment shown in FIG. 4. The apparatus 14 includes: a receiving unit 1401, a processing unit 1402, and a sending unit 1403. The receiving unit 1401 is configured to receive a TAC timing advance command from a network device, for example, perform S403. The processing unit 1402 is configured to obtain a scale factor and determine a timing advance and/or determine a timing advance offset based on at least one of the TAC from the network device, the obtained scale factor, a currently used basic time unit, a currently used sampling point quantity, a currently used carrier frequency, a current service type, a currently used subcarrier spacing, a currently used subcarrier index, a maximum subcarrier spacing, a maximum sampling point quantity, and a currently used offset factor, for example, perform S404. The sending unit 1403 is configured to send uplink data based on the timing advance and the timing advance offset, for example, perform S405.

The apparatus 14 may be a terminal device, or the apparatus 14 may be a field programmable gate array (field-programmable gate array, FPGA), a dedicated integrated chip, a system on chip (SoC), a central processing unit (CPU), a network processor (NP), a digital signal processing circuit, or a micro controller unit (MCU) for performing a related function, or may be a programmable controller (programmable logic device, PLD) or another integrated chip.

This embodiment of the present invention and the method embodiment in FIG. 4 are based on a same idea, and also have same technical effects. For a specific process, refer to description in the method embodiment in FIG. 4, and details are not described herein again.

Figure 15:
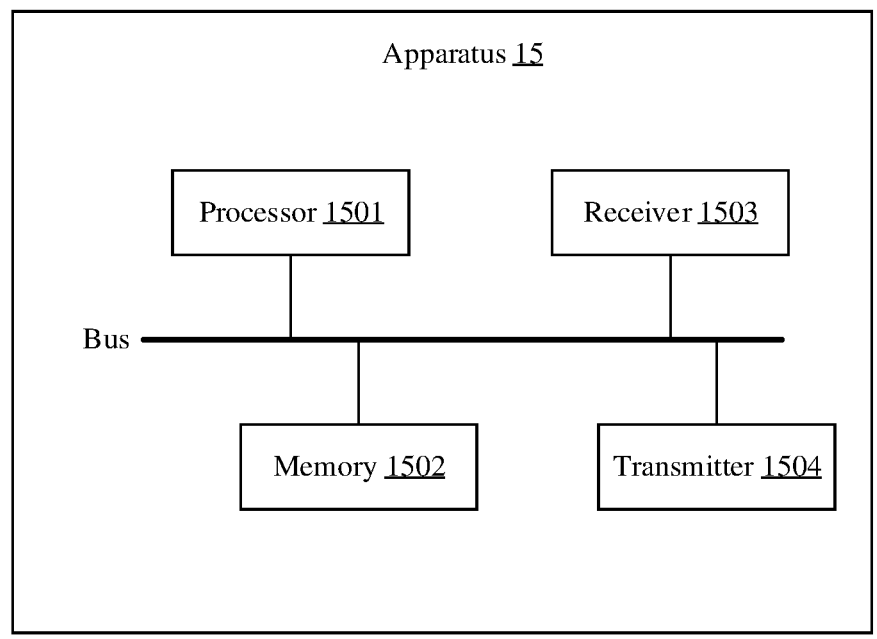
FIG. 15 is another schematic structural diagram of a communication timing apparatus according to an embodiment of the present invention.

As shown in FIG. 15, an embodiment of the present invention further provides a communication timing apparatus 15 (apparatus 15 for short below).

In a possible design, the apparatus 15 is a network device, and the network device includes:

a memory 1502, configured to store a program and data, where there may be one or more memories, the memory may be any form of storage medium, for example, the memory may be a random access memory (RAM for short), a read-only memory (ROM for short), or a flash, and the memory 1502 may be separately located in the network device or may be located in a processor 1501;

a receiver 1503, configured to receive a signal, where the receiver 1503 may be a separate chip or may be a receiver circuit or an input interface in the processor 1501, optionally, the receiver 1503 may further include a receive antenna, and the receiver 1503 is configured to receive a random access preamble from a terminal device, for example, perform S401;

the processor 1501, configured to execute the program code stored by the memory 1502, where when the program code is run, the processor 1501 is configured to determine a format of a TAC and/or a scale factor of a timing advance based on a format of the random access preamble, for example, perform S402; and a transmitter 1504, configured to transmit a signal, where the transmitter 1504 may be a separate chip or may be a transmitter circuit or an output interface in the processor 1501, optionally, the transmitter 1504 may further include a transmit antenna, the transmit antenna included in the transmitter 1504 and the receive antenna included in the receiver 1503 may be two antennas separately disposed or may be one antenna, and the transmitter 1504 is configured to send, to the terminal device, a random access response carrying the TAC and/or the scale factor, for example, perform S403.

The receiver 1503, the transmitter 1504, the memory 1502, and the processor 1501 communicate with each other through an internal connection path, for example, are connected by a bus.

In a possible design, the apparatus 15 may be a chip, for example, may be a communications chip in the network device, and is configured to perform a related function of the processor 1501 in the network device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is run, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 4 are based on a same idea, and also have same technical effects. For a specific process, refer to description in the method embodiment in FIG. 4, and details are not described herein again.

Figure 16:
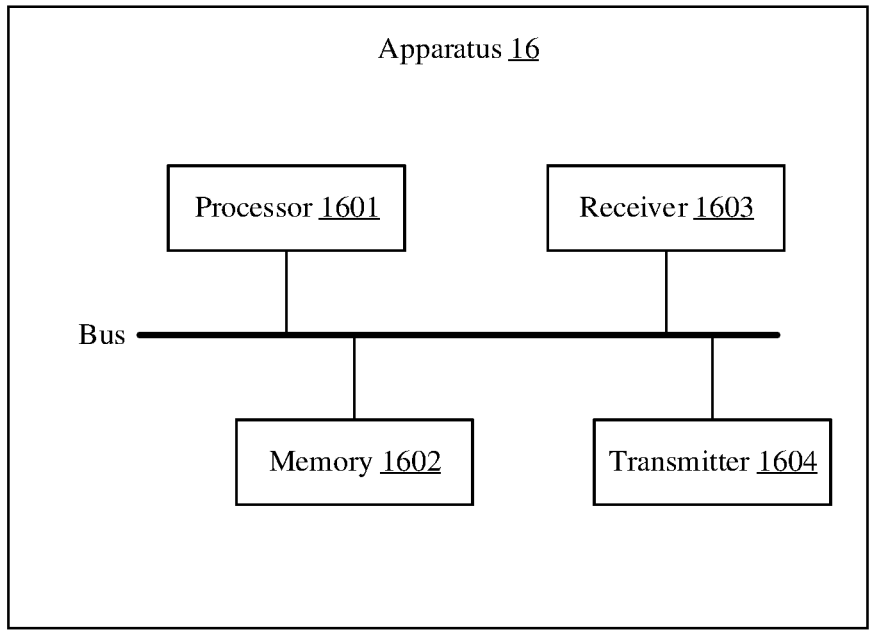
FIG. 16 is another schematic structural diagram of a communication timing apparatus according to an embodiment of the present invention.

As shown in FIG. 16, an embodiment of the present invention further provides a communication timing apparatus 16 (apparatus 16 for short below).

In a possible design, the apparatus 16 is a terminal device. The terminal device includes: a processor 1601, a memory 1602, a receiver 1603, and a transmitter 1604.

The memory 1602 is configured to store a program and data, where there may be one or more memories, the memory may be any form of storage medium, for example, the memory may be a random access memory (RAM for short), a read-only memory (ROM for short), or a flash, and the memory 1602 may be separately located in the terminal device or may be located in the processor 1601.

The receiver 1603 is configured to receive a signal, where the receiver 1603 may be a separate chip or may be a receiver circuit or an input interface in the processor 1601. Optionally, the receiver 1603 may further include a receive antenna, and the receiver 1603 is configured to receive a TAC timing advance command of a network device, for example, perform S403.

The processor 1601 is configured to execute the program code stored by the memory 1602. When the program code is run, the processor 1601 is configured to obtain a scale factor and determine a timing advance and/or determine a timing advance offset based on at least one of the TAC from the network device, the obtained scale factor, a currently used basic time unit, a currently used sampling point quantity, a currently used carrier frequency, a current service type, a currently used subcarrier spacing, a currently used subcarrier index, a maximum subcarrier spacing, a maximum sampling point quantity, and a currently used offset factor, for example, perform S404.

The transmitter 1604 is configured to transmit a signal, where the transmitter 1604 may be a separate chip or may be a transmitter circuit or an output interface in the processor 1601. Optionally, the transmitter 1604 may further include a transmit antenna, the transmit antenna included in the transmitter 1604 and the receive antenna included in the receiver 1603 may be two antennas separately disposed or may be one antenna, and the transmitter 1604 is configured to send uplink data based on the timing advance and the timing advance offset, for example, perform S405.

The receiver 1603, the transmitter 1604, the memory 1602, and the processor 1601 communicate with each other through an internal connection path, for example, are connected by a bus.

In a possible design, the apparatus 16 may be a chip, for example, may be a communications chip in the terminal device, and is configured to perform a related function of the processor 1601 in the terminal device. The chip may be a field programmable gate array, an application-specific integrated chip, a system chip, a central processing unit, a network processor, a digital signal processing circuit, or a microcontroller for performing a related function, or may be a programmable controller or another integrated chip. The chip may optionally include one or more memories, configured to store program code. When the program code is run, the processor is enabled to perform a corresponding function.

All or some of the chips may be implemented by software, hardware, firmware, or any combination thereof. When a software program is used to implement the embodiments, the embodiments may be implemented completely or partially in a form of a computer program product. The computer program product includes one or more computer instructions (sometimes also referred to as code or a program). When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment of the present invention and the method embodiment in FIG. 4 are based on a same idea, and also have same technical effects. For a specific process, refer to description in the method embodiment in FIG. 4, and details are not described herein again.

It should be noted that the sending unit or the transmitter performs the sending steps in the foregoing method embodiments, the receiving unit or the receiver performs the receiving steps in the foregoing method embodiments, and other steps are performed by the processing unit or the processor. The sending unit and the receiving unit may form a transceiver unit, and the receiver and the transmitter may form a transceiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A communication method, comprising:
   sending a random access preamble to a network device;
   receiving a random access response from the network device, the random access response corresponding to the random access preamble; and
   sending a message 3 to the network device at a sending time of the message 3, with the sending time determined based on a receiving time of the random access response, a delay k1, and an offset k2, the delay k1 and the offset k2 related to a subcarrier spacing of the message 3.

2. The method according to claim 1, wherein,
   the offset k2 is configured through the random access response; or
   the offset k2 is configured through the random access response and radio access control (RRC) signaling.

3. The method according to claim 1, wherein,
   the sending time of the message 3 is further determined based on a processing delay of the random access response.

4. The method according to claim 1, wherein,
   the sending time of the message 3 is further determined based on a subcarrier spacing of the random access response.

5. The method according to claim 1, wherein the sending time of the message 3 is located in a time slot that is:

$$\text{floor}((n*S2)/S3)+(k1+k2),$$

wherein S2 is a length of a first time unit determined based on a subcarrier spacing of the random access response, S3 is a length of a second time unit determined based on the subcarrier spacing of the message 3, n represents the receiving time of the random access response, and n is determined based on the first time unit.

6. The method according to claim 5, wherein the first time unit or the second time unit is a slot.

7. The method according to claim 1, wherein the random access response comprises an uplink scheduling grant (UL grant), and the message 3 is an uplink data sent based on the uplink scheduling grant.

8. A communication method, comprising:
   receiving a random access preamble from a terminal device;
   sending a random access response to the terminal device, the random access response corresponding to the random access preamble; and
   receiving a message 3 from the terminal device in response to sending the random access response, wherein a sending time of the message 3 is based on a receiving time of the random access response at the terminal device, a delay k1, and offset k2 configurable for the terminal device, the delay k1 and the offset k2 related to a subcarrier spacing of the message 3.

9. The method according to claim 8, further comprising:
   configuring the offset k2 using the random access response; or
   configuring the offset k2 using the random access response and radio access control (RRC) signaling.

10. The method according to claim 8, wherein the sending time of the message 3 is further based on a processing delay of the random access response.

11. The method according to claim 8, wherein the sending time of the message 3 is further based on a subcarrier spacing of the random access response.

12. The method according to claim 8, wherein the sending time of the message 3 is located in a time slot that is:

$$\text{floor}((n*S2)/S3)+(k1+k2),$$

wherein S2 is a length of a first time unit determined based on a subcarrier spacing of the random access response, $S_3$ is a length of a second time unit determined based on the subcarrier spacing of the message 3, n represents the receiving time of the random access response at the terminal device, and n is determined based on the first time unit.

13. The method according to claim 12, wherein the first time unit or the second time unit is a slot.

14. The method according to claim 8, wherein the random access response comprises an uplink scheduling grant (UL grant), and the message 3 is an uplink data sent based on the uplink scheduling grant.

15. A communication apparatus, comprising:
a non-transitory memory storage comprising instructions; and
one or more processors in communication with the memory storage, wherein the instructions, when executed by the one or more processors, cause the communication apparatus to:
send a random access preamble to a network device;
receive a random access response from the network device, the random access response corresponding to the random access preamble; and
send a message 3 to the network device at a sending time of the message 3, with the sending time determined based on a receiving time of the random access response, a delay k1, and an offset k2, the delay k1 and the offset k2 related to a subcarrier spacing of the message 3.

16. The communication apparatus according to claim 15, wherein,
the offset k2 is configured through the random access response; or
the offset k2 is configured through the random access response and radio access control (RRC) signaling.

17. The communication apparatus according to claim 15, wherein the sending time of the message 3 is further determined based on a processing delay of the random access response, or a subcarrier spacing of the random access response.

18. A communication apparatus, comprising:
a non-transitory memory storage comprising instructions; and
one or more processors in communication with the memory storage, wherein the instructions, when executed by the one or more processors, cause the communication apparatus to:
receive a random access preamble from a terminal device;
send a random access response to the terminal device, the random access response corresponding to the random access preamble; and
receive a message 3 from the terminal device, and wherein a sending time of the message 3 is based on a receiving time of the random access response at the terminal device, a delay k1, and an offset k2 configurable for the terminal device, the delay k1 and the offset k2 related to a subcarrier spacing of the message 3.

19. The communication apparatus according to claim 18, wherein the instructions, when executed by the one or more processors, cause the communication apparatus to further:
configure the offset k2 using the random access response; or
configure the offset k2 using the random access response and radio access control (RRC) signaling.

20. The communication apparatus according to claim 18, wherein the sending time of the message 3 is further based on a processing delay of the random access response or a subcarrier spacing of the random access response.

\* \* \* \* \*

UNITED STATES PATENT AND TRADEMARK OFFICE
CERTIFICATE OF CORRECTION

PATENT NO. : 11,129,208 B2  
APPLICATION NO. : 16/824126  
DATED : September 21, 2021  
INVENTOR(S) : Huang et al.

It is certified that error appears in the above-identified patent and that said Letters Patent is hereby corrected as shown below:

In the Claims

Claim 8, Column 84, Line 41; insert --an-- in between "and" and "offset".

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*